(12) United States Patent
Abe et al.

(10) Patent No.: US 7,726,685 B2
(45) Date of Patent: Jun. 1, 2010

(54) AIRBAG AND AIRBAG APPARATUS

(75) Inventors: Kazuhiro Abe, Tokyo (JP); Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/227,131

(22) PCT Filed: Jul. 9, 2007

(86) PCT No.: PCT/JP2007/063652

§ 371 (c)(1),
(2), (4) Date: Nov. 7, 2008

(87) PCT Pub. No.: WO2008/015877

PCT Pub. Date: Feb. 7, 2008

(65) Prior Publication Data

US 2009/0121460 A1 May 14, 2009

(30) Foreign Application Priority Data

| Aug. 4, 2006 | (JP) | ............................ 2006-213534 |
| Dec. 28, 2006 | (JP) | ............................ 2006-355140 |
| Jul. 2, 2007 | (JP) | ............................ 2007-174250 |

(51) Int. Cl.
*B60R 21/26* (2006.01)

(52) U.S. Cl. ................................... 280/736; 280/743.1
(58) Field of Classification Search .............. 280/743.1, 280/736, 739, 740
See application file for complete search history.

(56) References Cited

U.S. PATENT DOCUMENTS 7,458,607 B2 * 12/2008 Abe ........................... 280/739

| 2006/0192371 | A1 * | 8/2006 | Abe | ............................ 280/739 |
| 2007/0013177 | A1 * | 1/2007 | Abe | ............................ 280/739 |
| 2007/0045997 | A1 * | 3/2007 | Abe et al. | ................... 280/729 |
| 2008/0203713 | A1 * | 8/2008 | McFadden et al. | .......... 280/739 |
| 2009/0020991 | A1 * | 1/2009 | Abe et al. | ................... 280/739 |

FOREIGN PATENT DOCUMENTS

| GB | 2 425 991 | 11/2006 |
| JP | H06-127330 | 5/1994 |
| JP | 2000-004674 | 1/2000 |
| JP | 2000-016228 | 1/2000 |
| JP | 2001-277991 | 10/2001 |
| JP | 2001-301556 | 10/2001 |
| JP | 2003-327071 | 11/2003 |
| JP | 2004-256091 | 9/2004 |
| JP | 2006-182268 | 7/2006 |

* cited by examiner

*Primary Examiner*—Faye M. Fleming
(74) *Attorney, Agent, or Firm*—Manabu Kanesaka

(57) ABSTRACT

An airbag and airbag apparatus in which a venthole is closed or opened by a small amount until an occupant hits the airbag, and the venthole is opened or opened by a large amount when the occupant hits the airbag. Inner panels 22A and 22B are provided inside of an airbag 10. Ventholes 18 and 18A allowing an inside and an outside of the airbag 10 to communicate with each other are provided in a rear panel 14. A lid member 60 for covering the venthole is provided on an outer surface side of the rear panel 14. The venthole 18A is a constantly-open type venthole that is not covered by means of the lid member 60. A tether 70 couples the lid member 60 with the inner panels 22A and 22B through the constantly-open type venthole 18A.

26 Claims, 36 Drawing Sheets

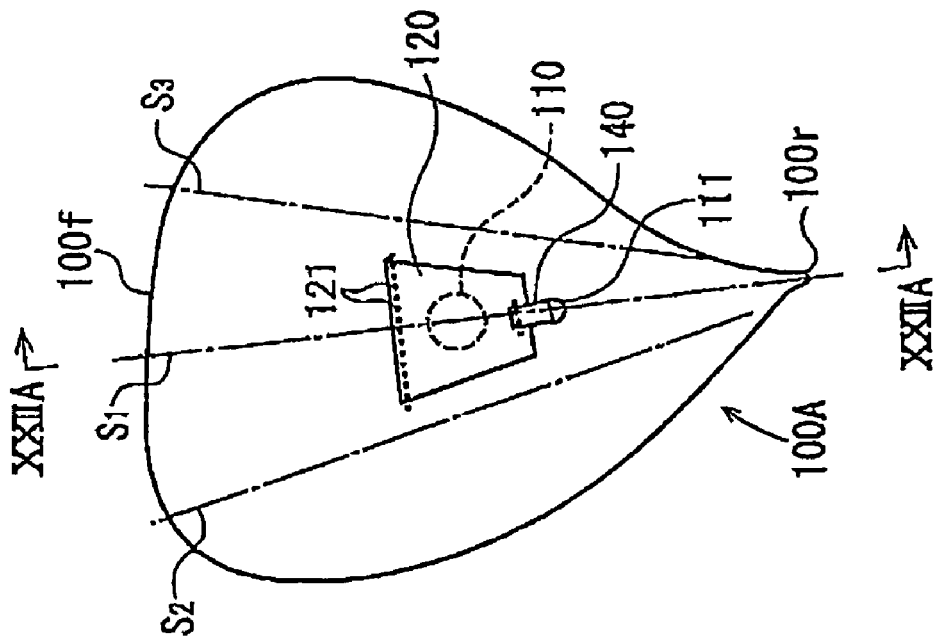
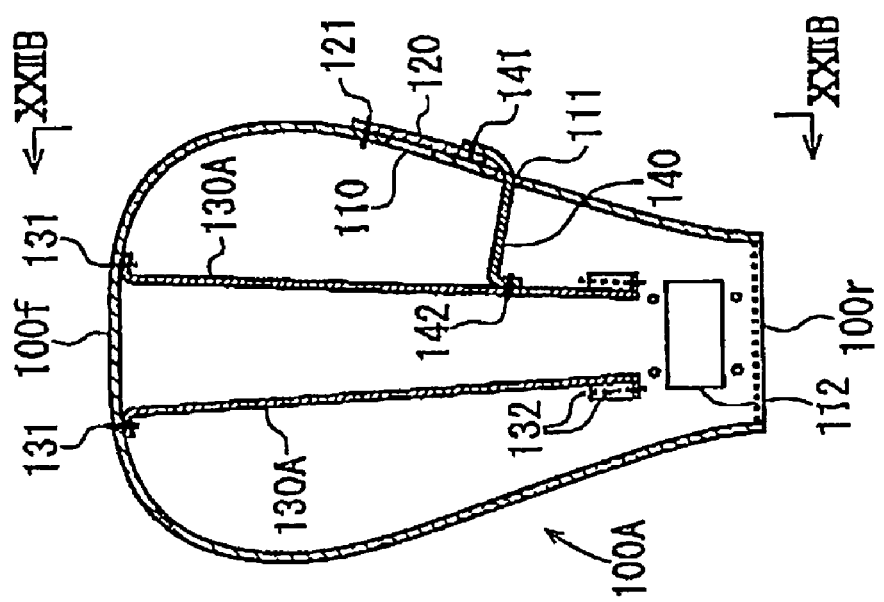

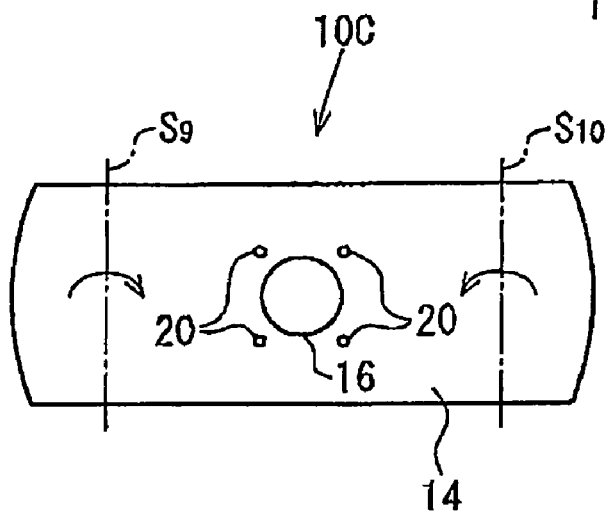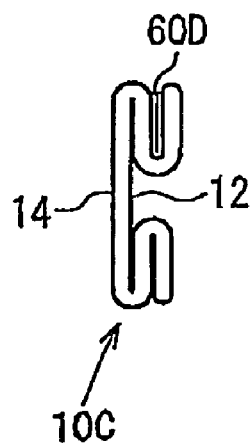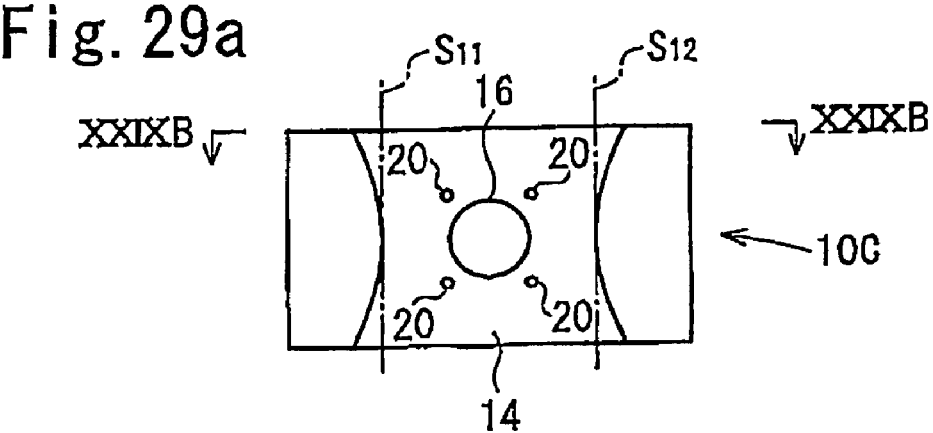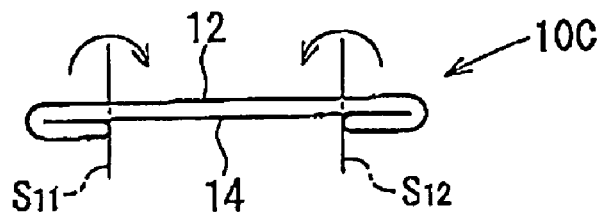

AIRBAG AND AIRBAG APPARATUS

TECHNICAL FIELD

The present invention relates to an airbag provided with a venthole for absorbing an impact by discharging a gas from an inside of the airbag to an outside of the airbag, and a lid member for covering the venthole, and the present invention relates to an airbag apparatus provided with the airbag.

BACKGROUND ART

It is well-known that a venthole is provided in an airbag, and that when an occupant or the like of a vehicle hits the expanded airbag, an impact applied to the occupant or the like of the vehicle is absorbed by means of discharging a gas from an inside of the airbag via the venthole.

In Japanese Unexamined Patent Application Publication No. 2000-16228, an airbag constructed such that the venthole is covered by a lid member until gas-pressure in the inside of the airbag reaches a predetermined pressure, and when the gas-pressure exceeds the predetermined pressure, the lid member is pushed open by the gas-pressure and the venthole is opened is described.

Incidentally, in the same publication, an airbag for use in a driver's seat of a vehicle is exemplified. The airbag in the same publication is formed by stitching each of peripheral edge portions of respective two round shaped sheet members (panels), and the entire airbag is formed to be one chamber. The venthole is provided in the sheet member on an opposite side that is opposite to a vehicle-occupant side of the airbag, and a lid member is provided so as to cover the venthole.

In the airbag in the same publication, when the airbag is expanded, since the venthole is covered by the lid member until the gas-pressure in the inside of the airbag reaches the predetermined pressure, and the discharge of the gas from the venthole is limited, the inside of the airbag rapidly reaches high pressure and the airbag is rapidly developed.

Further, when the gas-pressure in the inside of the airbag exceeds the predetermined pressure, since the id member is pushed open and the venthole is opened, in a case that the vehicle-occupant hits the expanded airbag, the gas is discharged from the inside of the airbag via the venthole and thereby the impact applied to the vehicle-occupant is absorbed.

[Patent Document 1] Japanese Unexamined Patent Application Publication No. 2000-16228

In the aforementioned Japanese Unexamined Patent Application Publication No. 2000-16228, there is a possibility that when the pressure in the inside of the airbag rises to the predetermined pressure or more, even when the stage is that before the occupant hits the airbag, the venthole is opened and the gas is needlessly discharged from the venthole.

SUMMARY OF THE INVENTION

It is an object of the present invention to provide an airbag and an airbag apparatus in which the venthole is closed or opened by a small amount until the occupant hits the airbag, and when the occupant hits the airbag, the venthole is opened or opened by a large amount.

The airbag according to the present invention is characterized in that in an airbag including a venthole and a lid member for covering the venthole from an outside of the airbag, the venthole is provided on a surface on an opposite side that is opposite to an occupant-facing surface of the airbag, or on a side surface of the airbag in an expanded state, and at least one end side of the lid member is coupled with the airbag and the other end side thereof is not coupled therewith, and a constantly-open type venthole is provided in an area in the airbag on the other end side of the lid member, which is not covered by the lid member, and a connecting member for connecting the other end side of the lid member and the occupant-facing surface upon passing through the constantly-open type venthole and an inside of the airbag is provided, and when the airbag is expanded, the lid member is under strain along an outer surface of the airbag and is made to overlap with the venthole by being pulled in a direction where the other end of the lid member becomes separated from the one end side via the connecting member, and thereby the venthole is closed or opened by a small amount, and the lid member becomes separated from the venthole by an occupant coming into contact with the expanded airbag and causes the occupant-facing surface to retreat, and thereby the venthole is opened or opened by a large amount.

The airbag apparatus according to the present invention is formed by including the airbag according to the present invention and the gas-generator for supplying a gas into the airbag.

BRIEF DESCRIPTION OF DRAWINGS

FIG. 18b is a cross-sectional view taken along a line XVIIIB-XVIIIB in FIG. 18a.

FIG. 22a and FIG. 22b are a cross-sectional view and a side elevation, respectively, illustrating a state before the passenger airbag according to the embodiment is folded back.

FIG. 23a is a plan view looking from above, illustrating a state in the middle of a folding back operation of the passenger airbag in FIG. 22a, and FIG. 23b is a fragmentary view in the direction of the arrows XXIIIB-XXIIIB in FIG. 23a, and FIG. 23c is a cross-sectional view taken along a line XXIIIC-XXIIIC in FIG. 23a.

FIG. 24a is a plan view looking from below, illustrating a state in the middle of the folding back operation of the passenger airbag in FIG. 22a, and FIG. 24b is a fragmentary view in the direction of the arrows XXIVB-XXIVB in FIG. 24a.

FIG. 25b is a fragmentary view in the direction of arrows XIVB-XXVB in FIG. 25a.

FIG. 26b is a fragmentary view in the direction of the arrows XXVIB-XXVIB in FIG. 26a, and FIG. 26c is a cross-sectional view taken along a line XXVIC-XXVIC in FIG. 26a.

FIG. 27a is a plan view illustrating a state in the middle of a folding back operation of the airbag for use in a driver's seat in FIG. 26a, FIG. 27b is a fragmentary view in the direction of arrows XXVIIB-XXVIIB in FIG. 27a, and FIG. 27c is a cross-sectional view taken along a line XXVIIC-XXVIIC in FIG. 27a.

FIG. 28 is a plan view illustrating a state in the middle of the folding back operation of the airbag for use in a driver's seat in FIG. 26a, and FIG. 28b is a fragmentary view in the direction of arrows XXVIIIB-XXVIIIB in FIG. 28a.

FIG. 29a is a plan view illustrating a state in the middle of the folding back operation of the airbag for use in a driver's seat in FIG. 26a, and FIG. 29b is a fragmentary view in the direction of arrows XXIXB-XXIXB in FIG. 29a.

FIG. 30b is a fragmentary view in the direction of arrows XXXB-XXXB in FIG. 30a.

FIG. 33b is an enlarged view (front elevation) illustrating a predetermined tear portion of a tether in FIG. 33a.

DETAILED EXPLANATION

Figure 1:
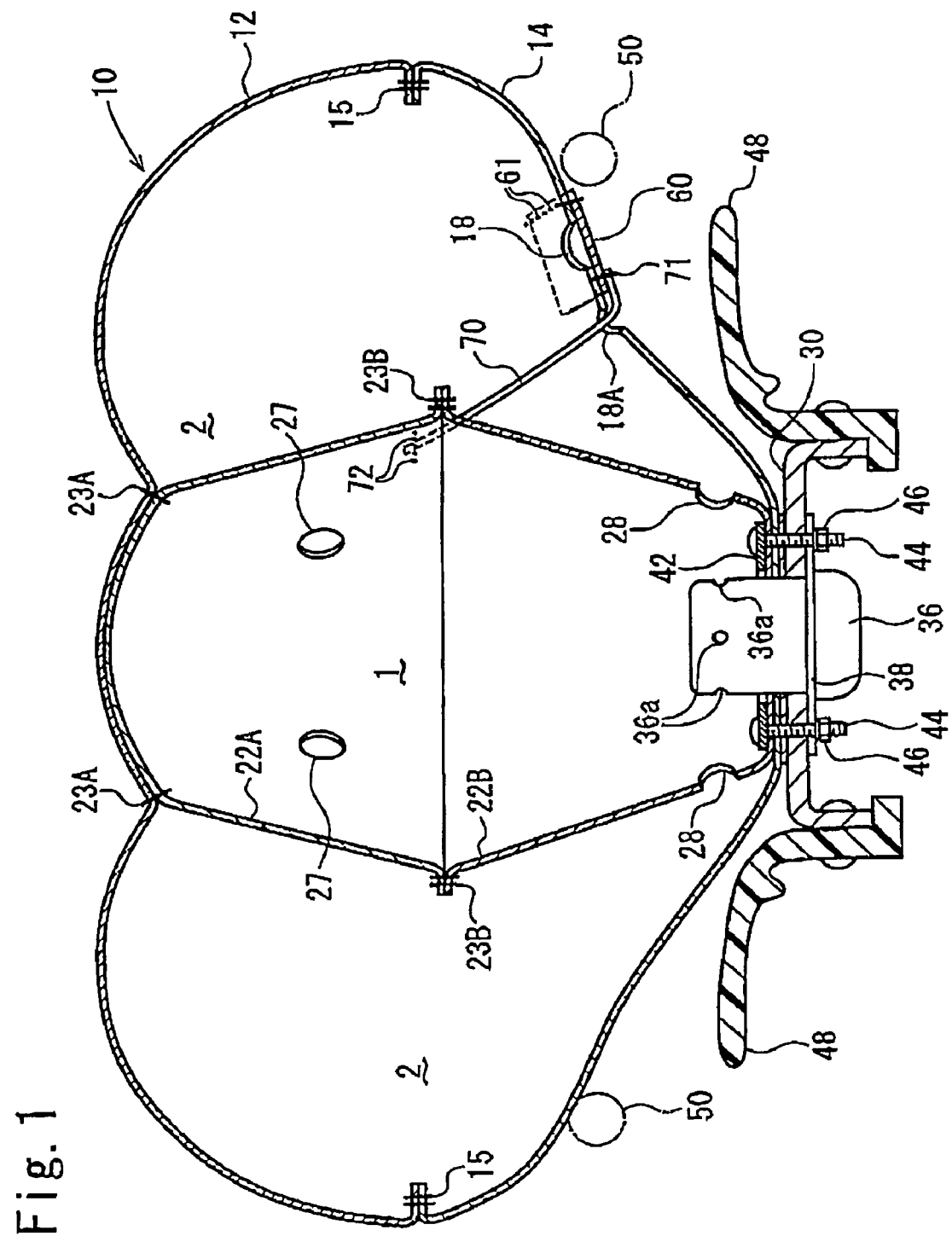
FIG. 1 is a cross-sectional view illustrating an airbag and an airbag apparatus according to an embodiment.

An airbag according to a first aspect is characterized in that in an airbag including a venthole and a lid member for covering the venthole from an outside of the airbag, the venthole is provided on a surface on an opposite side that is opposite to an occupant-facing surface of the airbag, or on a side surface of the airbag in an expanded state, and at least one end side of the lid member is coupled with the airbag and the other end side thereof is not coupled therewith, and a constantly-open type venthole is provided in an area in the airbag on the other end side of the lid member, which is not covered by the lid member, and a connecting member for connecting the other end side of the lid member and the occupant-facing surface upon passing through the constantly-open type venthole and an inside of the airbag is provided, and when the airbag is expanded, the lid member is under strain along an outer surface of the airbag and is made to overlap with the venthole by being pulled in a direction where the other end of the lid member becomes separated from the one end side via the connecting member, and thereby the venthole is closed or opened by a small amount, and the lid member becomes separated from the venthole by an occupant coming into contact with the expanded airbag and causes the occupant-facing surface to retreat, and thereby the venthole is opened or opened by a large amount.

The airbag according a second aspect is characterized in that in first aspect, the lid member is integrally constructed with a panel constituting the outer surface of the airbag.

The airbag according to a third aspect is characterized in that in the second aspect, the airbag includes a front panel constituting the occupant-facing surface, and a rear panel constituting a surface on the opposite side that is opposite thereto, and the lid member is constructed with an extending piece that integrally extends from at least one of the front panel or the rear panel.

The airbag according to a fourth aspect is characterized in that in any one of the first to third aspect, in the airbag, an internal member that couples the occupant-facing surface of the airbag in an expanded state and the opposite side is provided, and the connecting member is coupled with the internal member.

The airbag according to a fifth aspect is characterized in that in the fourth aspect, the internal member is an inner panel for partitioning the inside of the airbag into a first chamber in the center of the airbag and a second chamber surrounding the first chamber, and in the inner panel, a communicating portion for allowing the first chamber and the second chamber to communicate with each other is provided, and the airbag is constructed in such a way that the first chamber is expanded first by a gas being introduced into the first chamber, and then the second chamber is expanded by the gas flowing into the second chamber from the first chamber via the communicating portion, and the venthole is a venthole that allows the second chamber and the outside of the airbag to communicate with each other.

The airbag according to a sixth aspect is characterized in that in any one of the first to fifth aspect, an auxiliary lid member for covering the venthole from the inside of the airbag is provided, and wherein when the lid member is in a state of closing the venthole, the auxiliary lid member covers the venthole from the inside of the airbag, and when a closing operation for the venthole by the lid member is stopped, the auxiliary lid member is pushed outside the airbag from the venthole by gas-pressure in the airbag and opens the venthole.

The airbag according to a seventh aspect is characterized in that in the sixth aspect, at least one end side of the auxiliary lid member is connected to a peripheral edge portion of the venthole, and the other end side is not connected to the peripheral edge portion of the venthole.

The airbag according to an eighth aspect is characterized in that in the seventh aspect, a plurality of the auxiliary lid members are provided in such a way that the position is deviated in a peripheral direction of the venthole.

The airbag according to an ninth aspect is characterized in that in any one of the first to eighth aspect, an end of a tubular nozzle is coupled with the venthole, and when the lid member is in the state of closing the venthole, the nozzle is disposed inside of the airbag, and when the closing operation for the venthole by the lid member is stopped, the nozzle is projected to outside of the airbag from the venthole by being pressed by means of the gas-pressure in the airbag.

The airbag according to a tenth aspect is characterized in that in any one of the first to ninth aspect, the lid member is made to overlap with the venthole from a starting time of an expanding operation of the airbag.

The airbag according to eleventh aspect is characterized in that in the tenth aspect, the airbag is in a folded back state before the airbag is expanded, and when the airbag is folded back, the lid member and the airbag are integrally folded back along a folding line extending so as to traverse the venthole, in a state where the lid member is made to overlap with the venthole.

The airbag according to twelfth aspect is characterized in that in the tenth aspect, a holding device for holding the lid member in a state to be overlapped with the venthole is provided.

The airbag according to a thirteenth aspect is characterized in that in the twelfth aspect, the holding device is an overhanging portion overhanging sideward from a side edge of the connecting member, and the overhanging portion is in contact with a peripheral edge portion of the constantly-open type venthole from the inside of the airbag, in a state that the lid member is made to overlap with the venthole, and the connecting member is drawn inside of the airbag to an extent that the connecting member is made to extend along the outer surface of the airbag between the lid member and the constantly-open type venthole without substantially loosening.

The airbag according to a fourteenth aspect is characterized in that in the tenth aspect, in the state that the lid member is made to overlap with the venthole, the other end side of the lid member is disconnectably connected to the venthole-peripheral edge portion of the airbag by means of a connecting device, and the connecting device releases the connection of the lid member and the venthole-peripheral edge portion when internal pressure of the airbag is brought to a predetermined pressure or more.

The airbag according to a fifteenth aspect is characterized in that in the fourteenth aspect, the connecting device is a tear seam that is torn when predetermined tensile force or more is applied.

The airbag according to a sixteenth aspect is characterized in that in any one of the first to fifteenth aspect, a width of the connecting member in a direction perpendicular to an insertion direction of the constantly-open type venthole is greater than a width of the constantly-open type venthole.

The airbag according to a seventeenth aspect is characterized in that in any one of the first to sixteenth aspect, an opening area of the venthole is greater than an opening area of the constantly-open type venthole.

The airbag according to an eighteenth aspect is characterized in that in the seventeenth aspect, the opening area of the venthole is four times the opening area or more of the constantly-open type venthole.

The airbag according to a nineteenth aspect is characterized in that in any one of the first to eighteenth aspect, coupling-releasing device for releasing the coupling of the lid member and the occupant-facing surface of the airbag by means of the connecting member is released when the internal pressure of the airbag is brought to a predetermined pressure or more is provided.

The airbag according to a twentieth aspect is characterized in that in the nineteenth aspect, the coupling-releasing device is formed of a fragile portion provided in the connecting member, and the coupling of the lid member and the occupant-facing surface of the airbag is released by that the connecting member is torn at the fragile portion when the internal pressure of the airbag is brought to the predetermined pressure or more.

The airbag according to a twenty-first aspect is characterized in that in any one of the first to twentieth aspect, a detent device for blocking the connecting member to return inside of the airbag after the connecting member is pulled outside of the airbag upon passing through the constantly-open type venthole, along with the lid member becoming separated from the venthole, is provided.

The airbag according to a twenty-second aspect is characterized in that in the twenty-first aspect, as the detent device, an overhanging portion overhanging sideward from the side edge of the connecting member is provided at a halfway portion in a longitudinal direction of the connecting member, and the connecting member is blocked from returning to the inside of the airbag by the overhanging portion coming into contact with a peripheral edge portion of the constantly-open type venthole from outside of the airbag, after the connecting member is pulled outside of the airbag upon passing through the constantly-open type venthole along with the lid member becoming separated from the venthole.

The airbag according to a twenty-third aspect is characterized in that in the twenty-second aspect, the overhanging portion is in contact with the peripheral edge portion of the constantly-open type venthole from inside of the airbag, in a state that the lid member is made to overlap with the venthole, and the connecting member is drawn inside of the airbag to an extent that the connecting member is made to extend along the outer surface of the airbag between the lid member and the constantly-open type venthole without substantially loosening.

The airbag according to a twenty-fourth aspect is characterized in that in any one of the first to twenty-third aspect, an insertion portion of the connecting member is provided in an airbag-inside surface of the occupant-facing surface, and one end of the connecting member is coupled with the lid member and a halfway portion in a longitudinal direction of the connecting member is inserted into the insertion portion.

The airbag according to a twenty-fifth aspect is characterized in that in the twenty-fourth aspect, coupling device for releasably coupling the other end side of the connecting member with the opposite side that is opposite to the occupant-facing surface, and coupling-releasing device for releasing the coupling by means of the coupling device are provided.

An airbag apparatus according to a twenty-sixth aspect is characterized in that in an airbag apparatus provided with the airbag and a gas-generator for supplying a gas into the airbag, the airbag is the airbag according to any one of the first to twenty-fifth aspect.

In the airbag and the airbag apparatus according to the first to twenty-sixth aspect, in a case that the airbag is expanded, the connecting member is pulled inside of the airbag along with that the occupant-facing surface of the airbag is expanded out to the occupant side, and the other end side of the lid member is pulled in a direction to be separated from one end side via the connecting member. Thereby, the lid member is under strain along the outer surface of the airbag and is made to overlap with the venthole, and the venthole is closed or opened by a small amount by means of the lid member. Therefore, a discharge of the gas from the venthole is limited, and the airbag is rapidly expanded.

When the occupant hits the expanded airbag, the occupant-facing surface of the airbag is pushed by the occupant and retreated, and the force to pull the connecting member inside of the airbag is released. As a result, a strain of the lid member is released, and the lid member becomes separated from the venthole by the gas-pressure in the airbag, and the venthole is opened or opened by a large amount. Thereby, the gas is discharged outside of the airbag from the venthole, and an impact applied to the occupant is absorbed.

In the present invention, as described in the second aspect, the lid member may be integrally constructed with a panel constituting the outer surface of the airbag. By thus constructing, a stitching work for the airbag can be simplified.

In this case, as described in the third aspect, an extending piece that integrally extends from the panel may be provided in at least one of the front panel constituting the occupant-facing surface of the airbag and the rear panel constituting an opposite side surface to the occupant, and the lid member may be constructed by the extending piece. In this case, the lid member can easily be constructed.

The connecting member may be a connecting member directly connecting the lid member and the occupant-facing surface, and as described in the fourth aspect, in a case that an internal member for coupling the occupant-facing surface of the airbag with the opposite side surface to the occupant is provided in side of the airbag, it may be applicable to construct in such away that the connecting member is coupled with the internal member, and the lid member and the occupant-facing surface is connected via the internal member.

In a case that the construction is made as described in the fourth aspect, the internal member is extended to the occupant side along with the expanding operation of the airbag, and the lid member is pulled inside of the airbag by means of the internal member. Thereby, the lid member is under strain along the outer surface of the airbag and is made to overlap with the venthole. Further, when the airbag receives the occupant and the occupant-facing surface is retreated, the internal member is loosened and the strain of the connecting member is released, and the lid member becomes separated from the venthole.

In the fifth aspect, firstly, the gas is introduced into the first chamber in the center of the airbag, which is surrounded by the internal panel serving as the internal member, and the first chamber is expanded, and the inner panel is extended to the occupant side therealong. Since the first chamber has a small capacity compared to an entire airbag, and the first chamber is not allowed to directly communicate with the venthole, the first chamber is rapidly expanded. Therefore, the connecting member is pulled inside of the airbag in early time by the inner panel and the lid member is made to overlap with the venthole, and the venthole is closed or opened by a small amount. As a result, the gas in the second chamber is limited to be discharged outside of the airbag via the venthole, and the second chamber is also relatively rapidly brought to have high internal pressure, and an expanding and developing operation of the entire airbag is hastened.

Incidentally, in the airbag according to the present invention, since the venthole where the connecting member is inserted is that of the constantly-open type, the gas is mainly discharged outside of the airbag from this constantly-open type venthole even at the time when the airbag is expanded.

In the sixth aspect, when the venthole is in a state of being closed by the lid member, the venthole is covered by means of an auxiliary lid member also from the inside of the airbag.

Namely, when the venthole is in the state of being closed by the lid member, the auxiliary lid member is supported by means of the lid member from outside of the airbag via the venthole, and thereby there is no possibility of being pushed outside of the airbag from the venthole by the gas-pressure in the airbag, and is attached firmly to the peripheral edge portion of the venthole from inside of the airbag and closes the venthole. Therefore, the closing performance of the venthole is good.

Furthermore, when the closing operation for the venthole by the lid member is stopped, the auxiliary lid member loses the support by the lid member from outside of the airbag, and is pushed outside of the airbag from the venthole by the gas-pressure in the airbag. Thereby, the venthole is brought to an open state, and the gas in the airbag is brought to be discharged from the venthole.

As described in the seventh aspect, in a case that at least one end side of the auxiliary lid member is connected to the peripheral edge portion of the venthole, and the other end side is not connected to the peripheral edge portion of the venthole, the other end side of the auxiliary lid member is pushed out from the venthole when the venthole is opened, and is extended outside of the airbag along the peripheral edge portion of the venthole. Thereby, a gas-discharging direction from the venthole is limited by means of the auxiliary lid member, and the gas that is discharged from the venthole is not diffused around a periphery of the venthole, and is brought to be easily flow toward the lid member. As a result, the lid member is brought to be rapidly separated from the outer surface of the airbag.

Specifically, as described in the eighth aspect, in a case that the auxiliary lid member in the sixth aspect is provided plural in number while deviating the position in the peripheral direction of the venthole, when the other end side of each of the auxiliary lid members is pushed out from the venthole at the time when the venthole is opened, these surround the venthole and becomes to have a shape like a nozzle. Thereby, the gas is brought to strongly blow out from the venthole to the lid member, and the separating operation of the lid member from the outer surface of the airbag is speeded up.

In the ninth aspect, when the closing operation of the venthole by the lid member is stopped, the nozzle continuing into the venthole is pushed outside of the airbag from the venthole by the pressure in the airbag. Moreover, the gas is brought to be discharged outside of the airbag upon passing through the nozzle. In this aspect, by appropriately setting a length of the nozzle, the time from when the occupant hits the expanded airbag and the airbag starts to be crushed, to when the gas starts to be discharged outside of the airbag upon passing through the nozzle, and an opening amount of the nozzle at that time can be controlled.

In the present invention, as described in the tenth aspect, it is preferable to have the state that the lid member is made to overlap with the venthole from the starting time of the expanding operation of the airbag. When the lid member is made to overlap with the venthole from the starting time of the expanding operation of the airbag as described above, even at a stage before the connecting member is pulled inside of the airbag by means of the internal member and strained, the gas in the airbag can be prevented from being discharged from the venthole, or can be suppressed to be discharged from the venthole.

In the eleventh aspect, when the airbag is folded back, the lid member is made to overlap with the venthole, and the lid member and the airbag are integrally folded back along a folding line extending so as to traverse the venthole.

In a case that the lid member and the airbag is thus folded back, at the time when the airbag is expanded, since the lid member is difficult to be separated from the venthole until the fold of the lid member and the venthole-peripheral portion of the airbag is released, a state in which the lid member is made to overlap with the venthole is held from the starting time of the expanding operation of the airbag.

In the eleventh aspect, since it is sufficient that the lid member and the airbag are only integrally folded back upon overlapping the lid member with the venthole, and there is no need to provide a construction member for blocking the lid member from being separated from the venthole, and the cost is low.

In the twelfth aspect, since the holding device for holding the lid member in a state to be overlapped with the venthole is provided, the lid member is held in the state to be assuredly overlapped with the venthole from the starting time of the expanding operation of the airbag.

In this case, as described in the thirteen aspect, as the holding device, it is simple to provide the overhanging portion overhanging sideward from the side edge of the connecting member, and to construct that the overhanging portion is in contact with a peripheral edge portion of the constantly-open type venthole from the inside of the airbag, in a state that the lid member is made to overlap with the venthole, and the connecting member is drawn inside of the airbag to an extent that the connecting member is made to extend along the outer surface of the airbag between the lid member and the constantly-open type venthole without substantially loosening. In this case, in a state that the lid member is made to overlap with the venthole, since the pulling-out operation for the connecting member outside of the airbag is limited by means of the overhanging portion, the lid member is held in the state of being overlapped with the venthole.

Incidentally, in the present invention, the state that the connecting member is made to extend along the outer surface of the airbag between the lid member and the constantly-open type venthole without substantially loosening refers to the state that the lid member does not have to be extended while being pulled in a manner so as to be attached firmly to the outer surface of the airbag between the lid member and the constantly-open type venthole.

In the fourteenth aspect, in a state that the lid member is made to overlap with the venthole, an end portion of the constantly-open type venthole side of the lid member is disconnectably connected to the peripheral edge portion of the venthole of the airbag by means of the connecting device. Thereby, even when the connecting member is not pulled toward the inside of the airbag by means of the internal member, the lid member is held in a state of assuredly overlapping the venthole.

Incidentally, the connecting device is constructed to release the connection of the lid member and the venthole-peripheral edge portion when the internal pressure of the airbag is brought to a predetermined pressure or more. Accordingly, when the occupant hits the expanded airbag, the connection by means of the connecting device is released, and the lid member is assuredly opened and the venthole is opened.

As described in the fifteenth aspect, a tear seam that is torn when the predetermined tensile force or more is applied is easy-to-use and preferable, as this connecting device.

In the sixteenth aspect, since the width of the connecting member is greater than the width of the constantly-open type venthole, when the connecting member passes through the constantly-open type venthole, the both end sides in a width direction of the connecting member is grazed with the inner peripheral edge of the constantly-open type venthole, and a friction resistance is generated. Since the movement of the connecting member from the constantly-open type venthole to the lid member side and the inside of the airbag is limited by the friction resistance, the lid member does not tend to deviate. Accordingly, when the airbag is folded back, even when the lid member is held in, it becomes possible to fold back the airbag remaining the lid member to be disposed at a predetermined position, and the folding back work for the airbag can be performed with ease.

Further, in the present aspect, at the initial stage of the expanding operation of the airbag, where the internal pressure of the airbag is relatively low, even when the lid member is not pulled inside of the airbag by means of the internal member, since the connecting member is difficult to move to the lid member side from the constantly-open type venthole by means of the friction resistance, an effect that the lid member is held in the state of covering the venthole is also achieved.

In the present invention, as described in the seventeenth aspect, it is preferable for the opening area of the venthole to be greater than the opening area of the constantly-open type venthole, and specifically, as described in the eighteenth aspect, it is preferable for the opening area of the venthole to be four times the opening area of the constantly-open type venthole, or more.

By thus constructing, the gas can be suppressed to be discharged from the constantly-open type venthole.

In the nineteenth aspect, the connection releasing device for releasing the connection of the lid member and the occupant-facing surface of the airbag by means of the connecting member when the internal pressure of the airbag is brought to a predetermined pressure or more is provided. In the nineteenth aspect, even when the lid member does not performs an opening operation by that the occupant presses the occupant-facing surface of the expanded airbag, when the internal pressure of the airbag is brought to the predetermined pressure or more, the connection of the lid member and the occupant-facing surface of the airbag by the connecting member is released, and thereby the lid member becomes separated from the venthole and the venthole is opened, and the gas is brought to be discharged outside of the airbag.

In this case, as described in the twentieth aspect, it is easy-to-use to construct in such a way that a fragile portion is provided in the connecting member, and the connecting member is torn at the fragile portion when the internal pressure of the airbag is brought to the predetermined pressure or more.

In the twenty-first aspect, a detent device that blocks the connecting member inside of the airbag after the connecting member is pulled out side of the airbag upon passing through the constantly-open type venthole along with the lid member becoming separated from the venthole is provided. Therefore, it can be prevented that the connecting member is drawn inside of the airbag after the lid member starts to be opened, and the lid member is closed.

In this case, as described in the twenty-second aspect, it is easy-to-use to construct that the overhanging portion overhanging sideward from the side edge of the connecting member is provided at the halfway portion in the longitudinal direction of the connecting member, and that the overhanging portion comes in contact with the peripheral edge portion of the constantly-open type venthole from the outside of the airbag after the connecting member is pulled outside of the airbag upon passing through the constantly-open type venthole along with the separating operation of the lid member from the venthole, and thereby the connecting member is blocked from returning to the inside of the airbag.

In the twenty-third aspect, the overhanging portion is constructed to be in contact with the peripheral edge portion of the constantly-open type venthole from the inside of the airbag, in a state that the lid member is made to overlap with the venthole, and the connecting member is drawn inside of the airbag to an extent that the connecting member is made to extend along the outer surface of the airbag between the lid member and the constantly-open type venthole without substantially loosening.

Accordingly, in the present aspect, by overlapping the lid member with the venthole and by drawing the connecting member inside of the airbag until the overhanging portion enters inside of the airbag upon passing through the constantly-open type venthole, the pulling-out operation for the connecting member outside of the airbag is limited by means of the overhanging portion, and thereby the lid member is held in the state of being overlapped with the venthole.

That is, in the present aspect, the overhanging portion serves as both of the holding device for holding the lid member in a state of overlapping with the venthole at a stage when the airbag starts to be expanded, and the detent device for blocking the connecting member from returning inside of the airbag after the connecting member is pulled outside of the airbag upon passing through the constantly-open type venthole along with the separating operation of the lid member from the venthole.

By thus constructing, there is no need to separately provide the holding device and the detent device in the airbag, and the construction of the airbag can be simplified.

In the twenty-fourth aspect, even in a case that a retreating amount of the occupant-facing surface is small, a separating amount of the lid member from the venthole can be increased.

In the twenty-fifth aspect, even in a case that the retreating amount of the occupant-facing surface is small, the venthole can be opened by forcibly releasing the restraint of the lid member by the connecting member, by releasing the coupling of the connecting member by means of the coupling device by the coupling-releasing device.

BEST MODES FOR CARRYING OUT THE INVENTION

Hereinbelow, an embodiment of the present invention is explained with reference to the drawings.

Figure 2:
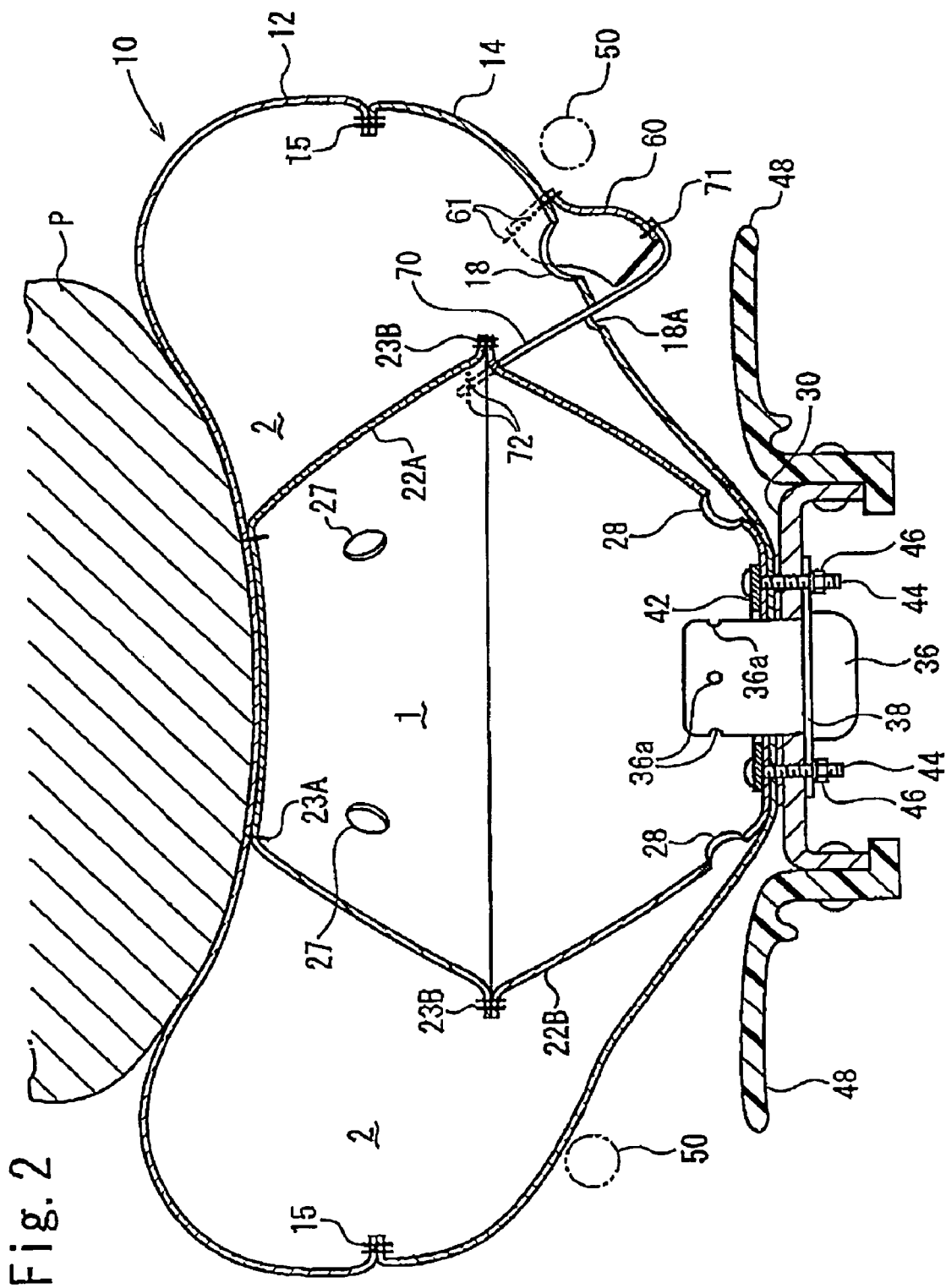
FIG. 2 is a cross-sectional view illustrating the airbag and the airbag apparatus in FIG. 1, when an occupant is received.
Figure 3:
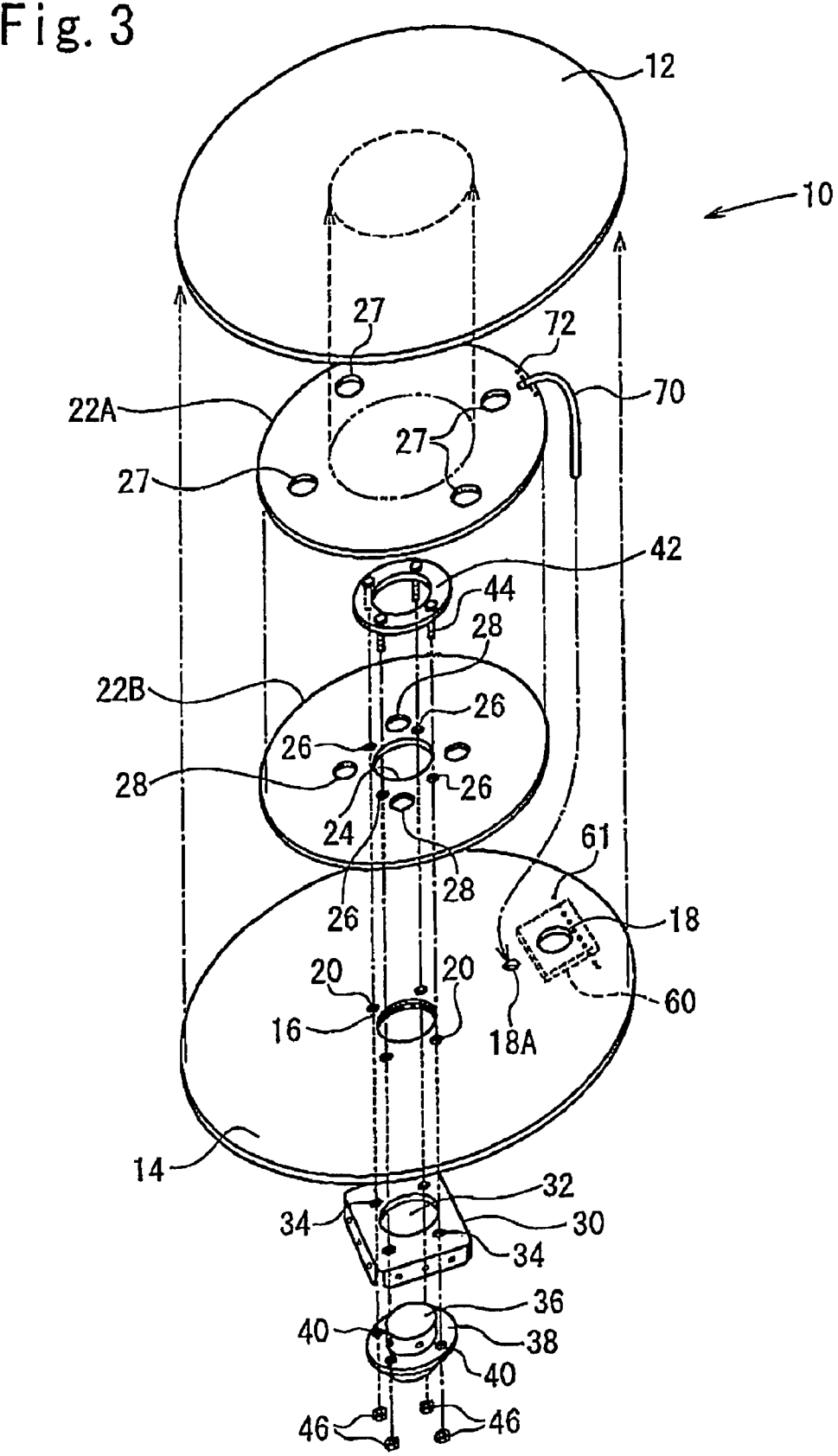
FIG. 3 is an exploded perspective view illustrating the airbag and the airbag apparatus in FIG. 1.
Figure 4A:
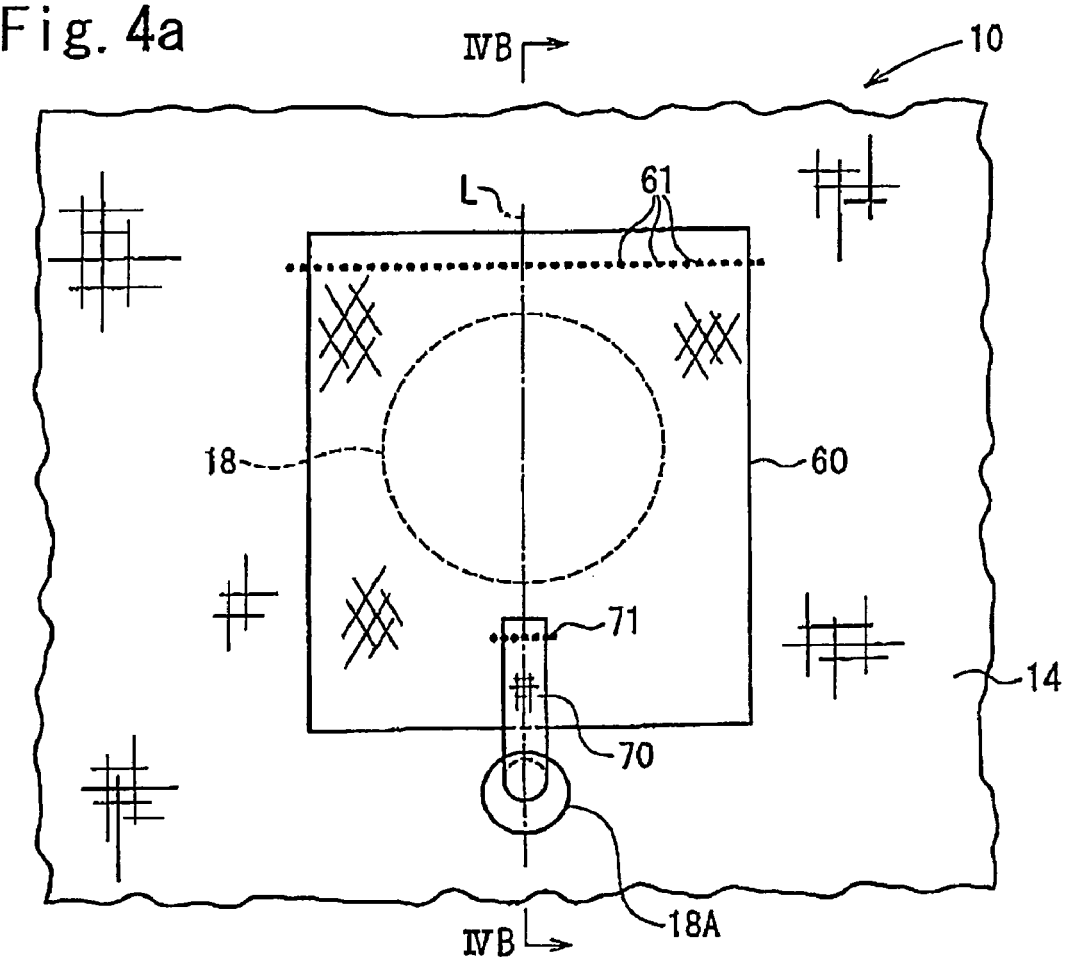
FIG. 4a is a plan view illustrating the vicinity of the venthole of the airbag in FIG. 1, and FIG. 4b and FIG. 4c are cross-sectional views taken along a line IVB-IVB in FIG. 4a, respectively.
Figure 4B:
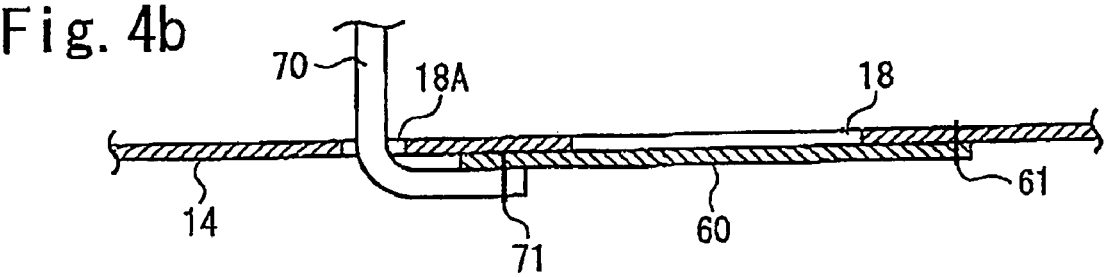
Figure 4C:
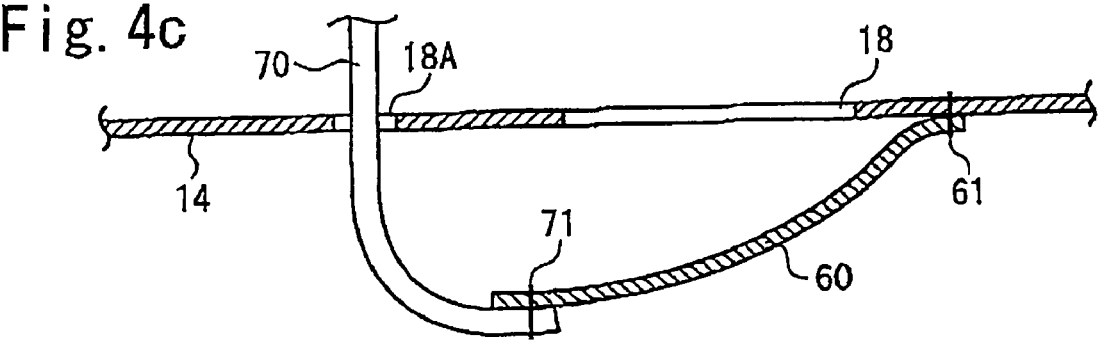

FIG. 1 and FIG. 2 are cross-sectional views illustrating an airbag and an airbag apparatus according to an embodiment, FIG. 3 is an exploded perspective view illustrating the airbag and the airbag apparatus, FIG. 4a is a plan view illustrating the vicinity of a venthole of the airbag. FIG. 4b and FIG. 4c are cross-sectional views taken along a line IVB-IVB in FIG. 4a, respectively. Incidentally, FIG. 4a is a view illustrating the vicinity of the venthole of the airbag, looking from an outside the airbag. Further, FIG. 4b illustrates a state when the venthole is closed by means of a lid member, and FIG. 4c illustrates a state when the venthole is opened.

In this embodiment, an airbag 10 is an airbag for use in a driver's seat of a vehicle.

This airbag 10 is provided with a front panel 12 constituting an occupant-facing surface, a rear panel 14 constituting an outer surface on the opposite side that is opposite to the occupant-facing surface, first and second inner panels 22A and 22B serving as internal members for partitioning an inside of the airbag 10 into a first chamber 1 and a second chamber 2, ventholes 18 and 18A for allowing the second chamber 22 and an outside of the airbag 10 to communicate with each other, a lid member 60 for limiting a discharge of a gas from the venthole 18 while covering the venthole 18 from an outside the airbag 10, a tether 70 serving as a connecting member for coupling the lid member 60 with an inner panel 22A via the venthole 18A, and so forth.

The front panel 12, the rear panel 14, the first and second inner panels 22A and 22B are respectively formed of a round woven cloth. The front panel 12 and the rear panel 14 have approximately the same diameter, and are formed into a bag shape by means of that each of outer peripheral edge portions thereof is stitched by means of a seam 15. The seam 15 is provided in a circular-ring shaped manner along an outer periphery of the front panel 12 and the rear panel 14. The seam 15 is formed of a stitching thread or the like, however, is not limited to be formed of the above-described.

In the rear panel 14, an opening 16 for use in an inflator (gas-generator), and the ventholes 18 and 18A are provided. The opening 16 is disposed at a center of the rear panel 14. Further, around a periphery of the opening 16, bolt insertion holes 20 penetrating the rear panel 14 are provided. The ventholes 18 and 18A are, in this embodiment, disposed while lining manner in a radial direction of the rear panel 14, and the venthole 18A is positioned on the center side of the rear panel 14 relative to the venthole 18.

The lid member 60 is formed of a woven cloth having an approximately rectangular shape in this embodiment, and disposed on the outer surface side of the rear panel 14, while the longitudinal direction of the lid member 60 serves as a radial direction of the rear panel 14, and covers the venthole 18. The venthole 18A is disposed in an area that is not covered by the lid member 60 in the rear panel 14, and is constantly allows the inside and outside of the airbag 10 to communicate with each other. As illustrated in FIG. 4a, the lid member 60 is disposed in a manner such that a center line L in a width direction of the lid member 60 passes through the vicinity of a center of the ventholes 18 and 18A. In a peripheral edge portion of this lid member 60, an end portion on the opposite side that is opposite to the venthole 18A while sandwiching the venthole 18, namely an end portion positioned on an outer periphery side of the rear panel 14 is stitched to the rear panel 14 by means of a seam 61.

However, a disposition of each of the ventholes 18 and 18A, a shape of the lid member 60, a stitching position of the lid member 60 to the rear panel 14, or the like is not limited thereto. For example, the ventholes 18 and 18A may be disposed in a lining manner in a peripheral direction of the rear panel 14. The lid member 60 is sufficient that an end portion thereof on the venthole 18A side in a peripheral edge portion is not connected to the rear panel 14, and for example, three sides of the end portion on the opposite side that is opposite to the venthole 18A while sandwiching the venthole 18, and a pair of facing sides perpendicular thereto may be stitched to the rear panel 14.

In the present invention, an opening square measure of the constantly-open type venthole 18A is preferable to be from 18 to 2900 mm$^2$, specifically from 18 to 710 mm$^2$, and more specifically from 18 to 320 mm$^2$. If the opening square measure of the constantly-open type venthole 18A is 18 mm² or less, it becomes difficult to insert the tether 70 into the constantly-open type venthole 18A, and it takes a lot of trouble for the inserting work of the tether 70. Further, if the opening square measure of the constantly-open type venthole 18A is 2900 mm² or more, a discharging amount of the gas from the constantly-open type venthole 18A at a time when the airbag is expanded is excessively increased.

Furthermore, in the present invention, the opening square measure of the venthole 18 is preferable to be four times that of the constantly-open type venthole 18A or more, specifically, from 6 to 200 times, and more specifically, from 25 to 145 times. By means of thus constructing, at a time when the airbag is expanded, when the venthole 18 is opened, the gas can be sufficiently discharged from the venthole 18, while suppressing the discharge of the gas from the constantly-open type venthole 18A.

The aforementioned first inner panel 22A and the second inner panel 22B are provided in the inside of the airbag 10. The first and the second inner panels 22A and 22B, respectively, are approximately concentrically disposed with the front panel 12 and the rear panel 14, and each of the outer peripheral edge portions thereof is stitched by means of a seam 23B. By means of the first and second inner panels 22A and 22B, respectively, the inside of the airbag 10 is partitioned into the first chamber 1 at a center and the second chamber 2 surrounding the first chamber 1. The first chamber 1 is located inside the inner panels 22A and 22B.

In a state that a center portion of the first inner panel 22A on a front panel 12 side, namely the airbag 10 is expanded, a portion to be a tip end side of the inner panel 22A is stitched to the center portion of the front panel 12 by means of a seam 23A.

In a state that a center portion of the second inner panel 22B on a rear panel 14 side, namely the airbag 10 is expanded, at a portion to be a rear end side of the second inner panel 22B, an opening 24 for use in an inflator, which is disposed in an approximately concentric manner with the opening 16 for use in an inflator of the rear panel 14 is provided. Moreover, around a periphery of the opening 24 of the inner panel 22B, the bolt insertion holes 26 that are overlapped with the bolt insertion holes 20 of the rear panel 14 are disposed.

In the first and second inner panels 22A and 22B, respectively, continuous holes 27 and 28 serving as communicating portions that allow the first chamber 1 and the second chamber 2 to communicate with each other are provided. In this embodiment, the continuous hole 28 of the second inner panel 22B is provided relatively close to the opening 24 for use in an inflator, and is disposed on an extension line in a gas-blowing out direction of an inflator 36, described later, which is disposed in the first chamber 1 via the openings 16 and 24 for use in an inflator, namely is disposed in a manner so as to face a gas-blowing outlet 36a of the inflator 36. However, the disposition of the continuous holes 27 and 28 is not limited to the above-described.

Incidentally, a patch or the like for reinforcing may be attached to peripheral edge portions of the openings 16 and 24, the continuous holes 27 and 28, and the ventholes 18 and 18A.

In this embodiment, the first inner panel 22A and the lid member 60 are coupled by means of the tether 70 serving as a connecting member. As illustrated in FIG. 4a through FIG. 4c, the tether 70 is pulled outside the airbag 10 while an end side of which is inserted into the above-described constantly-open type venthole 18A and is stitched to an end portion on the venthole 18A side in the peripheral edge portion of the lid member 60, namely to an end portion on an opposite side that is opposite to an end portion that is stitched to the rear panel 14 by the seam 61, by means of a seam 71. The other end side of the tether 70 is stitched to the inner panel 22A by means of a seam 72 in this embodiment. However, the stitching position of the other end side of the tether 70 is not limited thereto, and for example, may be stitched to the inner panel 22B, or may be directly stitched to an airbag-inside surface of the front panel 12.

In the present invention, a connecting position of the connecting member to the internal member is preferable to be disposed within a distance of from 0 to 80% of an entire length of the internal member from an end portion of the internal member of the occupant side to the end portion of the internal member on the opposite side that is opposite to the occupant, in a state that the airbag is expanded.

Namely, in this embodiment, the aforementioned other end side of the tether 70 is preferable to be stitched to the first inner panel 22A or the second inner panel 22B at a position within a distance of 0 to 80% of an interval of a tip end portion of the first inner panel 22A and a rear end portion of the second inner panel 22B, from the tip end portion of the first inner panel 22A, namely the seam 23A to the rear end side of the second inner panel 22B in a state that an expanding operation of the airbag 10 is completed as illustrated in FIG. 1.

Tentatively, the tether 70 is stitched to a position spaced apart at a distance of 80% or more of an interval of the tip end portion of the first inner panel 22A and the rear end portion of the second inner panel 22B from the tip end portion of the first inner panel 22A, namely the seam 23A, that is, to a position excessively close to the rear end of the second inner panel 22B, as illustrated in FIG. 2, even when the front panel 12 of the expanded airbag 10 is pushed and retreated by the occupant, and the first inner panel 22A and the second inner panel 22B are loosened, a moving amount of the tether 70 to the outside of the airbag along this movement is significantly small. In this case, the lid member 60 does not sufficiently leave from the venthole 18, and thereby there is a possibility that an opening amount of the venthole 18 becomes insufficient.

Incidentally, in this embodiment, although the tether 70 is a strap-shaped body separately provided from the inner panels 22A and 22B, and the lid member 60, the same may be integrally provided with at least one of the inner panels 22A and 22B, or may be integrally provided with the lid member 60.

In a retainer 30 for attaching this airbag 10, an inflator-attaching opening 32 is provided at a center, and bolt insertion holes 34 are provided therearound.

The inflator 36 has an approximately cylindrical shape, and the gas-blowing outlet 36a is provided in a side peripheral surface of a tip end side in a cylinder axis direction. In this embodiment, the gas-blowing outlet 36a is provided four in number at even intervals in a peripheral direction of the inflator 36. The inflator 36 is constructed so as to blow out the gas in a radiating direction from these gas-blowing outlets 36a. From a halfway portion in the cylinder axis direction of the inflator 36, namely a side peripheral surface on the rear end side relative to the gas-blowing outlet 36a, a flange 38 for fixing the inflator is projected. Bolt insertion holes 40 are provided in the flange 38. A tip end side of the inflator 36 is fitted into the inflator-attaching opening 32.

When the airbag 10 is attached to the retainer 30, the peripheral edge portion of the opening 24 for use in an inflator of the second inner panel 22B is made to overlap with a peripheral edge portion of the opening 16 for use in an inflator of the rear panel 14, and is further overlapped with the peripheral edge portion of the inflator-attaching opening 32 of the retainer 30. Further, stud bolts 44 of a pressing ring 42 are inserted into each of the bolt insertion holes 26, 20, 34, and 40 of the respective second inner panel 22B, the rear panel 14, the retainer 30, and the flange 38, and nuts 46 are fastened on the tip end thereof, and thus, the second inner panel 22B, the rear panel 14, and the inflator 36 are fixed to the retainer 30.

Thereby, the peripheral edge portion of the opening 24 for use in an inflator of the second inner panel 22B is continued into the peripheral edge portion of the opening 16 for use in an inflator of the rear panel 14, each of the outer peripheral edge portions of the first and second inner panels 22A and 22B, respectively, is continued thereinto, and a center portion of the first inner panel 22A is continued into the front panel 12.

Thereafter, the airbag apparatus is constructed by means of folding back the airbag 10, and attaching a module cover 48 to the retainer 30 in a manner so as to cover the folded-back body of the airbag 10. This airbag apparatus is installed in a steering wheel 50 of an automobile.

When vehicle where the thus constructed airbag apparatus is mounted on encounters a collision or the like, the inflator 36 is activated and the gas blows out into the airbag 10. The airbag 10 is expanded out by means of the gas and pushes open the module cover 48, and is developed into a vehicle interior.

In the airbag 10, the gas from the inflator 36 is supplied into the first chamber 1 first, and the first chamber 1 is expanded. At this moment, the first and second inner panel 22A and 22B, respectively, are extended toward the occupant side along with the expanding operation of the first chamber 1, and thereby the tether 70 is pulled toward the inside of the airbag 10. Thereby, as illustrated in FIG. 4b, an end portion in the lid member 60, which is on the opposite side that is opposite to the side that is connected to the rear panel 14 by means of the seam 61 is pulled in a direction to be spaced apart from the seam 61 via the tether 70, and an approximately entire lid member 60 is pulled and is brought to be attached firmly to an outer surface of the rear panel 14. As a result, the venthole 18 is closed by means of the lid member 60. Then, the gas flows into the second chamber 2 from the first chamber 1 via the continuous holes 27 and 28 and the second chamber 2 is expanded.

In the airbag 10, since the first chamber 1 has a smaller capacity compared to an entire airbag 10, and is not allowed to directly communicate with the ventholes 18 and 18B, the first chamber 1 is significantly rapidly expanded. Therefore, in an early time, the tether 70 is pulled toward the inside of the airbag and the lid member 60 is made to overlap with the venthole 18, and thereby the venthole 18 is closed. Incidentally, in the airbag 10, since the venthole 18A where the tether 70 is inserted is that of the constantly-open type, at the time when the airbag 10 is expanded, the gas is also discharged outside the airbag 10 mainly from the constantly-open type venthole 18A.

In this embodiment, since the continuous hole 28 allowing the first chamber 1 and the second chamber 2 to communicate with each other is disposed on the extension line in the gas-blowing out direction of the inflator 36 that is disposed in the first chamber 1, namely is disposed so as to face the gas-blowing outlet 36a of the inflator 36, when the inflator 36 is activated, the gas blows out toward the continuous hole 28 from the gas-blowing outlet 36a. Accordingly, the gas from the inflator 36 tends to flow into the second chamber 2 upon passing through the continuous hole 28. Thereby, the second chamber 2 is also rapidly expanded.

Thereafter, in a case that the occupant hits the expanded airbag 10, as illustrated in FIG. 2, the front panel 12 of the airbag 10 is pushed by the occupant and retreated to the rear panel 14 side, and thereby the inner panels 22A and 22B are loosened. Thus, the force that pulls the tether 70 toward the inside of the airbag 10 is released. Thereby, the tension of the lid member 60 is also released and as illustrated in FIG. 4c, the lid member 60 becomes separated from the rear panel 14 by the gas-pressure in the airbag 10 and the venthole 18 is brought to an open state. Therefore, the gas is rapidly discharged outside the airbag 10 from both the venthole 18 and the constantly-open type venthole 18A.

Figure 5:
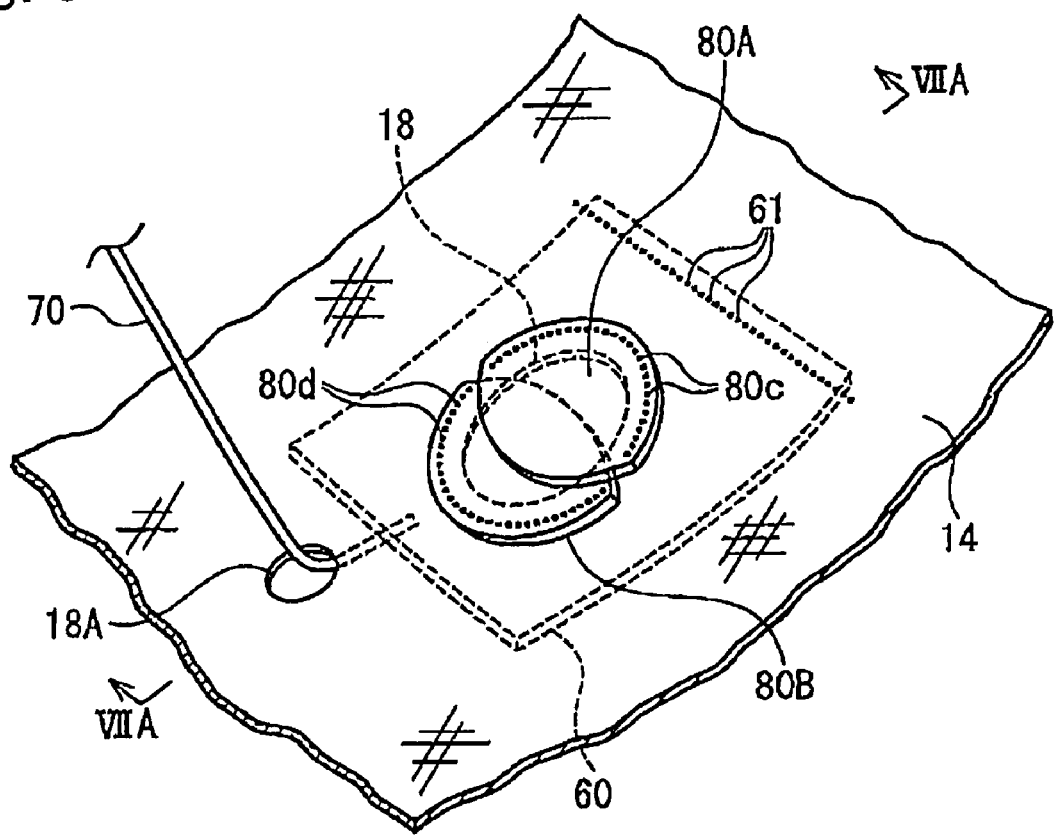
FIG. 5 is a perspective view illustrating the vicinity of the venthole of the airbag according to the embodiment.
Figure 6:
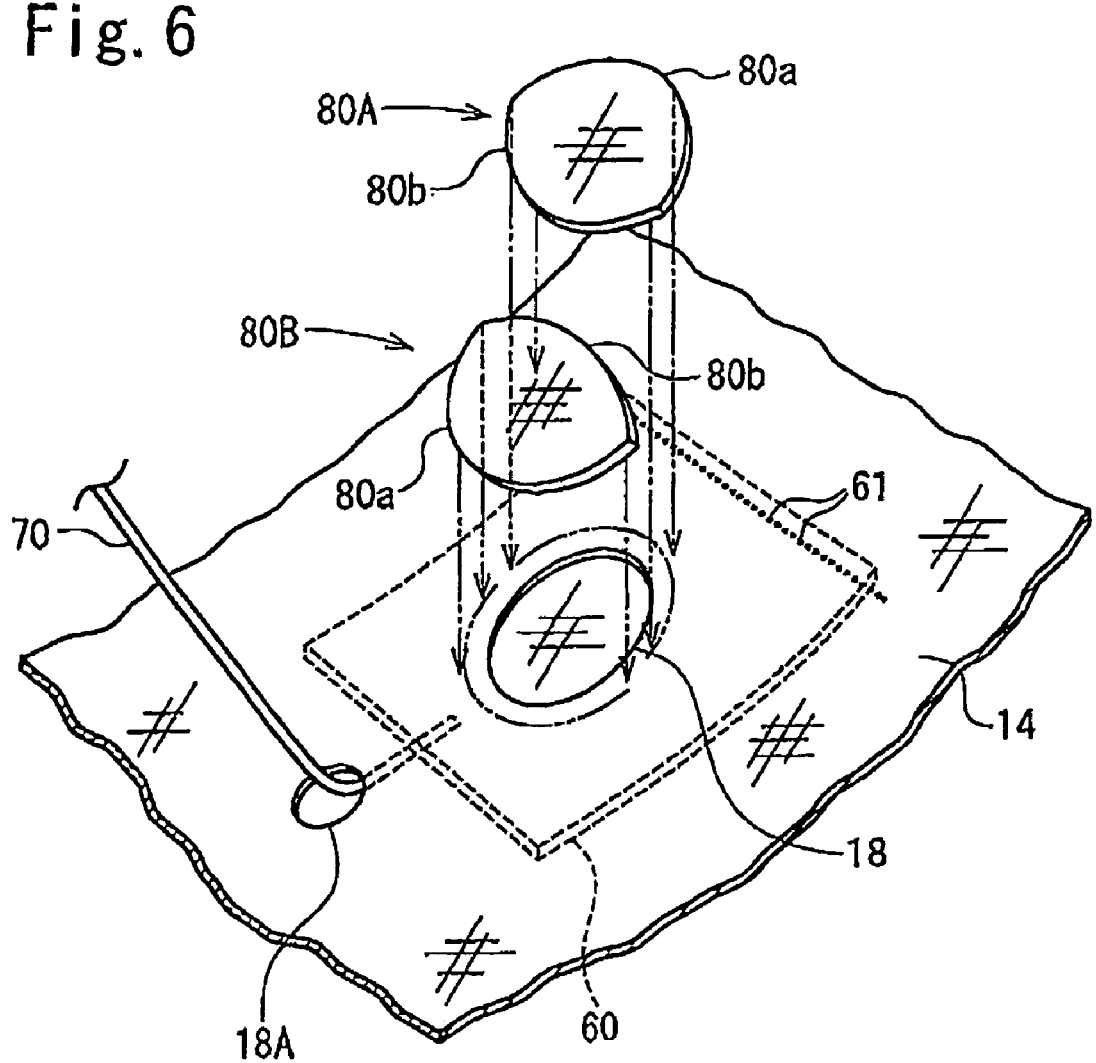
FIG. 6 is an exploded perspective view illustrating auxiliary lid members of the airbag in FIG. 5.
Figure 7A:
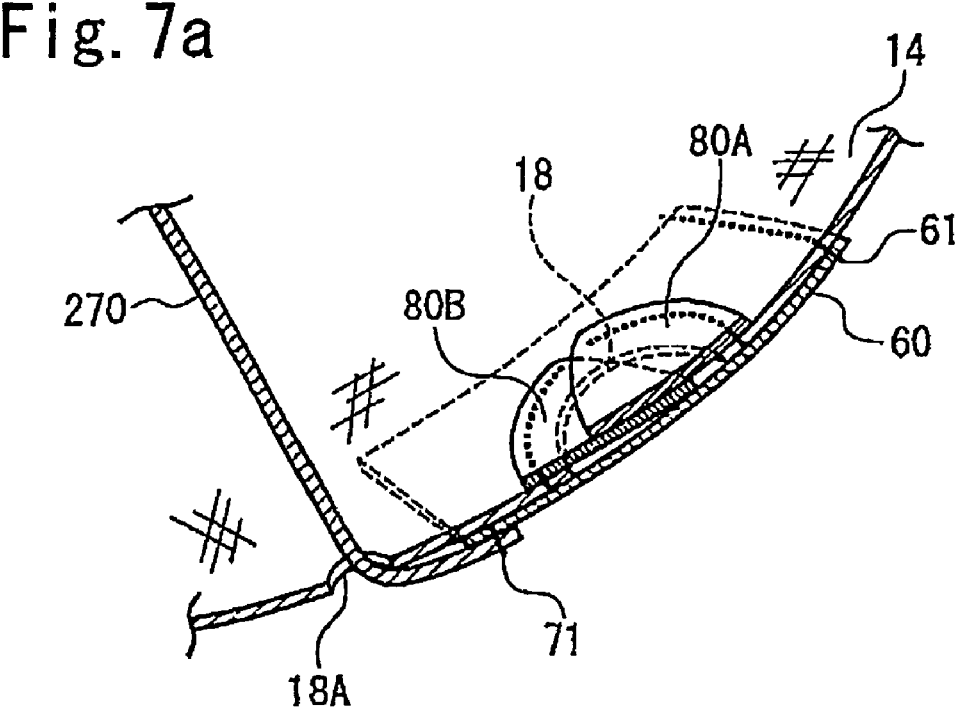
FIG. 7a and FIG. 7b are cross-sectional views taken along a line VIIA-VIIA in FIG. 5, respectively.
Figure 7B:
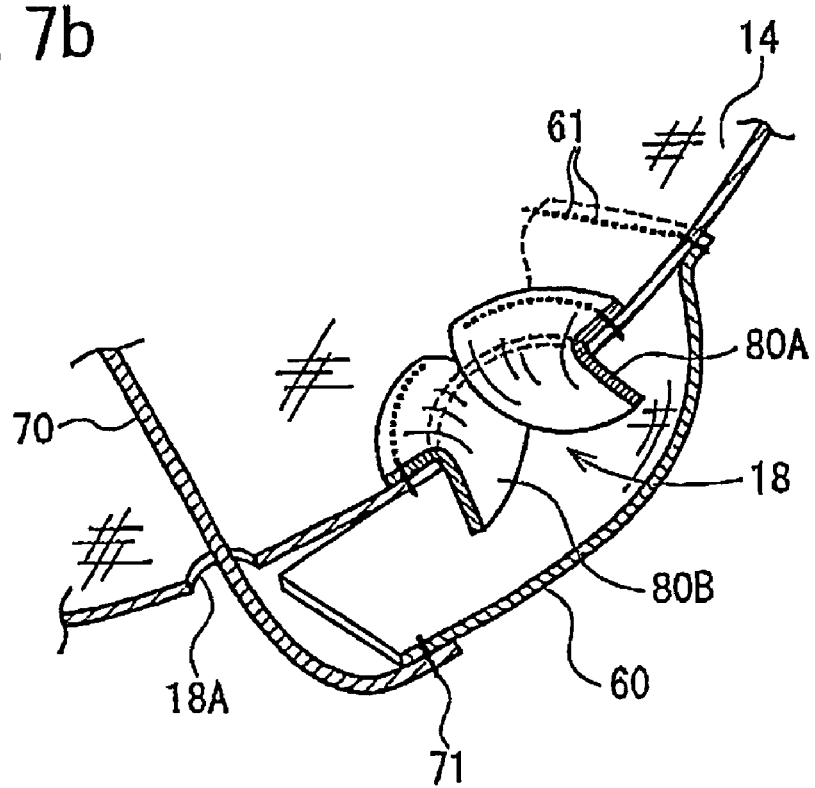

FIG. 5 is a perspective view illustrating the vicinity of a venthole of an airbag according to another embodiment, FIG. 6 is an exploded perspective view illustrating auxiliary lid members provided in the venthole, and FIG. 7a and FIG. 7b are cross-sectional views taken along a line VIIA-VIIA in FIG. 5, illustrating an operation of the auxiliary lid members. Incidentally, FIG. 7a illustrates a state before the auxiliary lid members are opened, and FIG. 7b illustrates a state after the auxiliary lid members are opened.

In this embodiment, auxiliary lid members 80A and 80B for covering the venthole 18 from inside of the airbag are provided.

As illustrated in FIG. 6, the auxiliary lid members 80A and 80B in this embodiment are respectively provided with a circular-arc shaped portion 80a conforming to an approximately half round of the peripheral edge portion of the venthole 18, and a chord-shaped portion 80b for connecting both end sides of the circular-arc shaped portion 80a, and are formed of an approximately semicircular woven cloth having a larger diameter than that of the venthole 18. Incidentally, in this embodiment, the chord-shaped portion 80b is curved in a manner such that the more the position on the chord-shaped portion 80b approaches a middle side in an extending direction thereof, the farther the chord-shaped portion 80b becomes separated from a straight line connecting both ends of the circular-arc shaped portion 80a toward an opposite side that is opposite to the circular-arc shaped portion 80a.

In the auxiliary lid member 80A on one side, the circular-arc shaped portion 80a thereof is made to overlap with an approximately half round of the peripheral edge portion of the venthole 18 from inside of the airbag, and is stitched to the peripheral edge portion of the venthole 18 by means of a seam 80c. Further, in the auxiliary lid member 80B on the other side, the circular-arc shaped portion 80a thereof is made to overlap with a rest of an approximately half round of the peripheral edge portion of the venthole 18 from inside of the airbag, and is stitched to the peripheral edge portion of the venthole 18 by means of a seam 80d. Further, each of chord-shaped portion 80b sides of these auxiliary lid members 80A and 80B is made to overlap in the venthole 18 and thereby the venthole 18 is closed. Each of these auxiliary lid members 80A and BOB is not connected.

However, a construction of a shape, a disposition, or the like of the auxiliary lid members 80A and 80B is not limited thereto.

The construction other than that in this embodiment is identical of the above-described embodiment illustrated in FIGS. 1 through 4a, 4b, and 4c, and in FIGS. 5 through 7, the same numerals as that in FIGS. 1 through 4a, 4b, and 4c denote the same elements.

In this embodiment, in a case that the airbag is expanded, as illustrated in FIG. 7a, the lid member 60 is under strain along the outer surface of the rear panel 14 by that the tether 70 is pulled toward the inside of the airbag, and is made to overlap with the venthole 18. Furthermore, the auxiliary lid members 80A and 80B are overlapped with the venthole 18 from inside of the airbag.

Since these auxiliary lid members 80A and 80B are supported by means of the lid member 60 via the venthole 18 from the outside of the airbag, the auxiliary lid members 80A and 80B cover the venthole 18 without being pushed outside the airbag from the venthole 18 by the gas-pressure in the airbag. Thus, by means of that the venthole 18 is also covered by means of the auxiliary lid members 80A and 80B from inside of the airbag, a closing performance of the venthole 18 becomes good.

When the occupant hits the expanded airbag and the airbag is crushed, the force to pull the tether 70 to the inside of the airbag 10 along that is released, and the tension of the lid member 60 is also released, as illustrated in FIG. 7b, the lid member 60 becomes separated from the outer surface of the rear panel 14. Thereby, the auxiliary lid members 80A and 80B lose a support from the outside of the airbag by means of the lid member 60, and the auxiliary lid members 80A and 80B are respectively pushed outside of the airbag from the venthole 18 by the gas-pressure in the inside of the airbag. As a result, the venthole 18 is brought to an open state, and the gas is discharged outside the airbag from the venthole 18.

At this moment, each of the auxiliary lid members 80A and 80B is extended outside of the airbag along the peripheral edge portion of the venthole 18, and is formed like a nozzle that surrounds the venthole 18 as illustrated in FIG. 7b. Accordingly, a gas-discharging direction from the venthole 18 is limited by means of these auxiliary lid members 80A and 80B, and the gas strongly blows out toward the lid member 60 from the venthole 18. As a result, the separating operation of the lid member 60 from the outer surface of the airbag is hastened.

Incidentally, in this embodiment, although two sheets of the auxiliary lid members 80A and 80B are provided, only one sheet of the auxiliary lid member may be provided, or more than two sheets of the auxiliary lid members may be provided in such a way that the position is deviated in a peripheral direction of the venthole 18.

Figure 8:
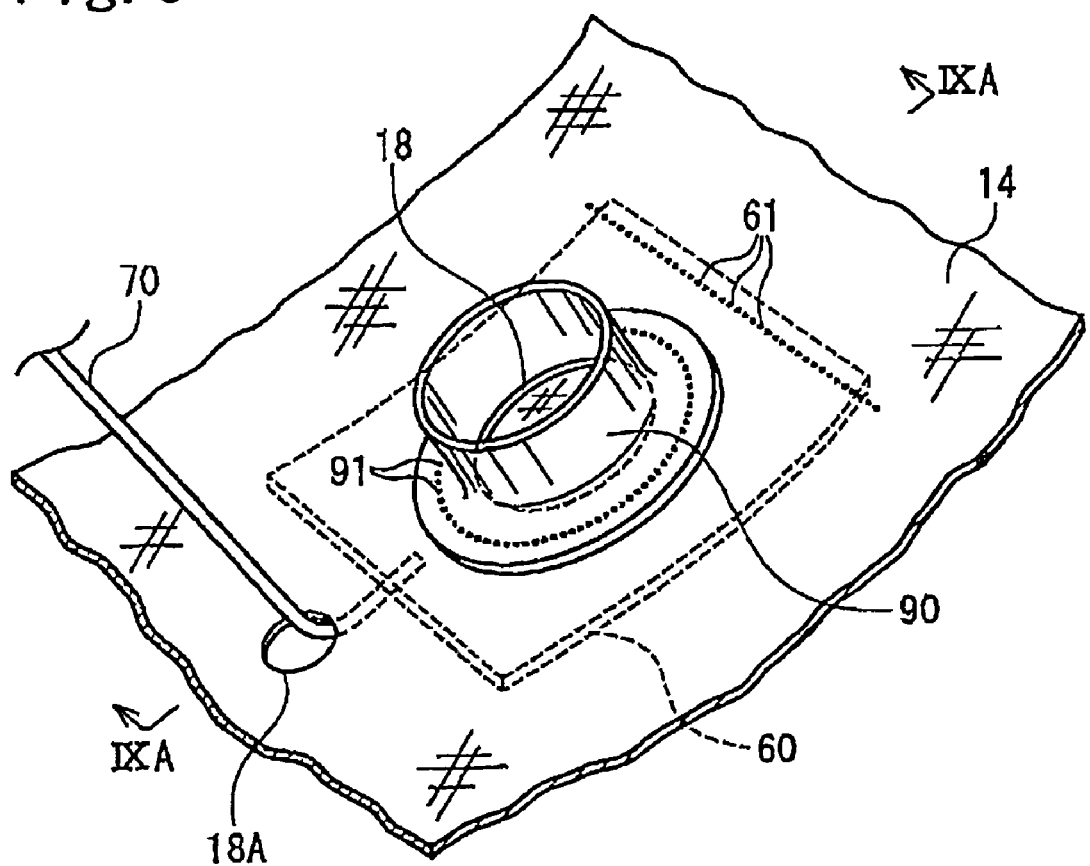
FIG. 8 is a perspective view illustrating the vicinity of the venthole of the airbag according to the embodiment.
Figure 9A:
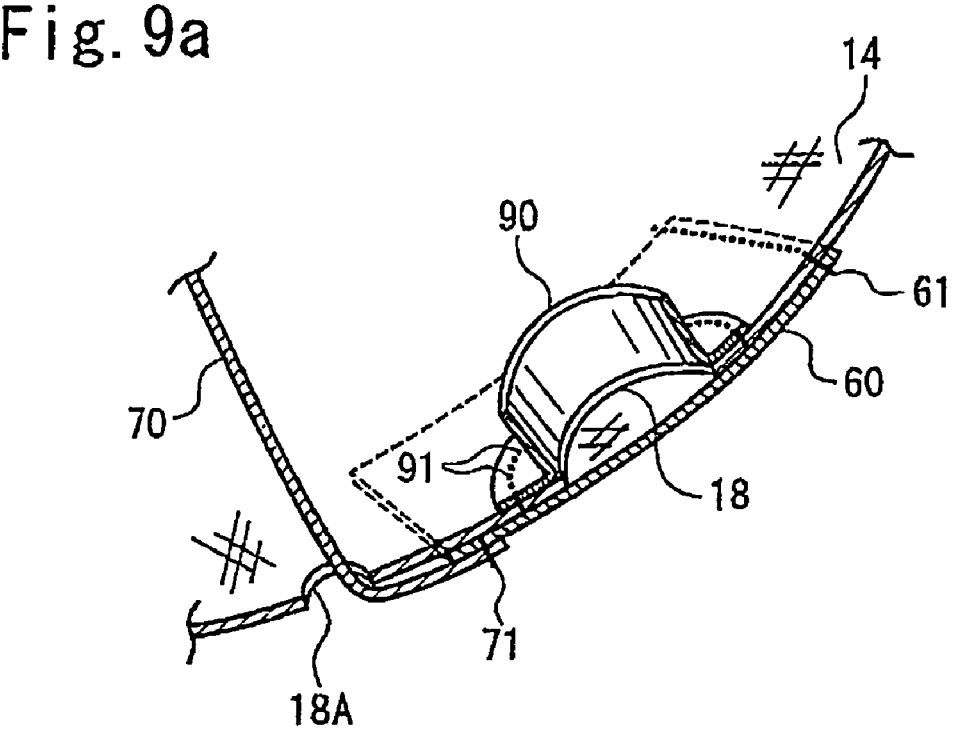
FIG. 9a and FIG. 9b are cross-sectional views taken along a line IXA-IXA in FIG. 8 respectively.
Figure 9B:
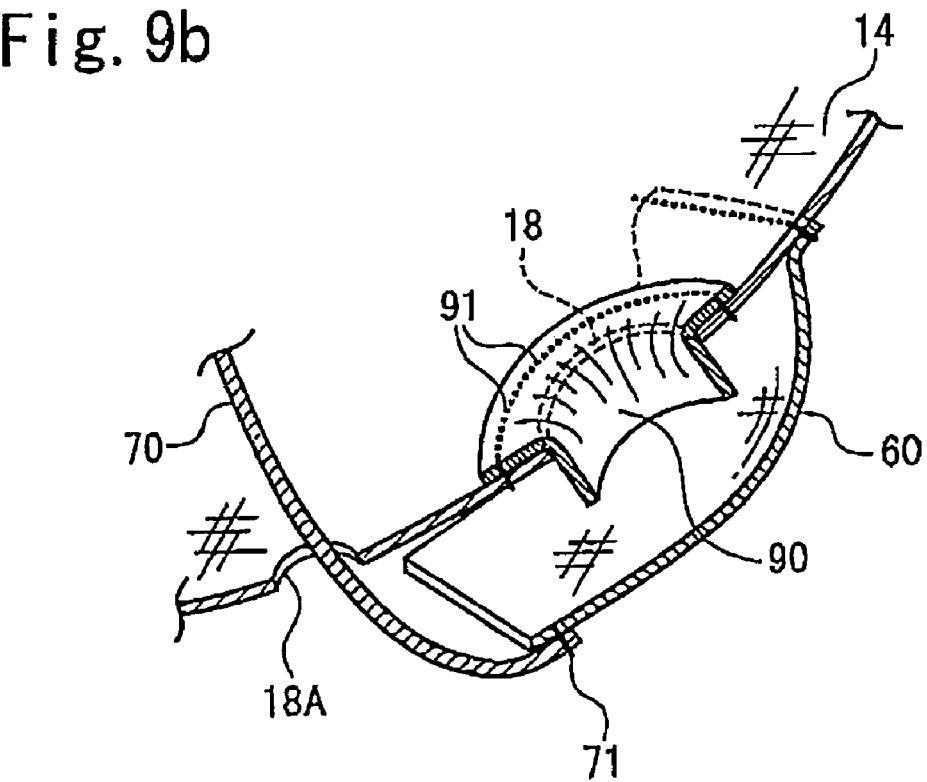

FIG. 8 is a perspective view illustrating the vicinity of a venthole of an airbag according to still another embodiment, and FIG. 9a and FIG. 9b are cross-sectional views taken along a line IXA-IXA in FIG. 8, illustrating an operation of a nozzle provided in the venthole. Incidentally, FIG. 9a illustrates a state before the nozzle is projected, and FIG. 9b illustrates a state after the nozzle is projected.

In this embodiment, one end side of a tubular nozzle 90 whose both ends are opened is coupled with the venthole 18. A numeral 91 denotes a seam by which a peripheral edge portion of one end side of the nozzle 90 is stitched to a peripheral edge portion of the venthole 18. In this embodiment, although the nozzle 90 is formed by winding a base cloth into a tubular shape and stitching each of both end portions in a winding direction, the construction of the nozzle 90 is not limited thereto, and for example, the nozzle 90 may be constructed with a tube and etc., formed of a rubber having flexibility, synthetic resin, or the like.

The nozzle 90 is disposed inside of the airbag in advance before the airbag is folded back and the airbag apparatus is assembled therewith. Incidentally, in this embodiment, although the nozzle 90 is disposed inside of the airbag from the beginning by being stitched to the peripheral edge portion of the venthole 18 from inside of the airbag, the nozzle 90 may be stitched to the peripheral edge portion of the venthole 18 from the outside of the airbag and pressed into inside of the airbag through the venthole 18.

The construction other than that in this embodiment is identical of that of the above-described embodiment illustrated in FIG. 1 through 4a, 4b, and 4c, and the same numerals in FIGS. 8, 9a, and 9b as that in FIG. 1 through 4a, 4b, and 4c denote the same elements.

In this embodiment, in a case that the airbag is expanded, as illustrated in FIG. 9a, the tether 70 is pulled toward the inside of the airbag and thereby the lid member 60 is under strain along the outer surface of the rear panel 14 and overlapped with the venthole 18. Since the venthole 18 is thereby brought to a state to be covered by the lid member 60, the nozzle 90 is not projected to outside of the airbag from the venthole 18 and remains in the airbag. In FIG. 9a, although the nozzle 90 is illustrated remaining to have a tubular shape for clarifying the construction of each portion, on this occasion, the nozzle 90 is pressed to an inner surface of the rear panel 14 by the gas-pressure inside of the airbag, and is brought to a closed state. Thereby, the venthole 18 is closed also by means of the nozzle 90, and the closing performance of the venthole 18 becomes good.

Incidentally, in a case that a length in a cylinder axis direction of the nozzle 90 from a base end, namely a seam 91 to a tip end of the nozzle 90 is set to be smaller than an opening diameter of the venthole 18, even when the nozzle 90 is thus pressed to the inner surface of the rear panel 14, the venthole 18 is not completely closed by means of the nozzle 90.

In contrast, in a case that the length in the cylinder axis direction of the nozzle 90 from the base end to the tip end thereof is set to be larger than the opening diameter of the venthole 18, when the nozzle 90 is pressed to the inner surface of the rear panel 14, an entire venthole 18 is closed by means of the nozzle 90.

When the occupant hits the expanded airbag and thereby the airbag is crushed, the force for pulling the tether 70 into inside of the airbag 10 is released along that, and the tension of the lid member 60 is also released, as illustrated in FIG. 9b, the lid member 60 becomes separated from the outer surface of the rear panel 14 and the venthole 18 is opened. Along with the above-described, the nozzle 90 is pushed outside of the airbag from the venthole 18 by the gas-pressure in the airbag. Further, the nozzle 90 is diameter-enlarged into the tubular shape and is brought to an open state by means of that the gas flows into the nozzle 90, and the gas is discharged outside of the airbag upon passing through the nozzle 90.

On this occasion, the time until an entire nozzle 90 is pushed outside of the airbag and diameter-enlarged into the tubular shape, and further the lid member 60 becomes separated from the tip end of the nozzle 90, and the nozzle 90 is brought to the open state depends on a length of the nozzle 90 from the base end to the tip end in the cylinder axis direction. The reason for this is explained with reference to FIGS. 31a through 31c.

Figure 31A:
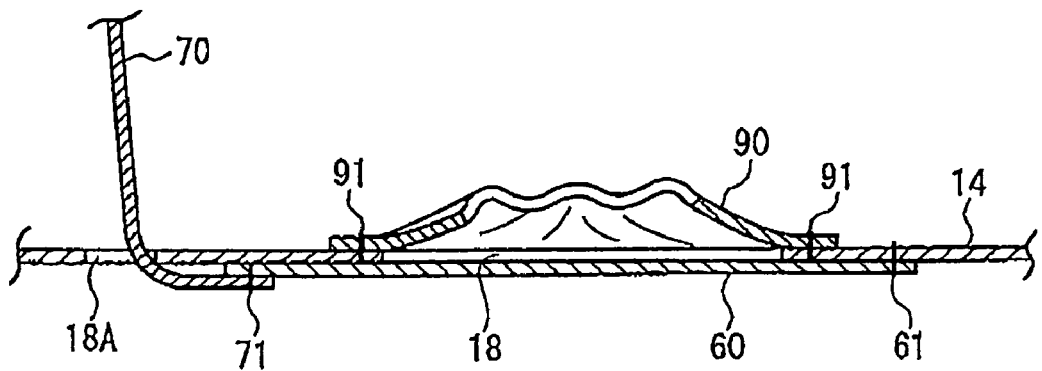
FIG. 31a through FIG. 31c are cross-sectional views, respectively, explaining a difference of operations of a nozzle between a case when a length of the nozzle is relatively shortened and a case when the length of the nozzle is relatively lengthened.
Figure 31B:
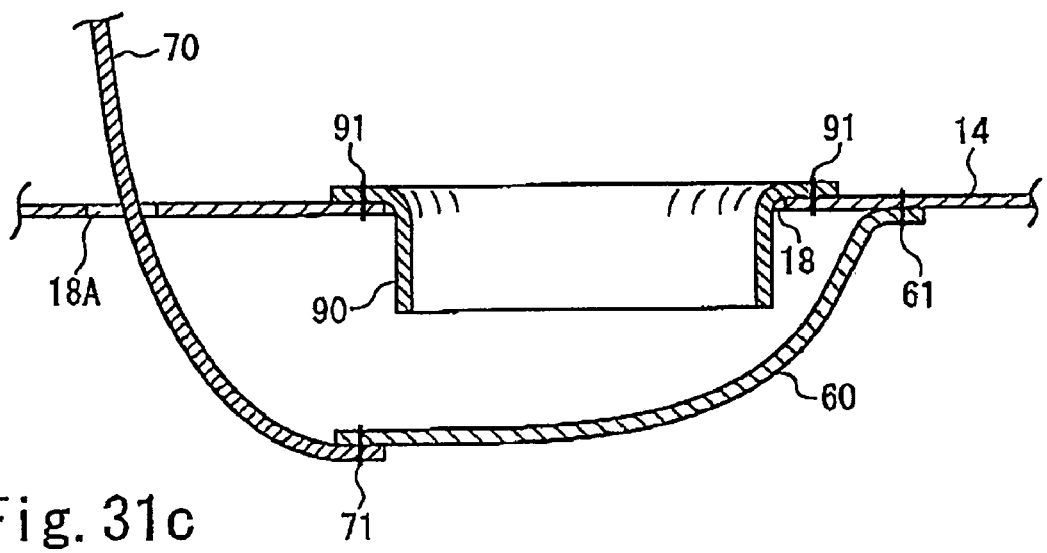
Figure 31C:
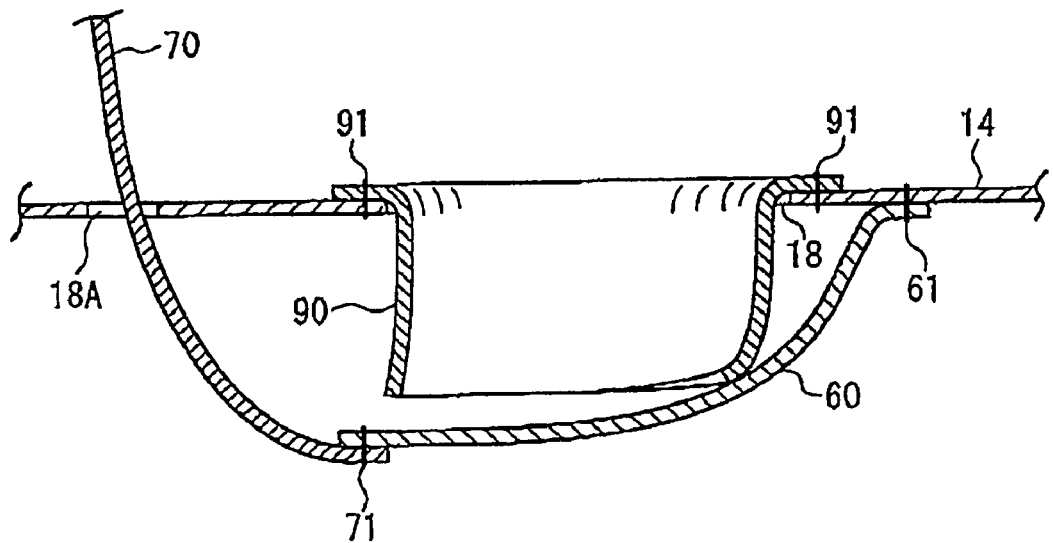

FIGS. 31a through 31c are explanatory views explaining a difference of an operation of the nozzle between a case where the length of the nozzle is relatively shortened and a case where the length of the nozzle is relatively lengthened. Incidentally, FIGS. 31a through 31c are cross-sectional views of the same part of FIGS. 9a and 9b, respectively. FIGS. 31a and 31b illustrate a case where the length of the nozzle is relatively shortened, and FIG. 31c illustrates a case where the length of the nozzle is relatively lengthened. Furthermore, FIG. 31a illustrates a state before the nozzle is projected out, and FIGS. 31b and 31c illustrate a state after the nozzle is projected out.

As illustrated in FIGS. 31a and 31b, in the case that the length of the nozzle 90 is relatively short, the entire nozzle 90 is pushed outside of the airbag, and the time required until the nozzle 90 is diameter-enlarged into the tubular shape is short. In addition, the time from which the lid member 60 starts to be separated from the outer surface of the rear panel 14 to which the lid member 60 becomes separated from the tip end of the nozzle 90 is also short. Furthermore, as illustrated in FIG. 31b, in a state that a separating operation of the lid member 60 from the rear panel 14 is completed, a separating distance of the lid member 60 from the tip end of the nozzle 90 is increased. Thereby, an opening amount of the nozzle 90 is also increased.

In contrast, as illustrated in FIG. 31c, in a case that the length of the nozzle 90 is relatively long, the time required for pushing the entire nozzle 90 outside of the airbag, and for diameter-enlarging the nozzle 90 into the tubular shape is increased. Moreover, the time from which the lid member 60 starts to be separated from the outer surface of the rear panel 14 to which the lid member 60 becomes separated from the tip end of the nozzle 90 is also increased. Further, as illustrated in FIG. 31c, in a state that the separating operation of the lid member 60 from the rear panel 14 is completed, the separating distance of the lid member 60 from the tip end of the nozzle 90 is reduced. Thereby, the opening amount of the nozzle 90 is also reduced.

Thereby, by means of appropriately setting the length of the nozzle 90, the time from which the occupant hits the expanded airbag and the airbag starts to be crushed to which the gas starts to be discharged outside of the airbag upon passing through the nozzle 90, and the opening amount of the nozzle 90 at that time can be adjusted.

In the aforementioned each of the embodiments, the lid member 60 is formed to have an approximately rectangular shape, and the tether 70 is coupled with the vicinity of the middle portion of a side on one end side in a longitudinal direction by means of the seam 72, and a side on the other end side is stitched to the rear panel 14 by means of the seam 61.

In the lid member 60 described above, in a case that the tether 70 is pulled toward the inside of the airbag 10, and the lid member 60 is thereby strained, tensile force is applied to an area having an approximately triangular shape that is surrounded by line segments connecting a position to which the tether is stitched, namely the seam 71, and both ends of the seam 61 in the lid member 60, and the tensile force is not applied to the rest of the portions. Hereinbelow, in the lid member, an area where the tensile force is applied by being thus pulled by means of the tether is referred to as a tension area.

Accordingly, by forming the lid member to have the same shape as that of the tension area, the area where the tensile force is not applied when the lid member is pulled by means of the tether does not exist and a size of the lid member can be suppressed at a necessity minimum, and therefore the material cost can be reduced.

Figure 10:
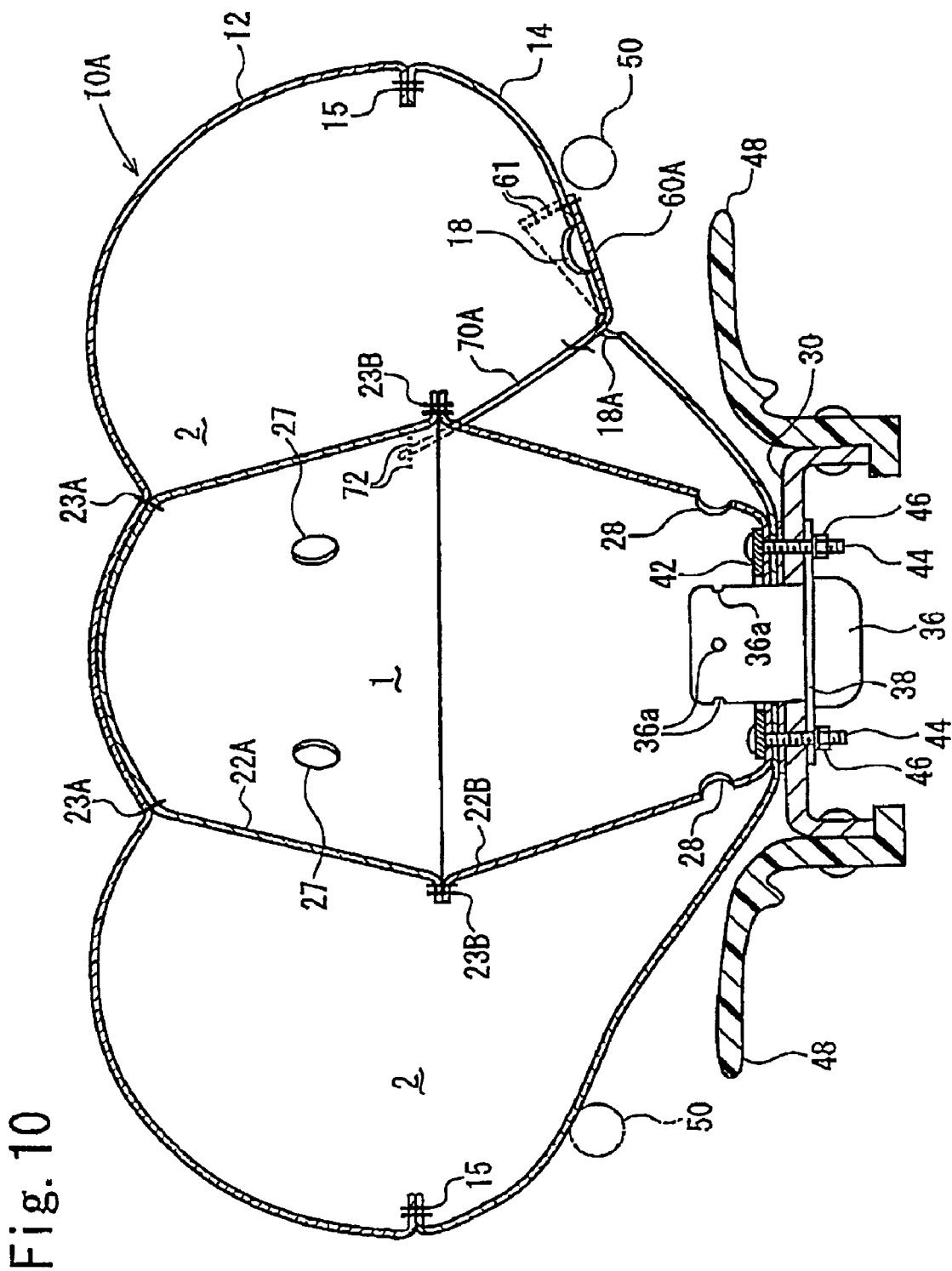
FIG. 10 is a cross-sectional view illustrating the airbag and the airbag apparatus according to the embodiment.
Figure 11:
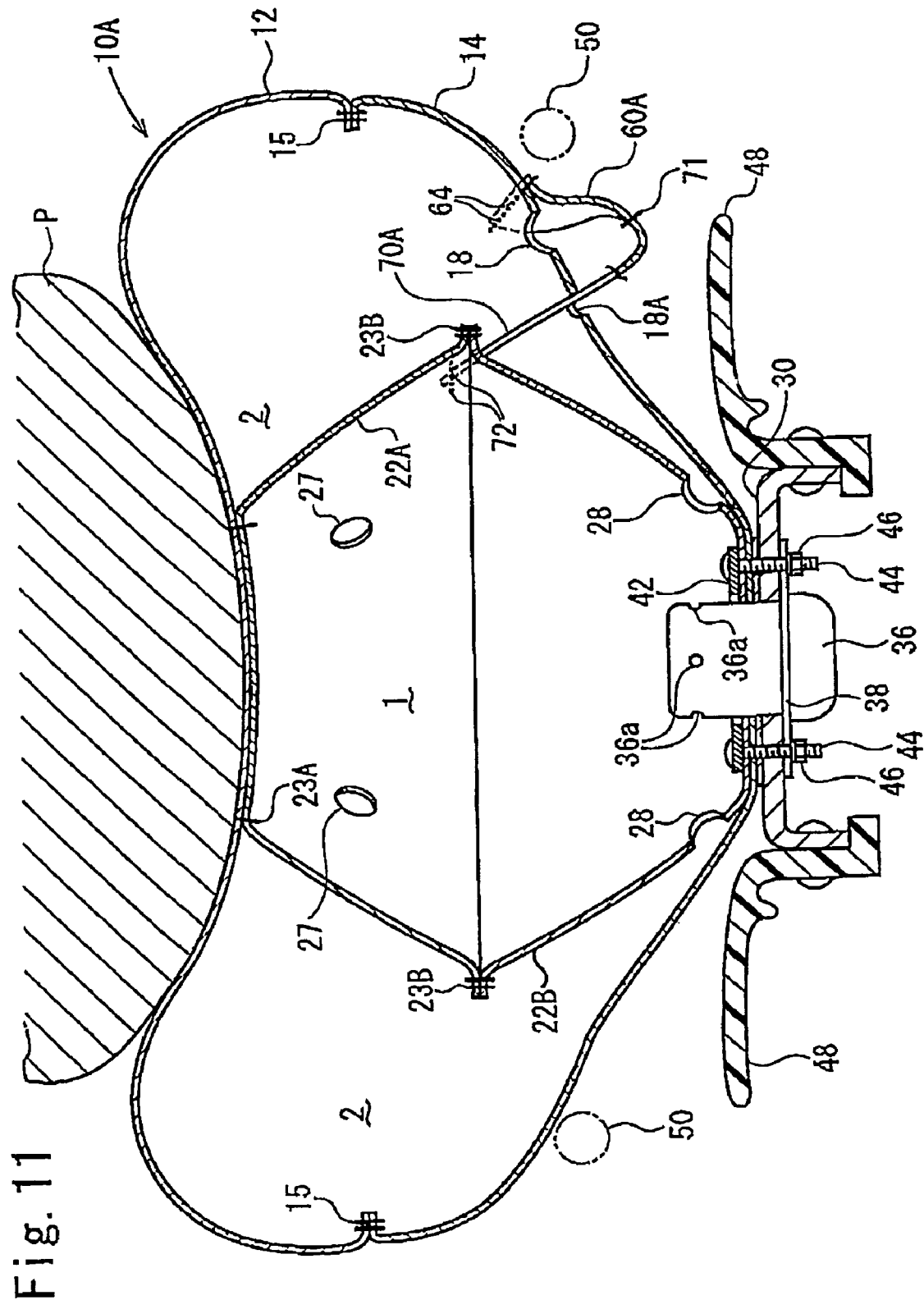
FIG. 11 is a cross-sectional view illustrating the airbag and the airbag apparatus in FIG. 10 when the occupant is received.
Figure 12:
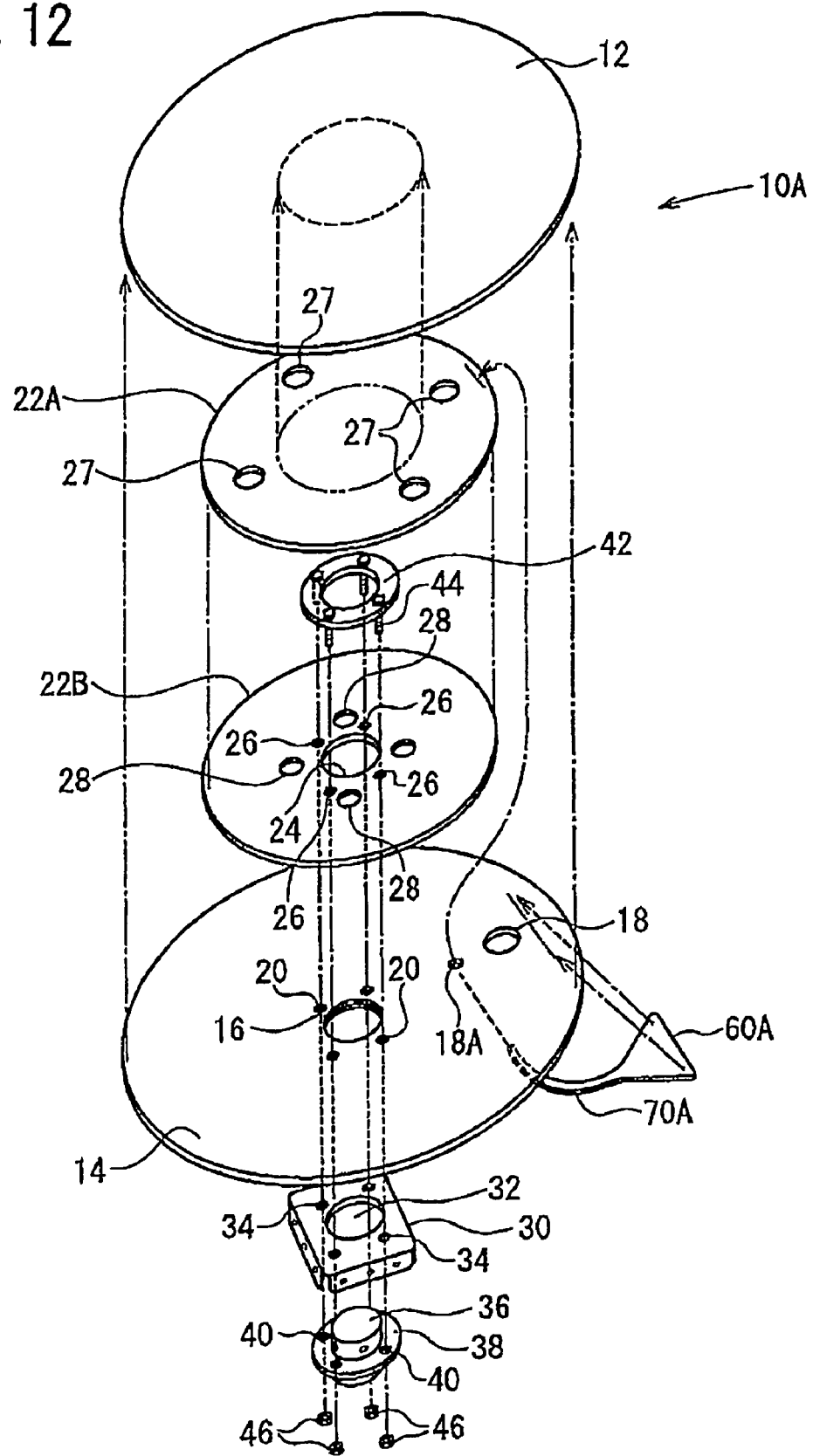
FIG. 12 is an exploded perspective view illustrating the airbag and the airbag apparatus in FIG. 10.
Figure 13A:
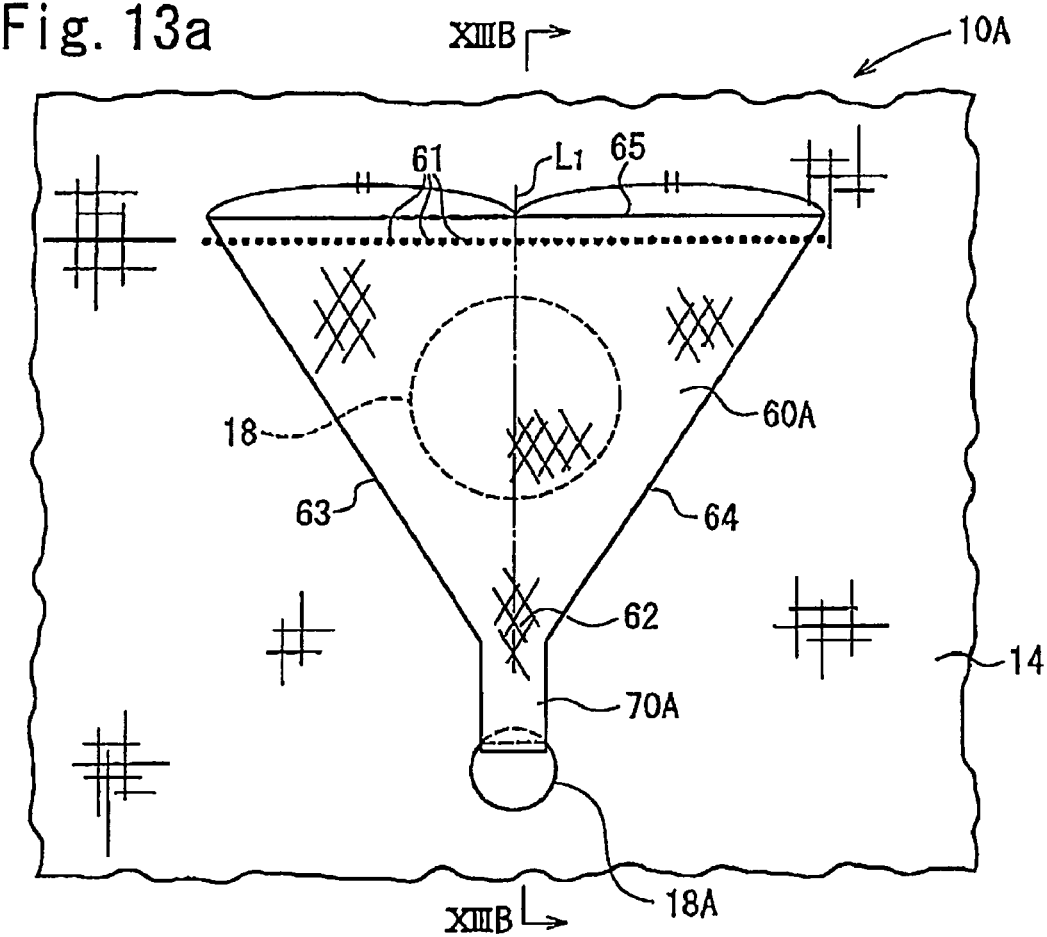
FIG. 13a is a plan view illustrating the vicinity of the venthole of the airbag in FIG. 10, and FIG. 13b and FIG. 13c are cross-sectional views taken along a line XIIIB-XIIIB in FIG. 13a, respectively.
Figure 13B:
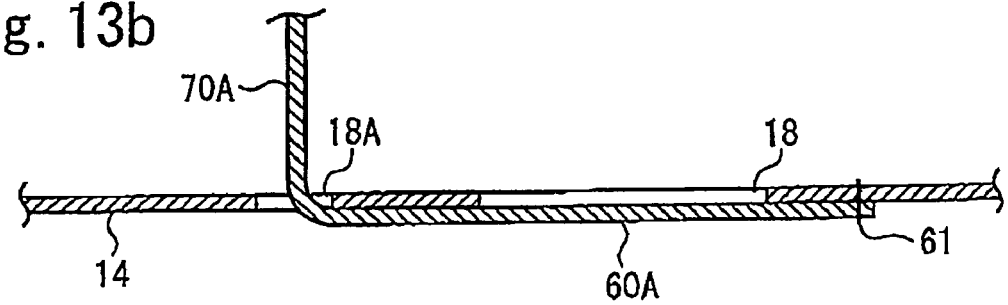
Figure 13C:
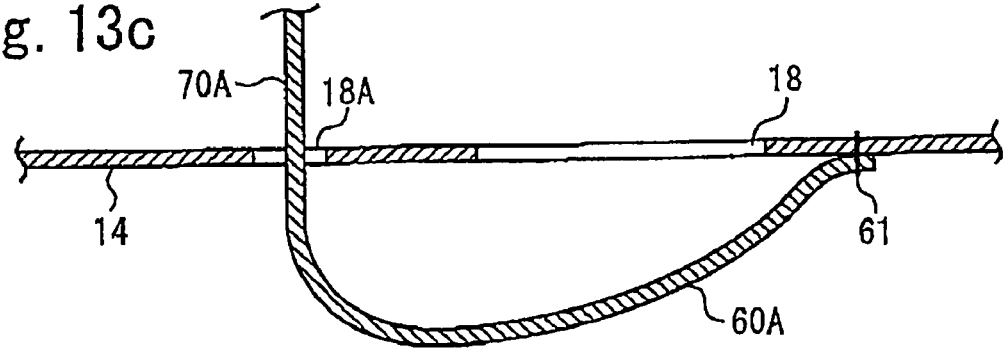

FIG. 10 and FIG. 11 are cross-sectional views illustrating the thus constructed airbag and airbag apparatus provided with the airbag, FIG. 12 is an exploded perspective view of the airbag and the airbag apparatus, FIG. 13a is a plan view illustrating the vicinity of the venthole of the airbag, and FIGS. 13b and 13c are cross-sectional views taken along a line XIIIB-XIIIB in FIG. 13a, respectively. Incidentally, FIG. 13a is a view illustrating the vicinity of the venthole of the airbag looking from the outside of the airbag. Further, FIG. 13b illustrates a state when the venthole is closed by means of the lid member, and FIG. 13c illustrates a state when the venthole is opened.

In an airbag 100A in this embodiment, a lid member 60A for covering the venthole 18 from the outside of the airbag 10A and a tether 70A serving as a connecting member for connecting the lid member 60A and the inner panel 22A in the inside of the airbag 100A are integrally constructed.

As illustrated in FIG. 13a, in this embodiment, the lid member 60A is formed of a woven cloth having an approximately triangular shape, and the construction is made such that one end of the tether 70A continues into an apex point 62 of the triangle. Further, in this embodiment, the lid member 60A is formed of an isosceles triangle or a regular triangle, in which lengths of at least a pair of oblique lines 63 and 64 that intersect at the apex point 62, in three sides thereof are approximately equal.

In the lid member 60A, the apex point 62 is disposed on the constantly-open type venthole 18A side relative to the venthole 18, and is made to overlap with the venthole 18 in a posture such that a side 65 facing the apex point 62 is disposed on an opposite side that is opposite to the constantly-open type venthole 18A while sandwiching the venthole 18.

As illustrated in FIG. 13a, the lid member 60A is disposed in a manner such that a center line $L_1$ that passes through the apex point 62 and a midpoint of the facing side 65 of the lid member 60A passes through the vicinity of a center of the venthole 18, and the vicinity of a center of the constantly-open type venthole 18A. Further, the tether 70A is extended out from the apex point 62 in approximately the same direction as that of the center line $L_1$.

The lid member 60A is stitched to the rear panel 14 by means of the seam 61 along the side 65 on an opposite side that is opposite to the constantly-open type venthole 18A while sandwiching the venthole 18.

This lid member 60A has a size in which entire venthole 18 is housed inside of an area that is surrounded by three sides of 63, 64, and 65 thereof in a state that the lid member 60A is made to overlap with the rear panel 14.

The aforementioned seam 61 is extended from one end to the other end of the side 65. That is, a length of the stitching portion of the lid member 60A to the rear panel 14 by the seam 61 is greater than a width of the venthole 18 in an extending direction of the seam 61.

The tether 70A is pulled toward the inside of the airbag 100A from the constantly-open type venthole 18A and the other end is stitched to the inner panel 22A by means of the seam 72. However, the stitching position of the other end side of the tether 70A is not limited to the above-described, and for example, the other end side of the tether 70A may be stitched to the inner panel 22B, or the other end side of the tether 70A may be directly stitched to the airbag-inside surface of the front panel 12.

Other construction of the airbag 100A is identical of that of the above-described airbag 10 illustrated in FIGS. 1 through 4a, 4b, and 4c, and the same numerals in FIGS. 10 through 13a, 13b, and 13c as that in FIGS. 1 through 4a, 4b, and 4c denote the same elements.

An operation of the airbag apparatus provided with the airbag 100A is identical of that in the airbag apparatus illustrated in FIGS. 1 through 4a, 4b, and 4c.

That is, in a collision of the vehicle, or the like, the inflator 36 is activated, and a gas from the inflator 36 is supplied into the first chamber 1 first, and the first chamber 1 is expanded. On this occasion, the first and second inner panels 22A and 22B, respectively, are developed to the occupant side along the expanding operation of the first chamber 1, and thereby the tether 70A is pulled toward the inside of the airbag 100A. Thereby, the apex point 62 of the lid member 60A is pulled toward a direction to be separated from the facing side 65 that is stitched to the rear panel 14 by means of the seam 61, and the lid member 60A is pulled and is attached firmly to the outer surface of the rear panel 14. As a result, the venthole 18 is closed by means of the lid member 60. Then, the gas flows into the second chamber 2 from the first chamber 1 via the continuous holes 27 and 28, and the second chamber 2 is expanded.

Thereafter, in a case that the occupant hits the expanded airbag 10*a*, as illustrated in FIG. 11, the front panel 12 of the airbag 100A is pushed by the occupant and retreated to the rear panel 14 side, and the inner panels 22A and 22B are loosened, and the force for pulling the tether 70A into inside of the airbag 100A is released. Thereby, the tension of the lid member 60A is also released, and the lid member 60A becomes separated from the rear panel 14 by the gas-pressure in the airbag 100A and the venthole 18 is brought to a state to be opened. Thus, the gas is rapidly discharged outside of the airbag 100A from both of the venthole 18 and the constantly-open type venthole 18A.

In this airbag 100A, since the lid member 60A has an approximately triangular shape in planar view, which is approximately the same shape as that of the tension area that is produced by that the apex point 62 is pulled by the tether 70A, an approximately entire lid member 60A is brought to be pulled when the apex point 62 is pulled by the tether 70A, and a portion that is not pulled almost does not exist, or does not exist at all. Accordingly, the size of the lid member 60*a* can be suppressed at the necessity minimum, and the material cost can be reduced.

Moreover, in this embodiment, since the lid member 60A is formed of the isosceles triangle or the regular triangle, in which lengths of a pair of oblique lines 63 and 64 that intersect at the apex point 62 where the tether 70A continues, in three sides thereof are approximately equal, the tensile force is approximately evenly applied to both end sides of facing sides 65 from the apex point 62.

Thereby, the lid member 60A is constructed such that, when the lid member 60A is pulled by means of the tether 70A, the oblique line 63 on one side and the oblique line 64 on the other side are brought to be approximately evenly attached firmly to the rear panel 14, and when the pulling force from the tether 70A is released, the oblique line 63 on one side and the oblique line 64 on the other side are brought to be approximately evenly separated from the rear panel 14.

In the airbag 100A, since the lid member 60A and the tether 70A are integrally constructed, there is no need to manufacture the tether 70A and the lid member 60A by separate processes, and there is no need to stitch the lid member 60A and the tether 70A, and therefore a manufacturing facility and a manufacturing process for the airbag can be simplified. Furthermore, since the number of the constructional elements is decreased, a reduction of a management cost for each of the constructional elements is realized.

Figure 14:
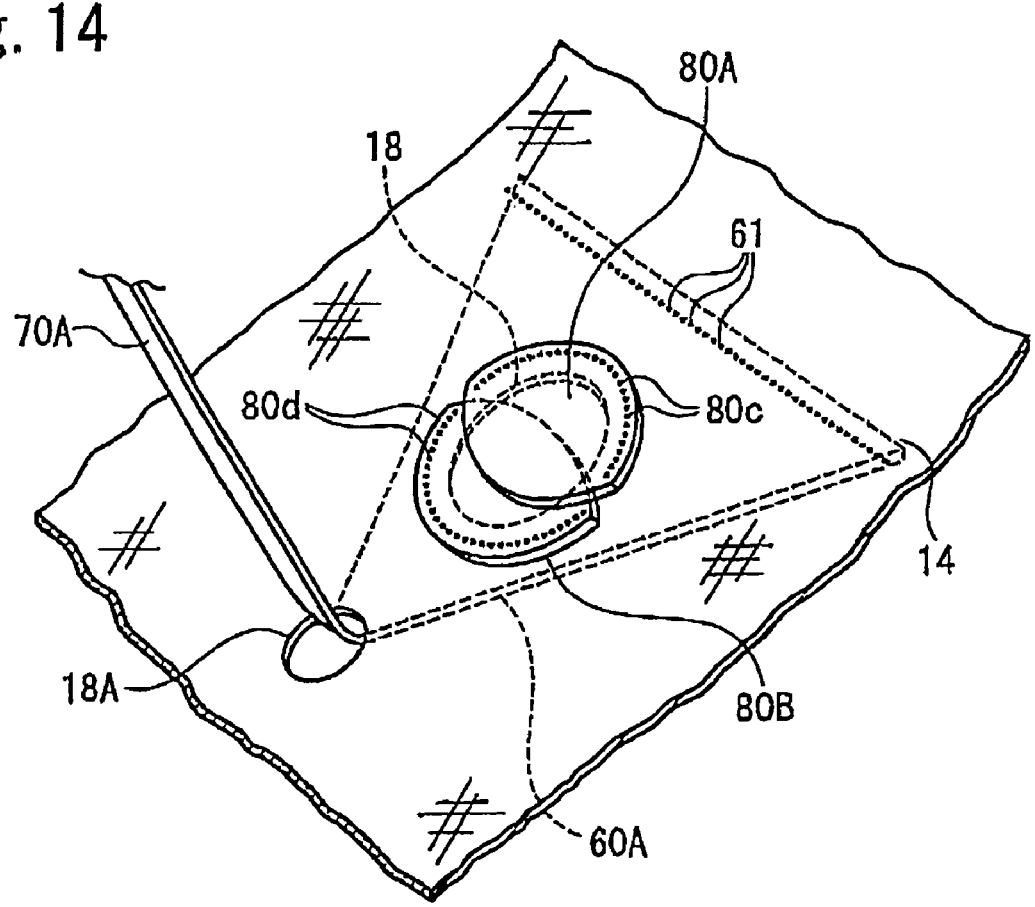
FIG. 14 is a perspective view illustrating the vicinity of the venthole of the airbag according to the embodiment.
Figure 15:
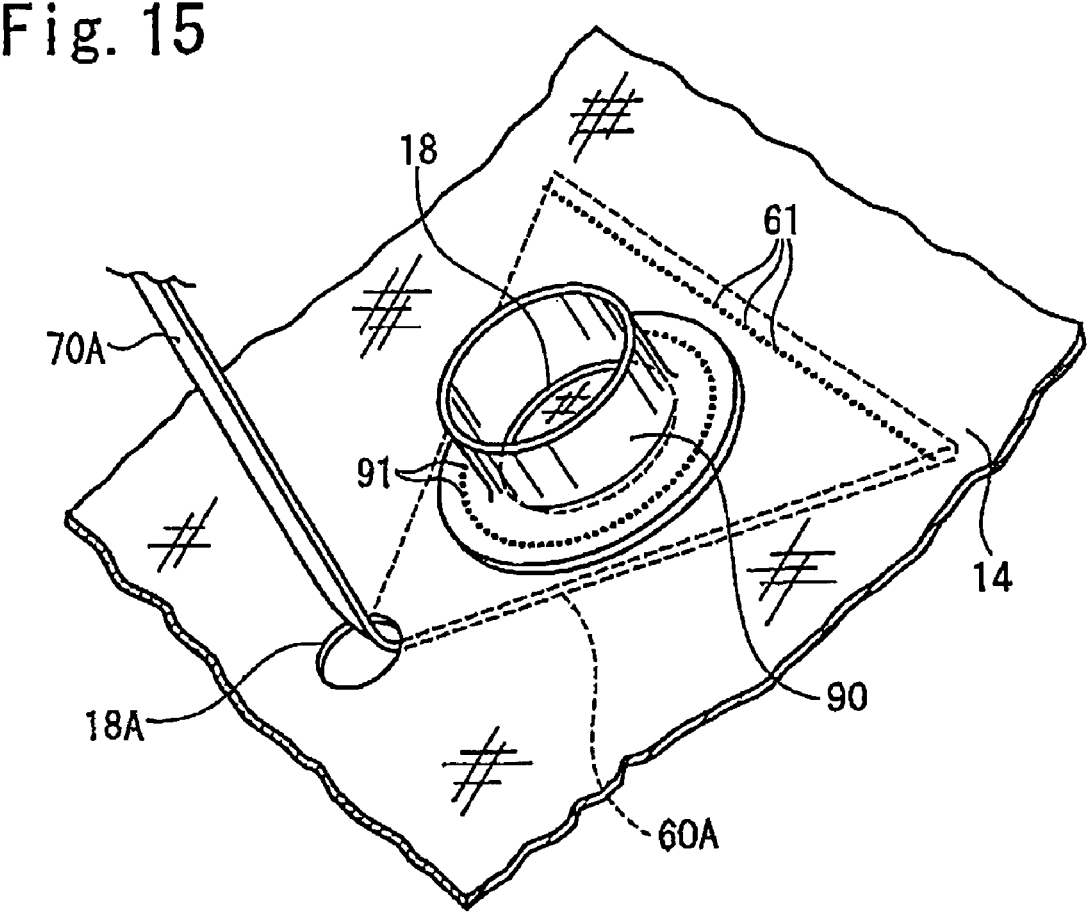
FIG. 15 is a perspective view illustrating the vicinity of the venthole of the airbag according to the embodiment.

Although this embodiment is constructed such that in the above-described embodiment illustrated in FIGS. 1 through 4*a*, 4*b*, and 4*c*, in replacement of the approximately rectangular shaped lid member 60, the approximately triangular shaped lid member 60A is provided, and the tether 70A for coupling the lid member 60A with the inner panel 22A is integrally provided with the lid member 60A, as illustrated in FIG. 14 and FIG. 15, in the above-described embodiment illustrated in FIGS. 5 through 7*a* and 7*b*, and the above-described embodiment illustrated in FIGS. 8, 9*a* and 9*b*, the same construction as that described above may be respectively applicable.

FIG. 14 illustrates a construction, in which in the embodiment in FIGS. 5 through 7*a* and 7*b*, similarly to the embodiment in FIGS. 10 through 13*a*, 13*b*, and 13*c*, the approximately triangular shaped lid member 60A is provided in replacement of the approximately rectangular shaped lid member 60, and the tether 70A for coupling the lid member 60A with the inner panel 22A is integrally provided with the lid member 60A. Other construction of the embodiment in FIG. 14 is identical of that of the embodiment in FIGS. 5 through 7*a* and 7*b*.

Furthermore, FIG. 15 illustrates a construction in which the approximately triangular shaped lid member 60A is provided in replacement of the approximately rectangular shaped lid member 60 in the embodiment in FIGS. 8, 9*a*, and 9*b*, in a similar manner as the embodiment in FIGS. 10 through 13*a*, 13*b*, and 13*c*, and the tether 70A for coupling the lid member 60A with the inner panel 22A is integrally provided with the lid member 60A. Other construction of the embodiment in FIG. 15 is identical of that of the embodiment in FIGS. 8, 9*a*, and 9*b*.

Incidentally, FIG. 14 and FIG. 15 are perspective views, respectively corresponding to FIG. 5 and FIG. 8, illustrating the vicinity of the venthole 18 looking from inside of the airbag.

Figure 16:
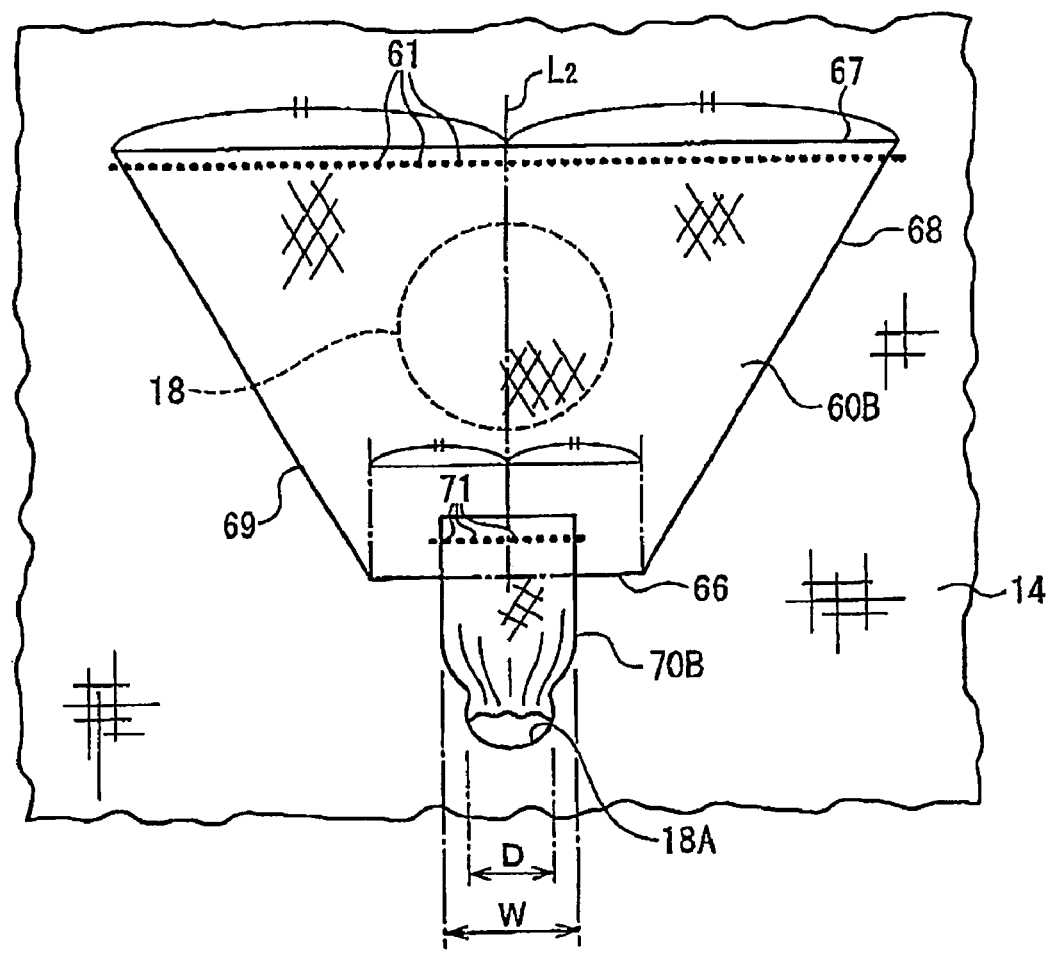
FIG. 16 is a plan view illustrating the vicinity of the venthole of the airbag according to the embodiment.

Although the lid member 60A is constructed to have the approximately triangular shape in each of the embodiments in the aforementioned FIGS. 10 through 13*a*, 13*b*, and 13*c*, and FIG. 14 and FIG. 15, the lid member may be constructed to have an approximately trapezoidal shape, as illustrated in the next FIG. 16. Incidentally, FIG. 16 is a plan view illustrating the vicinity of the venthole of the airbag provided with a lid member constructed to have an approximately trapezoidal shape, looking from the outside of the airbag.

In the embodiment in FIG. 16, a lid member 60B has an approximately trapezoidal shape in planar view in which a pair of facing sides that are extended in parallel with each other serves as a short side 66 and a long side 67, respectively. A center line $L_2$ passing through a center point of the short side 66 and a center point of the long side 67 is extended in a direction approximately perpendicular to an extending direction of the short side 66 and the long side 67.

The lid member 60B is made to overlap with the venthole 18 in a posture such that the short side 66 is disposed on a constantly-open type venthole 18 side relative to the venthole 18, and that the long side 67 is disposed on an opposite side that is opposite to the constantly-open type venthole 18A while sandwiching the venthole 18. Further, the lid member 60B is disposed in a manner such that the aforementioned center line $L_2$ passes through the vicinity of the center of the venthole 18 and the vicinity of the center of the constantly-open type venthole 18A.

The lid member 60B is stitched to the rear panel 14 by means of the seam 61 along the long side 67 on the opposite side that is opposite to the constantly-open type venthole 18A while sandwiching the venthole 18.

This lid member 60B has a size in which entire venthole 18 is housed inside of an area that is surrounded by four sides of 66, 67, 68 and 69 thereof in a state that the lid member 60B is made to overlap with the rear panel 14.

The aforementioned seam 61 is extended from one end to the other end of the long side 67. That is, in this embodiment, a length of the stitching portion of the lid member 60B to the rear panel 14 by means of the seam 61 is also greater than the width of the venthole 18 in the extending direction of the seam 61.

In the present invention, it is preferable that the oblique lines 68 and 69 connecting each of both ends of the short side 66 and the long side 67 of the lid member 60B having the trapezoidal shape are respectively extended so as to be overlapped with approximately V-shaped line segments (illustration is omitted) connecting a point positioned closest to the venthole 18 side in the peripheral edge of the constantly-open type venthole 18A, and the both ends of the seam 61, in a state that the lid member 60B is made to overlap with the rear panel 14. By means of thus constructing, the entire venthole 18 can be sufficiently closed by means of the lid member 60B having a size of the necessity minimum.

In this embodiment, a tether 70B for coupling the lid member 60B with the inner panel 22A (illustration is omitted) is provided in a separate body from the lid member 60B. One end of the tether 70B is stitched to the vicinity of the middle portion of the short side 66 of the lid member 60B by means of the seam 71. This tether 70B is inserted into the constantly-open type venthole 18A, and the other end is stitched to the inner panel 22A in the inside of the airbag.

As illustrated in FIG. 16, in this embodiment, a width W of the tether 70B is formed to be greater than a with D of the constantly-open type venthole 18A, and the tether 70B is inserted into the constantly-open type venthole 18A in a manner such that the halfway portion thereof is narrowed down. Incidentally, in the present invention, the width W of the tether 70B is preferable to be from 1.5 to 16 times the width D of the constantly-open type venthole 18A, specifically from 2 to 14 times, and more specifically, from 2 to 6 times the width D.

In this embodiment, when the airbag is folded back, an extending amount of the tether 70B from the constantly-open type venthole 18A is adjusted so that the tether 70B is extended without loosening between the lid member 80B and the constantly-open type venthole 18A in a state that the lid member 80B is made to overlap with the venthole 18. Other construction of this embodiment is identical of that of the above-described embodiment in FIGS. 1 through 4a, 4b, and 4c.

In this embodiment, the lid member 60B is formed to have an approximately trapezoidal shape. This shape is approximate to a shape of the tension area that is produced when the lid member 60B is pulled by means of the tether 70B. Accordingly, in the lid member 60B, the size can also be formed at the necessity minimum, and the material cost can be reduced.

In this embodiment, the width W of the tether 70B is formed to be greater than the width D of the constantly-open type venthole 18A. Therefore, when the tether 70B passes through the constantly-open type venthole 18A, both end sides in a width direction of the tether 70B is grazed with an inner peripheral edge of the constantly-open type venthole 18A, and a friction resistance is generated.

Accordingly, in this embodiment, at a time when the airbag is expanded, and at an initial stage of the expanding operation when the internal pressure of the airbag is relatively low, since the tether 70B is difficult to move from the constantly-open type venthole 18A to the lid member 80B side because of the friction resistance even when the tether 70B is not pulled toward the inside of the airbag by means of the inner panel 22A, the lid member 60B is held in a state of being overlapped with the venthole 18 from the starting time of the expanding operation of the airbag.

As described above, when the lid member 60B is held in the state of being overlapped with the venthole 18 from the starting time of the expanding operation of the airbag, even at a stage before the tether 70B is strained by being pulled toward the inside of the airbag by means of the inner panel 22A, the gas in the airbag is prevented from being discharged from the venthole 18, or is suppressed to be discharged from the venthole 18.

Incidentally, although the lid member 60B and the tether 70B are provided as separate bodies in this embodiment, the lid member 60B and the tether 70B may be integrally provided similarly to the above-described embodiment in FIGS. 10 through 13a, 13b, and 13c.

In the present invention, the lid member may be integrally provided with at least one of the front panel and the rear panel constituting the airbag.

Figure 17A:
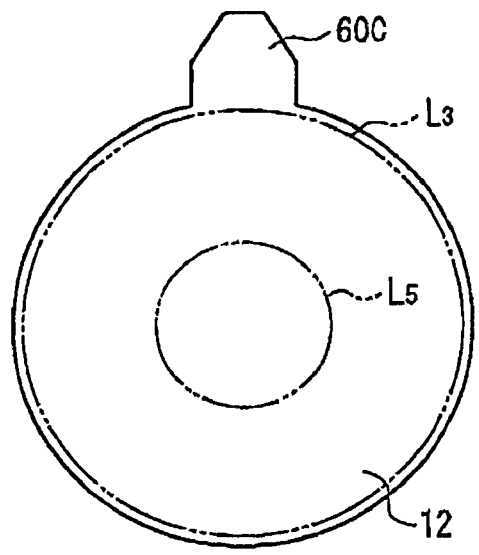
FIG. 17a and FIG. 17b are plan views illustrating a front panel and a rear panel of the airbag according to the embodiment, respectively.
Figure 17B:
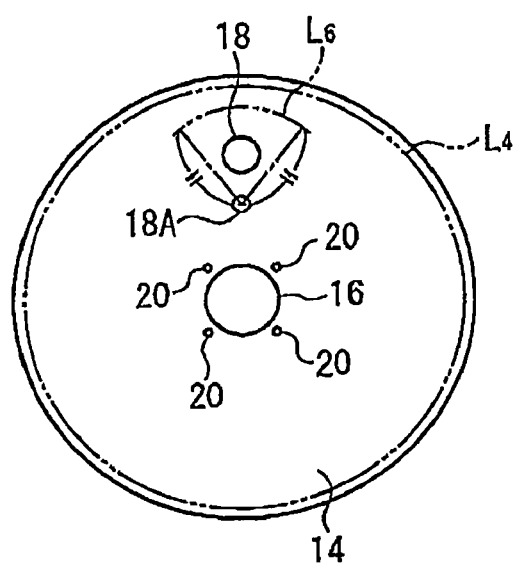
Figure 18A:
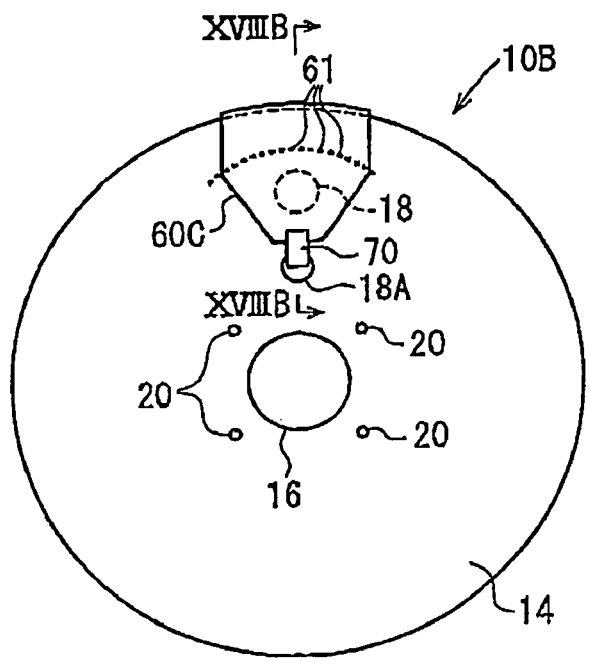
FIG. 18a is a plan view illustrating the airbag in FIG. 17.
Figure 18B:
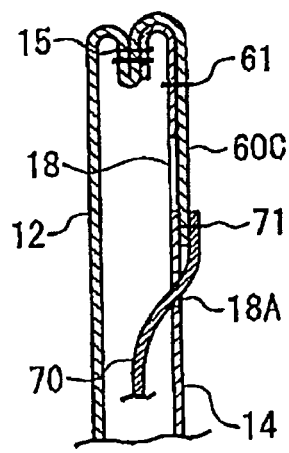

FIGS. 17a and 17b are plan views illustrating the front panel and the rear panel of the thus constructed airbag, respectively, FIG. 18a is a plan view illustrating the rear panel side of the airbag, and FIG. 18b is a cross-sectional view taken along a line XVIIIB-XVIIIB in FIG. 18a.

In an airbag 10B of this embodiment, a lid member 60C is integrally provided with the front panel 12. In this embodiment, the lid member 60C is formed of an extending piece that is extended from a peripheral edge portion of the front panel 12. A tip end side of an extending direction of the lid member 60C is formed to have a shape whose tip end is thinned into an approximately trapezoidal shape. In the lid member 60C, a construction of the portion having the approximately trapezoidal shape is identical of the above-described lid member 60B in FIG. 16.

Chain double-dashed lines $L_3$ and $L_4$ in FIGS. 17a and 17b illustrate predetermined stitching lines for each of peripheral edge portions of the front panel 12 and the rear panel 14, and a chain double-dashed line $L_5$ denotes a predetermined stitching line for the front panel 12 and the inner panel 22A (illustration is omitted).

Upon disposing the lid member 60C in a manner so as to be extended outside of the airbag 10B, each of the peripheral edge portions of the front panel 12 and the rear panel 14 is stitched by means of the seam 15. Thereafter, the lid member 60C is folded back along the outer surface of the rear panel 14, and overlapped with the venthole 18.

In this embodiment, on the outer periphery side of the rear panel 14 relative to the venthole 18, a halfway portion in an extending direction of the lid member 60C is stitched to the rear panel 14 by means of the seam 61. In this embodiment, as illustrated in FIG. 18a the halfway portion in the extending direction of the lid member 60C serves as a boundary portion between a portion having the aforementioned approximately trapezoidal shape and a base end side relative thereto in the lid member 60C.

A chain double-dashed line $L_6$ in FIG. 17b denotes a predetermined stitching line of the lid member 60C and the rear panel 14. As illustrated in FIG. 17b, the predetermined stitching line $L_6$ is curved around the center of the constantly-open type venthole 18A as a curving center, and the seam 61 is extended in a circular arc like manner along the predetermined stitching line $L_6$.

In this embodiment, the tether 70 for coupling the lid member 60C and the inner panel 22A is provided in a separate body from the lid member 60C. One end of the tether 70 is stitched to the vicinity of an intermediate portion in a width direction of a tip end portion of the lid member 60C by means of the seam 71 (in FIG. 18b). The tether 70 is inserted into the constantly-open type venthole 18A and the other end is stitched to the inner panel 22A in the inside of the airbag 10B.

Other construction of the airbag 10B is identical of that of the above-described airbag 10 in FIGS. 1 through 4a, 4b, and 4c, and the same numerals in FIGS. 17a and 17b, and FIGS. 18a and 18b as that in FIGS. 1 through 4a, 4b, and 4c denote the same elements.

In this airbag 10B, since the lid member 60C is integrally provided with the front panel 12, there is no need to manufacture the lid member 60 and the front panel 12 on separate processes, and an airbag-manufacturing facility can be simplified. Further, since the number of the constructional elements is decreased, a reduction of a management cost for each of the constructional elements is realized.

In this embodiment, on the outer peripheral edge side of the rear panel 14 relative to the venthole 18, the halfway portion in an extending direction of the lid member 60C is stitched to the rear panel 14 in a manner so as to have an even radial position from the center of the constantly-open type venthole 18A across an entire width thereof by means of the seam 61. Therefore, at a time of an expanding operation of the airbag 10B, when the lid member 60C is pulled by the tether 70, tensile force is approximately evenly applied between the tip end portion of the lid member 60C and the seam 61 across the entire width of the lid member 60C.

Thereby, the lid member 60C is brought to be approximately evenly attached firmly to the rear panel 14 across the entire width thereof when pulled by the tether 70, and when the tensile force from the tether 70 is released, the lid member 60C is brought to be approximately evenly separated from the rear panel 14 across the entire width.

However, in the present invention, if the seam 61 is formed to have a circular arc shape that is curved around the constantly-open type venthole 18A side as a curving center side, the seam 61 does not always have to be extended in a manner so as to have the even radial position from the center of the constantly-open type venthole 18A.

As described above, when the seam 61 is formed to have a circular arc shape that is curved around the constantly-open type venthole 18A side as a curving center side, the lid member 60C is brought to be attached approximately evenly and firmly to the rear panel 14 across the entire width thereof when pulled by the tether 70, and when the tensile force from the tether 70 is released, the lid member 60C is brought to be approximately evenly separated from the rear panel 14 across the entire width, and an approximately identical operation and advantages as a case that the seam 61 is extended in a manner so as to have the even radial position from the center of the constantly-open type venthole 18A are achieved.

Incidentally, although the illustration is omitted, in the present invention, the lid member 60C may be integrally provided with the rear panel 14. Further, although illustration is omitted, in the present invention, all of the front panel 12 or the rear panel 14, the lid member 60C, and the tether 70 may be integrally constructed.

Next, an application example of the present invention to a passenger airbag is explained with reference to FIGS. 19 through 21.

Figure 19:
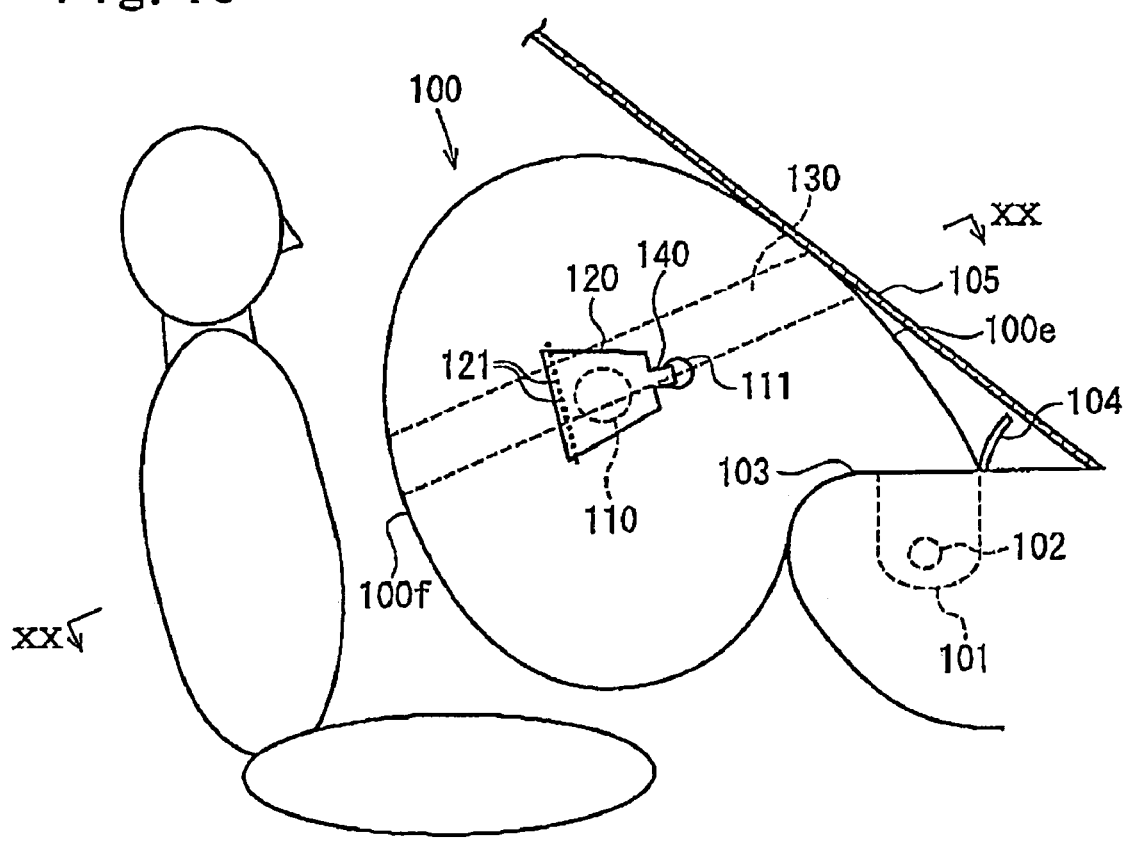
FIG. 19 is a side elevation illustrating a passenger airbag according to the embodiment.
Figure 20:
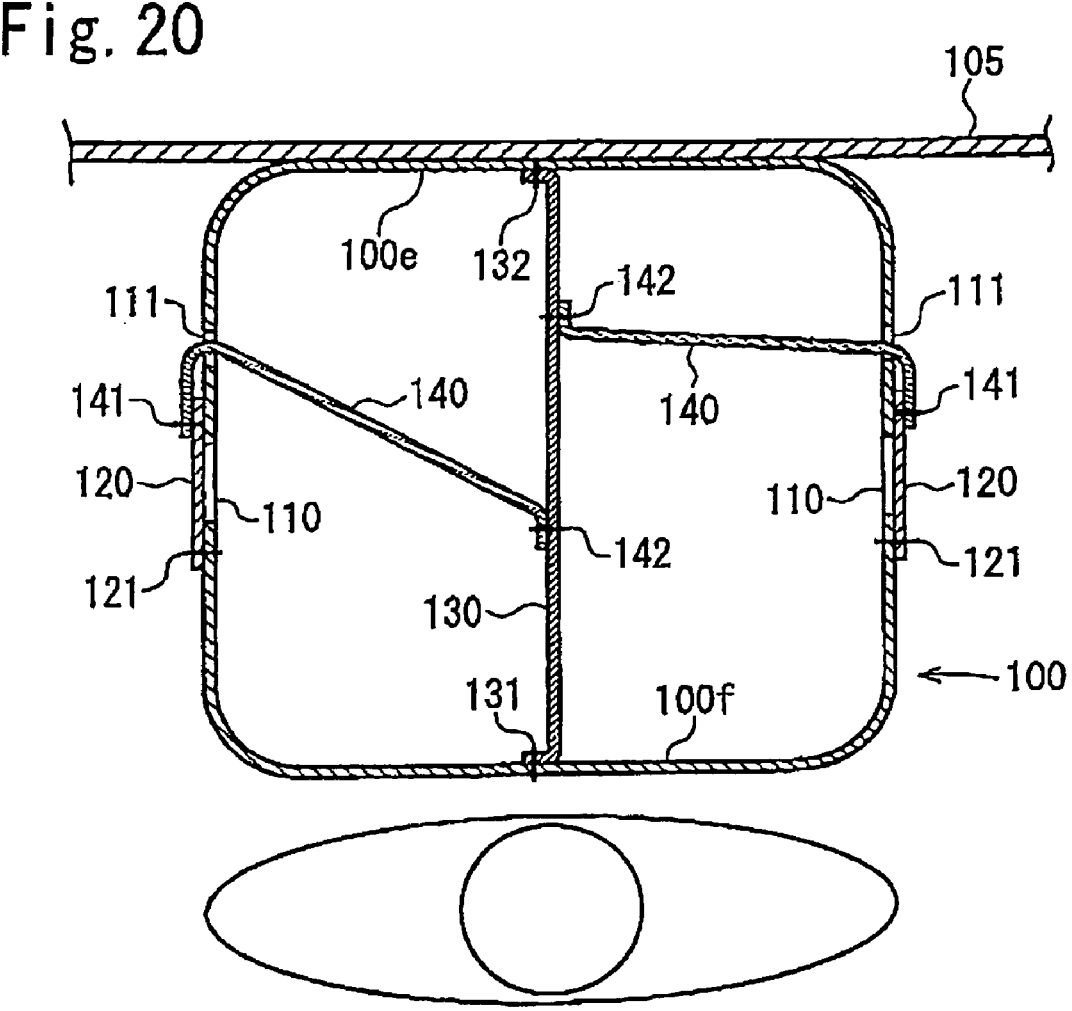
FIG. 20 is a cross-sectional view taken along a line XX-XX in FIG. 19.
Figure 21:
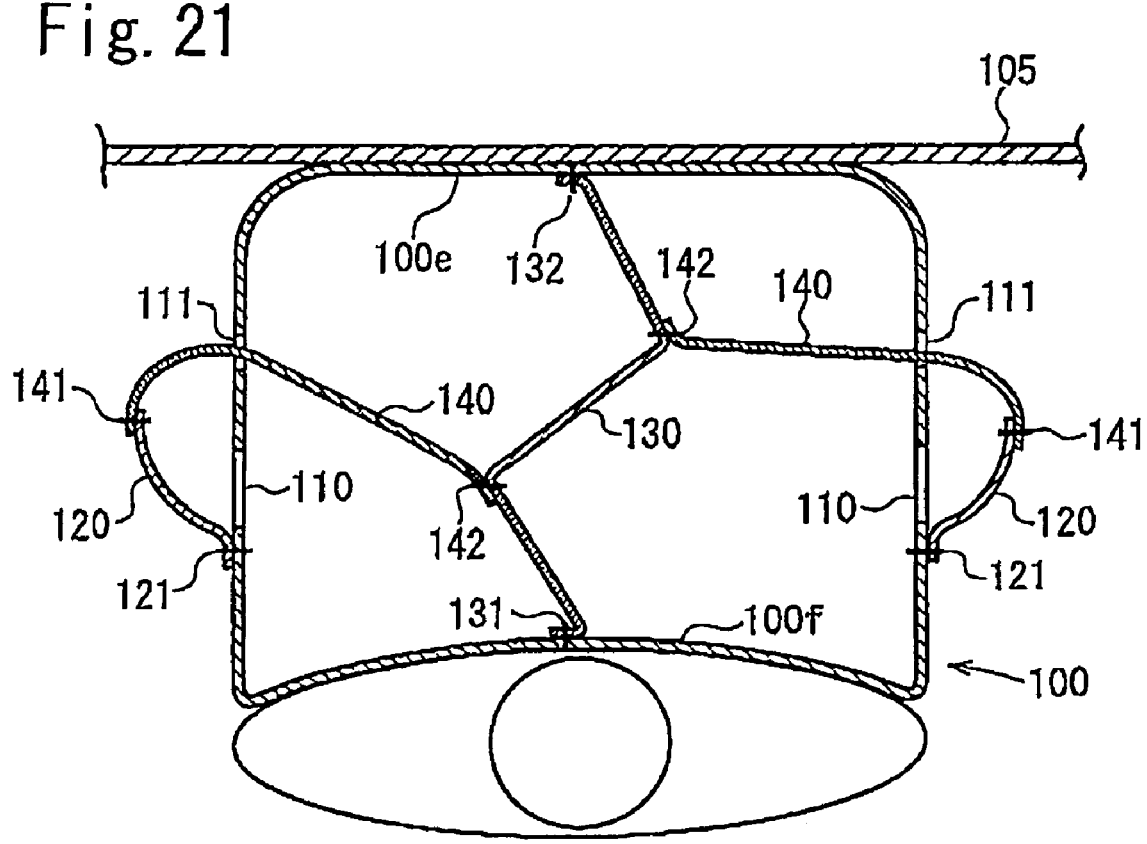
FIG. 21 is a cross-sectional view illustrating the airbag in FIG. 19 when the venthole is opened.

FIG. 19 is a side elevation illustrating a state when a passenger airbag according to the embodiment is expanded, FIG. 20 is a cross-sectional view taken along a line XX-XX in FIG. 19, and FIG. 21 is a cross-sectional view illustrating the same part of FIG. 20 when the venthole is opened.

A passenger airbag 100 is housed in a container 101 while being folded back, and is expanded by means of an inflator 102. This container 101 is installed in an instrument panel 103. An upper part of the container 101 is covered by a lid 104. A reference numeral 105 denotes a windshield.

In this embodiment, a hanging strap 130 serving as an internal member for coupling an occupant-facing surface 100f and a windshield-facing surface 100e of the airbag 100 is provided in an inside of the airbag 100. Reference numerals 131 and 132 in FIG. 20 respectively denote seams that connect both ends of the hanging strap 130 to the occupant-facing surface 100f and the windshield-facing surface 100e.

In this embodiment, ventholes 110 are respectively provided on the left and right side surfaces of the passenger airbag 100, and these ventholes 110 are respectively covered by lid members 120 from an outside of the airbag. Further, in the left and right side surfaces of the passenger airbag 100, at a position in the vicinity of each of the ventholes 110 and that is not covered by the lid member 120, constantly-open type ventholes 111 are respectively provided. Incidentally, as illustrated in FIG. 19, in this embodiment, a constantly-open type venthole 111 is disposed to be positioned on a front side of a vehicle relative to a venthole 110 in a state that the airbag 100 is expanded.

In this embodiment, the lid member 120 is formed to have an approximately trapezoidal shape similar to the lid member 60B in FIG. 16. As illustrated in FIG. 19, the lid member 120 is made to overlap with the venthole 110 in a posture such that a short side (illustration is omitted) is disposed on the constantly-open type venthole 111 relative to the venthole 110, and that a long side (illustration is omitted) is disposed on an opposite side that is opposite to the constantly-open type venthole 111 while sandwiching the venthole 110.

The lid member 120 is stitched to a side surface of the airbag 100 by means of a seam 121 along the long side on the opposite side that is opposite to the constantly-open type venthole 111 while sandwiching the venthole 110.

In the vicinity of an intermediate portion of the short side of the lid member 120, one end of a tether 140 serving as a connecting member is coupled. Reference numeral 141 in FIGS. 20 and 21 denotes a seam by which one end of the tether 140 is stitched to the lid member 120. Incidentally, in this embodiment, although the tether 140 is provided in a separate body from the lid member 120, the tether 140 may be integrally provided with the lid member 120.

The tether 140 is inserted into the constantly-open type venthole 111, and the other end is connected to a halfway portion in a longitudinal direction of the hanging strap 130 by means of a seam 142 in the airbag 100.

As illustrated in FIG. 20, the other end of the tether 140 continuing into the lid member 120 that is disposed on a right side surface of the airbag 100, and the other end of the tether 140 continuing into the lid member 120 that is disposed on a left side surface of the airbag 100 are respectively connected to the hanging strap 130 while displacing positions in the longitudinal direction of the hanging strap 130.

Incidentally, it is natural that, supposedly, when these tethers 140 are connected to the same position in the longitudinal direction of the hanging strap 130, this comes to the same state as that where each of the other ends of the tethers 140 is directly connected without the hanging strap 130, and even when the hanging strap 130 is loosened, the tether 140 is not loosened. Thereby, the lid member 120 cannot be opened toward a side of the airbag 100.

In a passenger airbag apparatus provided with this passenger airbag 100, the inflator 102 is activated to blow out the gas at a time of vehicle collision ort the like, and the airbag 100 starts to be expanded. This airbag 100 is developed toward an occupant in a passenger seat from an upper surface of the instrument panel 103, upon pushing open the lid 104, as illustrated in FIG. 19. On this occasion, the hanging strap 130 is extended between the occupant-facing surface 100f and the windshield-facing surface 100e along with a movement of the occupant-facing surface 100f toward an occupant side, and thereby each of the tethers 140 is pulled inside of the airbag 100.

Thereby, as illustrated in FIG. 20, each of the lid members 120 is also respectively under strain along the left and right side surfaces of the airbag 100, and each of the ventholes 110 is closed by means of the lid members 120. As a result, the pressure in the airbag 100 is rapidly brought to high internal pressure, and an expanding and developing operation of the airbag 100 is hastened.

Thereafter, in a case that the occupant hits the expanded airbag 100, as illustrated in FIG. 21, since the occupant-facing surface 100f is pushed by the occupant and thereby retreated, the hanging strap 130 is loosened, and the force that pulls each of the tethers 140 inside of the airbag 100 is released. Thereby, the tension of each of the lid members 120 is also released, and each of the lid members 120 becomes separated from the side surface of the airbag 100 by the gas-pressure in the airbag 100 and each of the ventholes 110 is brought to an open state, and the gas is brought to be rapidly discharged outside of the airbag 100 from both of each of the ventholes 110 and the constantly-open type venthole 111.

Incidentally, in this embodiment, as illustrated in FIG. 21, since a gap between the lid member 120 and the airbag 100 is opened toward the windshield 105, the gas that has passed through the venthole 110 is to be discharged toward the windshield 105.

In this embodiment, although both of the tether 140 continuing into the lid member 120 disposed on the right side surface of the airbag 100 and the tether 140 continuing into the lid member 120 disposed on the left side surface of the airbag 100 are coupled with one hanging strap 130 provided inside of the airbag 100, the construction may be made in such a way that a plurality of hanging straps are provided inside of the airbag, and these tethers 140 are respectively coupled with different hanging straps respectively.

Figure 32:
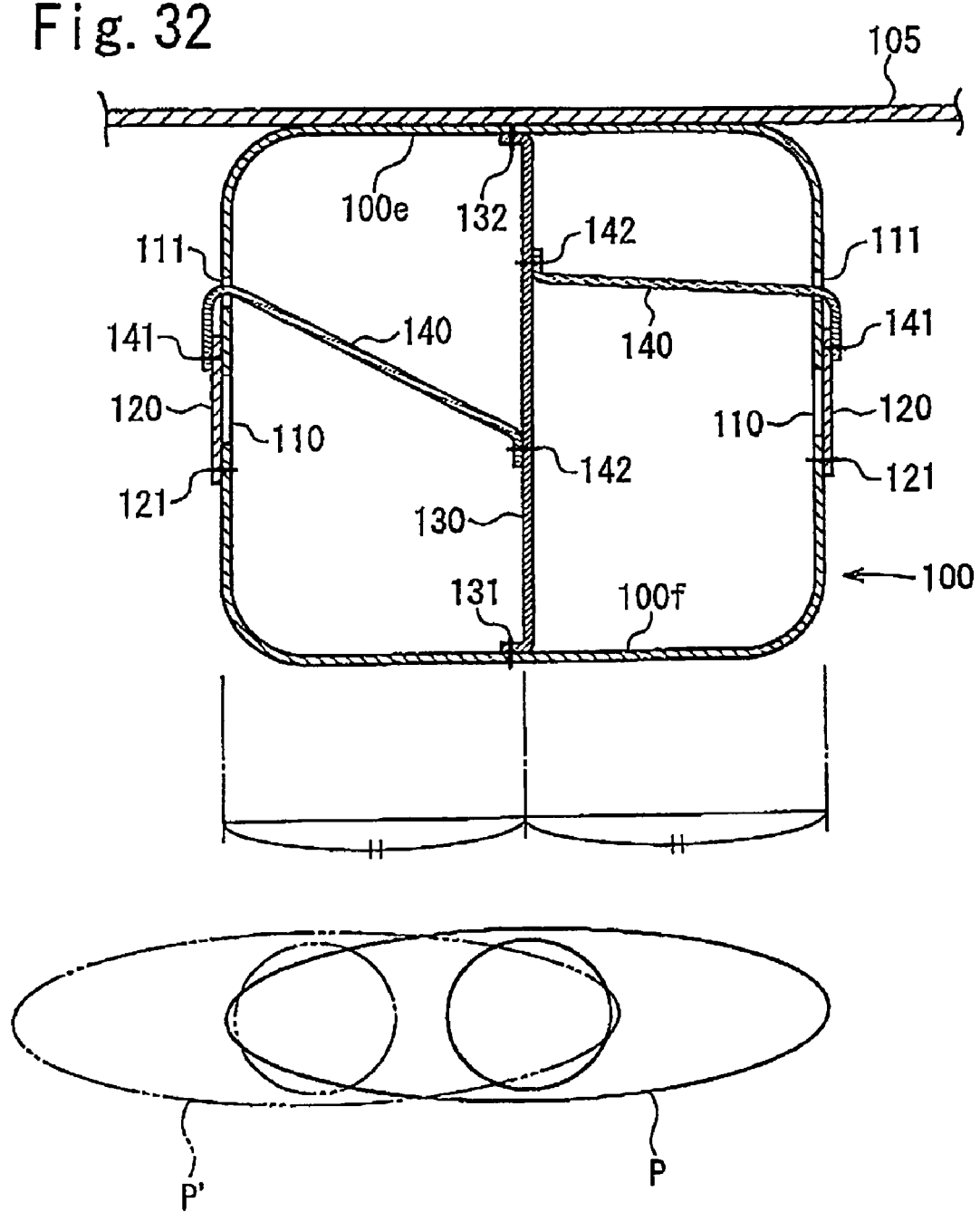
FIG. 32 is a cross-sectional view of the same part in FIG. 20 illustrating an arrangement of a connecting portion of a hanging strap and an occupant-facing surface of the airbag.

In the present invention, it is preferable for a connecting portion of the connecting member and the occupant-facing surface of the airbag, or a connecting portion of the internal member with which the connecting member is coupled and the occupant-facing surface to be disposed in the vicinity of the intermediate portion in a left-and-right direction of the occupant-facing surface. The reason for this is explained while citing the aforementioned airbag 100 with reference to FIG. 32. FIG. 32 is a cross-sectional view of the same part as that in FIG. 20, illustrating an arrangement of the connecting portion of the hanging strap serving as the internal member, and the occupant-facing surface of the airbag.

As illustrated in FIG. 32, in the airbag 100, an end portion on the occupant side of the hanging strap 130 where each of the tethers 140 serving as the connecting member is continuing into is connected to the vicinity of the intermediate portion in the left-and-right direction of the occupant-facing surface of the airbag 100.

In the thus constructed airbag 100, at the time when the airbag 100 is expanded, in a case that the occupant P is received in the vicinity of the intermediate portion in the left-and-right direction of the occupant-facing surface 10f, this occupant P directly presses the vicinity of the connecting portion of the hanging strap 130 and the occupant-facing surface 100f in the occupant-facing surface 100f inside of the airbag, and thereby the hanging strap 130 is rapidly loosened and each of the lid members 120 rapidly starts to be opened.

In contrast, at the time when the airbag 100 is expanded, in a case that the occupant P' is received at a position deviated to the left and right from the vicinity of the intermediate portion in the left-and-right direction of the occupant-facing surface 100f, since the vicinity of the connecting portion of the hanging strap 130 and the occupant-facing surface in the occupant-facing surface 100f is not directly pressed, the hanging strap 130 is slowly loosened, and as a result, each of the lid members 120 slowly starts to be opened.

As described above, in the present invention, it is preferable for the venthole to have a state to be covered by the lid member from the starting time of the expanding operation of the airbag. Hereinbelow, a folding back method of the airbag to achieve such an advantage is explained.

Figure 23A:
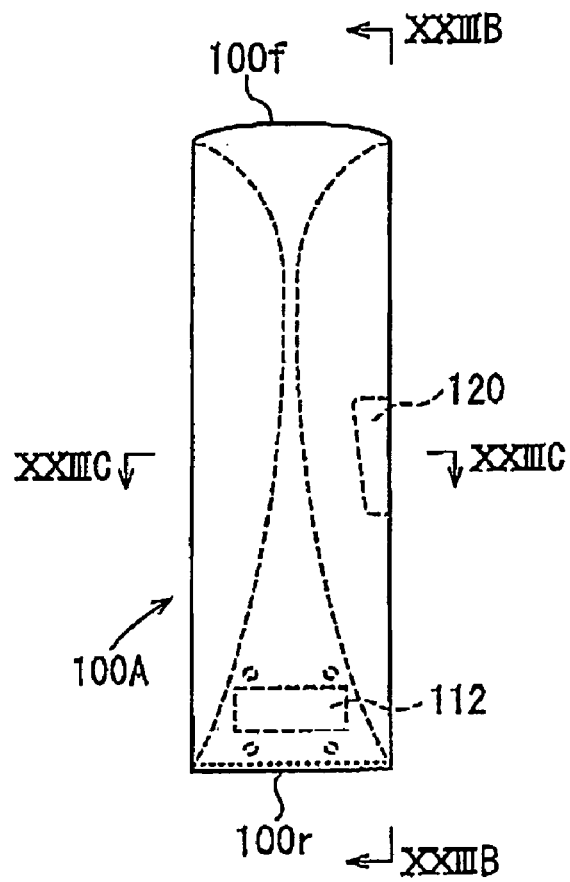
Figure 23B:
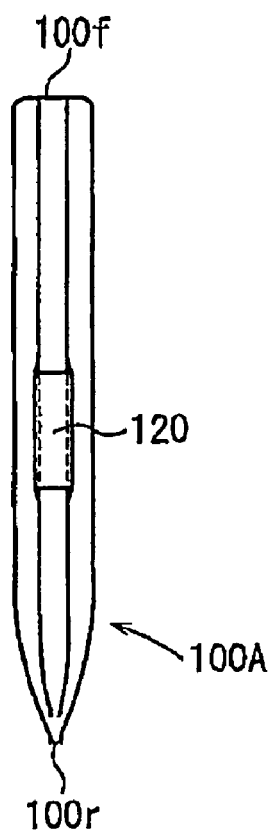
Figure 23C:
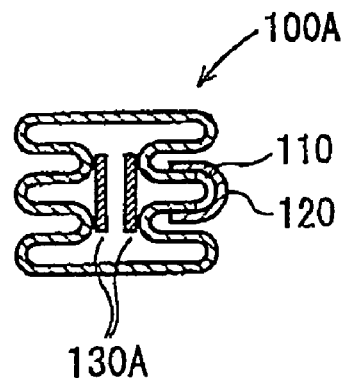
Figure 24A:
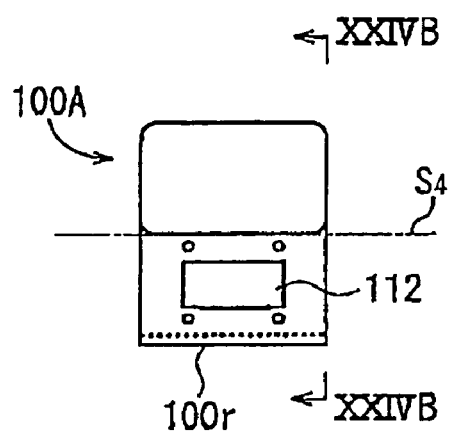
Figure 24B:
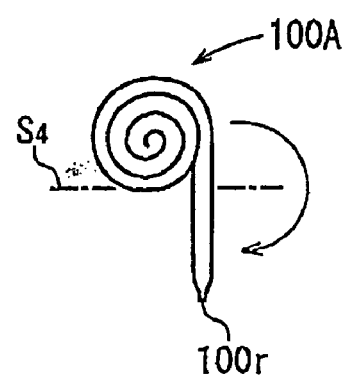
Figure 25A:
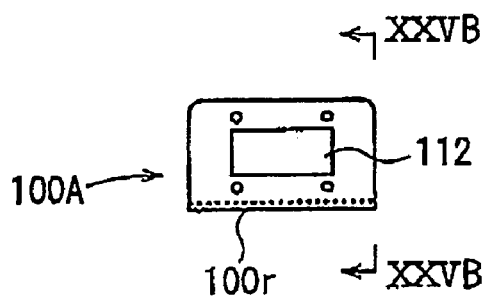
FIG. 25a is a plan view looking from below, illustrating a state after the folding back operation of the passenger airbag in FIG. 22a is completed.
Figure 25B:
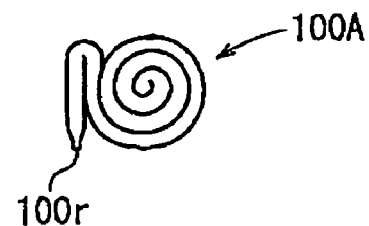

FIG. 22a and FIG. 22b are construction views illustrating a state before a passenger airbag, which is folded back by means of the folding back method, is folded back, and FIGS. 23a, 23b through 25a, and 25b are explanatory views of a folding back procedure of this passenger airbag. Incidentally, FIG. 22a is a cross-sectional view along a line XXIIA-XXIIA in FIG. 22b, and FIG. 22b is a fragmentary view in the direction of the arrows XXIIB-XXIIB in FIG. 22a. FIG. 23a is a plan view illustrating this passenger airbag from an upper surface side, FIG. 23b is a fragmentary view in the direction of the arrows XXIIIB-XXIIIB in FIG. 23a, and FIG. 23c is a cross-sectional view taken along a line XXIIIC-XXIIIC in FIG. 23a. FIG. 24a and FIG. 25a are respectively plan views illustrating this passenger airbag from a lower surface side, FIG. 24b is a fragmentary view in the direction of the arrows XXIVB-XXIVB in FIG. 24a, and FIG. 25b is a fragmentary view in the direction of the arrows XXVB-XXVB in FIG. 25a.

In an explanation below, the left-and-right direction is conformed to the left-and-right direction in FIG. 22a.

In the passenger airbag 100A in this embodiment, two hanging straps 130A for coupling the occupant-facing surface 100f with the vicinity of a base end 100r in an expanding direction of the airbag 100A are provided inside thereof. These hanging straps 130A are disposed at different positions in the left and right. The reference numerals 131 and 132 in FIG. 22a denote seams by which both ends of each hanging strap 130A are respectively connected to the occupant-facing surface 100f and the vicinity of the base end 100r. Moreover, a reference numeral 112 denotes an opening for use in introducing a gas, which is provided in the vicinity of the base end 100r on a lower surface of this airbag 100A.

Around a periphery of an opening 112, a plurality of small holes (reference numerals are omitted) where bolts of an airbag-attaching member (illustration is omitted) are inserted are provided.

In this embodiment, the venthole 110 and the constantly-open type venthole 111 are provided in a right side surface in FIG. 22a of the airbag 100A, and the lid member 120 covers the venthole 110 from the outside of the airbag. In this embodiment, the venthole 110 and the constantly-open type venthole 111 are disposed in the vicinity of the intermediate portion in an upper and lower direction on a right side surface of the airbag 100A. Furthermore, the constantly-open type venthole 111 is disposed on the base end 100r side relative to the venthole 110.

In this embodiment, the lid member 120 is also formed to have an approximately trapezoidal shape similar to that of the lid member 60B in FIG. 16, and as illustrated in FIG. 22b, is made to overlap with the venthole 110 in a posture such that the short side (reference numeral is omitted) is disposed on the constantly-open type venthole 111 side relative to the venthole 110, and that the long side (reference numeral is omitted) is disposed on the opposite side that is opposite to the constantly-open type venthole 111 while sandwiching the venthole 110. Moreover, the lid member 120 is stitched to a side surface of the airbag 100 by means of the seam 121 along the long side, on the opposite side that is opposite to the constantly-open type venthole 111 while sandwiching the venthole 110.

In the vicinity of the intermediate portion of the short side of the lid member 120, one end of the tether 140 serving as the connecting member is coupled. This tether 140 is inserted into the constantly-open type venthole 111, and the other end is connected to a halfway portion in a longitudinal direction of one of the hanging strap 130A (right side in FIG. 22a) by means of the seam 142 in the inside of the airbag 100.

Other construction of the airbag 100A is identical of that of the above-described airbag 100 in FIGS. 19 through 21, and the same numerals in FIGS. 22a, 22b through 25a, and 25b as that in FIGS. 19 through 21 denote the same elements.

In a case that the passenger airbag 100A is folded back, the lid member 120 is made to overlap with the right side surface of the airbag 100A in a manner so as to cover the venthole 110 first.

Then, as illustrated in FIG. 22b, the lid member 120 and the right side surface of the airbag 100A are mountain-folded in an integral manner along a folding line $S_1$ traversing the venthole 110 and the lid member 120, and being extended in a direction connecting the occupant-facing surface 100f and the base end 100r of the airbag 100A. Further, in the right side surface, the vicinity of an intermediate portion between the folding line $S_1$ and an upper surface of the airbag 100A, and the vicinity of an intermediate portion between the folding line $S_1$ and a lower surface of the airbag 100A are respectively valley-folded in a wrapping manner inside of the airbag 100A along a folding lines $S_2$, and $S_3$, which are extended in a direction of connecting the occupant-facing surface 100f and the base end 100r.

A left side surface of the airbag 100A is also folded along the folding lines $S_1$, $S_2$, and $S_3$, in a similar manner as that of the right side surface.

Thereby, the left and right side surfaces of the airbag 100A are folded back in zigzags, and the airbag 100A is formed into a flat-belt shaped intermediate folded-back body as illustrated in FIGS. 23a through 23c.

Incidentally, the number of the folding back operation of the left and right side surfaces of the airbag 100A may be smaller than or larger than that of the above-described.

Next, as illustrated in FIGS. 24a and 24b, the intermediate folded-back body of the airbag 100A is wound in a roll shape up to the vicinity of the opening 112 for use in introducing a gas in a folding back manner from the occupant-facing surface 100f side to the lower surface side of the airbag 100A by every predetermined width.

Thereafter, a portion that is wound in the roll shape is folded back toward an upper face side of the airbag 100A along a folding line $S_4$ (in FIG. 24a) extending in a left-and-right direction, and is formed into a block-shaped folded-back body, illustrated in FIGS. 25a and 25b.

In a case that the thus folded back airbag 100A is expanded, since the lid member 120 is difficult to be separated from the venthole 110 until a fold of the lid member 120 and a venthole-peripheral area of the right side surface of the airbag 100A is released, the lid member 120 is in a state of being overlapped with the venthole 110 from the starting time of the expanding operation of the airbag 100A. Thereby, at an initial stage of the expanding operation of the airbag 100A, the gas in the airbag 100A is prevented from being discharged from the venthole 110, or is suppressed to be discharged from the venthole 110.

When the expanding operation of the airbag 100A proceeds and the hanging strap 130A is extended between the occupant-facing surface 100f and the base end 100r of the airbag 100A, the tether 140 is pulled inside of the airbag 100A by means of the hanging strap 130A, and is strained. Thereby, the lid member 120 is also under strain along the side surface of the airbag 100A, and the lid member 120 is brought to close the venthole 110 against the internal pressure of the airbag 100A.

In the present invention, the airbag for use in a driver's seat can be folded back in such a way that the lid member covers the venthole from the starting time of the expanding operation as described above. Hereinbelow, a folding back method of the airbag for use in the driver's seat is explained with reference to FIGS. 26a, 26b, and 26c through 30a, and 30b.

Figure 26A:
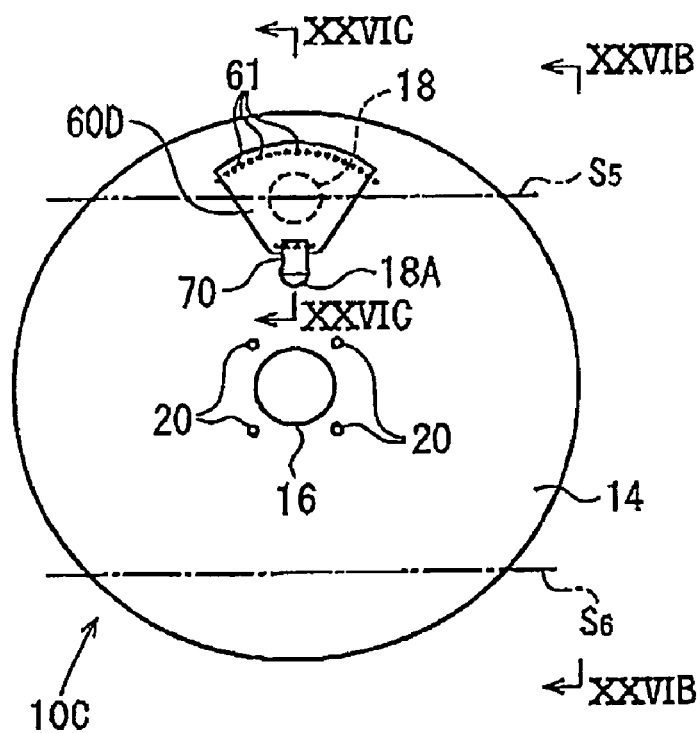
FIG. 26a is a plan view illustrating a state before an airbag for use in a driver's seat according to the embodiment is folded back.
Figure 26B:
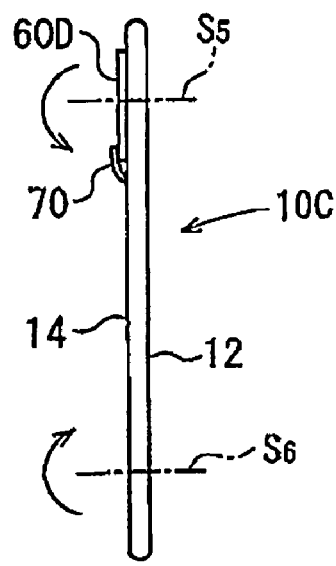
Figure 26C:
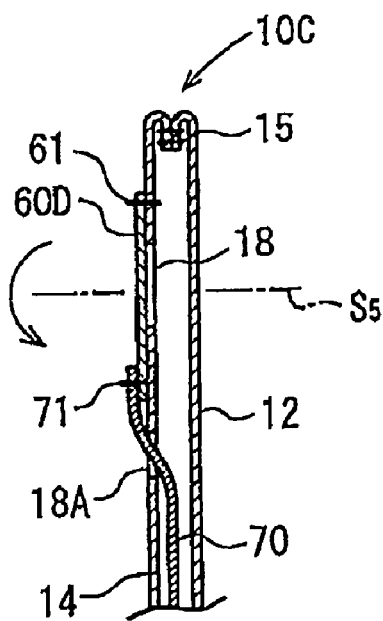
Figure 27A:
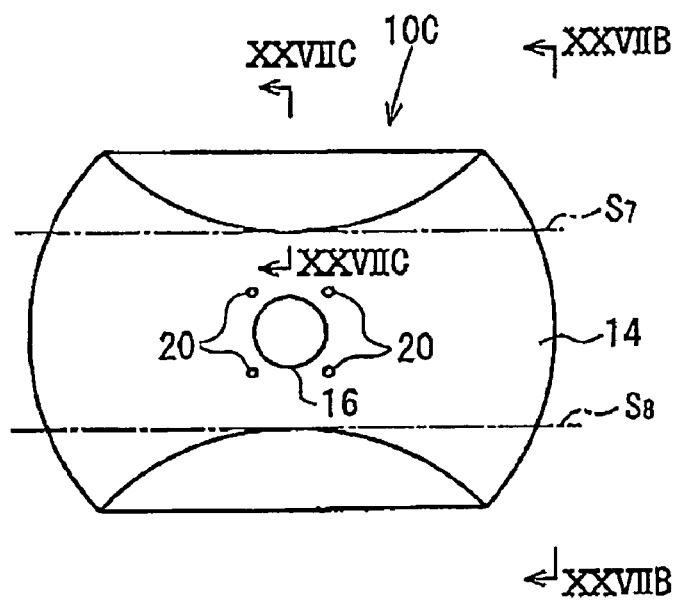
Figure 27B:
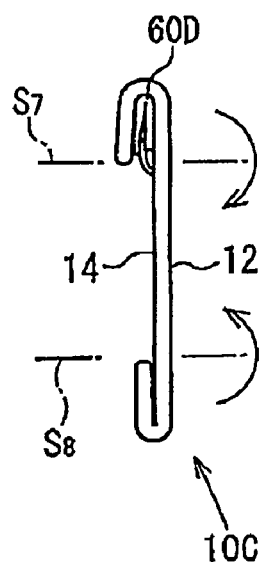
Figure 27C:
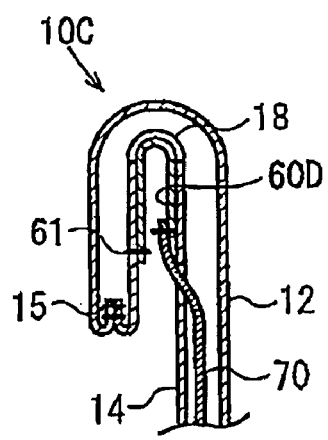
Figure 30A:
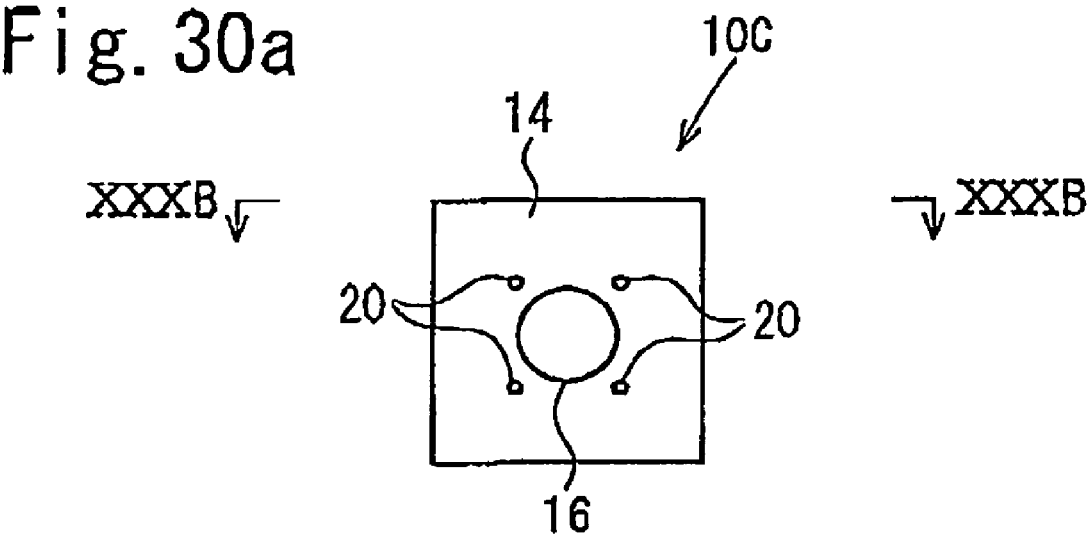
FIG. 30a is a plan view illustrating a state after the folding back operation of the airbag for use in a driver's seat in FIG. 26a is completed.
Figure 30B:
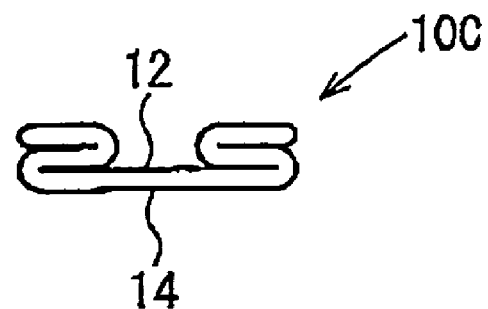

FIGS. 26a through 26c are construction views illustrating a state before the airbag for use in the driver's seat, which is folded back by means of the folding back method, is folded back, and FIGS. 27a, 27b, and 27c through 30a, and 30b are explanatory views illustrating a folding back procedure of the airbag for use in the driver's seat. Incidentally, FIGS. 26a, 27a, 28a, 29a, and 30a are plan views illustrating a rear panel side of the airbag, respectively, FIGS. 26b, 27b, 28b, 29b, and 30b are a fragmentary view in the direction of the arrows XXVIB-XXVIB in FIG. 26a, a fragmentary view in the direction of the arrows XXVIIB-XXVIIB in FIG. 27a, a fragmentary view in the direction of the arrows XXVIIIB-XXVIIIB in FIG. 28a, a fragmentary view in the direction of the arrows XXIXB-XXIXB in FIG. 29a, and a fragmentary view in the direction of the arrows XXXB-XXXB in FIG. 30a, respectively, and FIGS. 26c and 27c are a cross-sectional view taken along a line XXVIC-XXVIC in FIG. 26a, and a cross-sectional view taken along a line XXVIIC-XXVIIC in FIG. 27a, respectively.

In an explanation below, the upper and lower direction, and the left-and-right direction are conformed to the upper and lower direction, and the left-and-right direction in FIG. 26a.

In an airbag 10C for use in the driver's seat in the embodiment, a lid member 60D having an approximately trapezoidal shape in the embodiment in FIG. 16 is provided in the above-described airbag 10 in FIGS. 1 through 4a, 4b, and 4c. The airbag 10C is constructed such that a long side of the lid member 60D is stitched to the rear panel 14 in a circular arc shaped manner by means of the seam 61 that is extended in a manner so as to curve around the center of the constantly-open type venthole 18A as a curving center. However, as described above, the seam 61 does not always have to be extended in the even radial position from the center of the constantly-open type venthole 18A, as long as the seam 61 has a circular arc shape that is curved around the constantly-open type venthole 18A side as a curving center side.

Other construction of the airbag 10C is identical of that of the airbag 10 illustrated in FIGS. 1 through 4a, 4b, and 4c, and the same numerals in FIGS. 26a, 26b, and 26c through 30a, and 30b as that in FIGS. 1 through 4a, 4b, and 4c denote the same elements.

In a case that the airbag 10C for use in the driver's seat is folded back, the lid member 60D is made to overlap with the rear panel 14 in a manner so as to cover the venthole 18 first.

Then, as illustrated in FIG. 26a, the lid member 60D and an upper portion of the airbag 10C are folded back toward the rear panel 14 side in an integral manner along a folding line $S_5$ traversing the venthole 18 and the lid member 60D, and being extended in the left-and-right direction. Further, a lower portion side of the airbag 10C is also folded back toward the rear panel 14 side along a folding line $S_6$, which is extended in the left-and-right direction at a position that is spaced apart by a predetermined distance from a lower end of the airbag 10C to a center side of the airbag 10C. FIGS. 27a through 27c illustrate this state.

Then, at a position that is spaced apart by a predetermined distance from the folding line $S_5$ to the center side of the airbag 10C, the upper side of the airbag 10C is folded back toward the front panel 12 side along a folding line $S_7$ (in FIG. 27a) extending in the left-and-right direction. Furthermore, the lower portion side of the airbag 10C is folded back toward the front panel 12 side along a folding line $S_8$ (in FIG. 27a) extending in the left-and-right direction at a position that is spaced apart by a predetermined distance from the folding line $S_6$ to the center side of the airbag 10C. FIG. 28a and FIG. 28b illustrate this state.

Then, at a position that is spaced apart by a predetermined distance from a left end of the airbag 10C to a center side of the airbag 10C, the left end portion of the airbag 10C is folded back toward the rear panel 14 side along a folding line $S_9$ (in FIG. 28*a*) extending in an upper and lower direction. Moreover, at a position that is spaced apart by a predetermined distance from a right end of the airbag 10C to the center side of the airbag 10C, a right end portion of the airbag 10C is folded back toward the rear panel 14 side along a folding line $S_{10}$ (in FIG. 28*a*) extending in the upper and lower direction. FIG. 29*a* and FIG. 29*b* illustrate this state.

Thereafter, at a position that is spaced apart by a predetermined distance from the folding line $S_9$ to the center side of the airbag 10C, a left end side of the airbag 10C is folded back toward the front panel 12 side along a folding line $S_{11}$ (in FIG. 29*a*) extending in the upper and lower direction. Further, at a position that is spaced apart by a predetermined distance from the folding line $S_{10}$ to the center side of the airbag 10C, a right end side of the airbag 10C is folded back toward the front panel 12 side along a folding line $S_{12}$ (in FIG. 29*a*) extending in the upper and lower direction. Thereby, the airbag 10C is formed into the block-shaped folded-back body illustrated in FIGS. 30*a* and 30*b*.

In a case that the thus folded-back airbag 10C is expanded, since the lid member 60D is difficult to be separated from the venthole 18 until a fold of the lid member 60D and a venthole-peripheral area of the upper end portion of the airbag 10C is released, the lid member 60D is in a state of being overlapped with the venthole 18 from the starting time of the expanding operation of the airbag 10C. Thereby, at an initial stage of the expanding operation of the airbag 10C, the gas in the airbag 10C is prevented from being discharged from the venthole 18, or is suppressed to be discharged from the venthole 18.

When the expanding operation of the airbag 10C proceeds and the inner panels 22A and 22B (illustration is omitted) is extended toward the occupant side, the tether 70 is pulled inside of the airbag 10C by means of the inner panels 22A and 22B, and is strained. Thereby, the lid member 60D is also under strain along the outer surface of the rear panel 14, and the lid member 60D is brought to close the venthole 18 against the internal pressure of the airbag 10C.

Other than integrally folding back the lid member and the airbag as described above, although not illustrated, it may be applicable to construct that the lid member is disconnectably connected to a venthole-peripheral portion until the internal pressure of the airbag is brought to the predetermined pressure or more. As such a connecting device, for example, a tear seam that is torn when a predetermined tensile force or more is applied, an adhesive agent having low adhesive force, or the like is recited.

Incidentally, instead of disconnectably connecting the lid member to the venthole-peripheral portion, the tether may be disconnectably connected to a peripheral portion of the constantly-open type venthole, or the like.

Figure 33A:
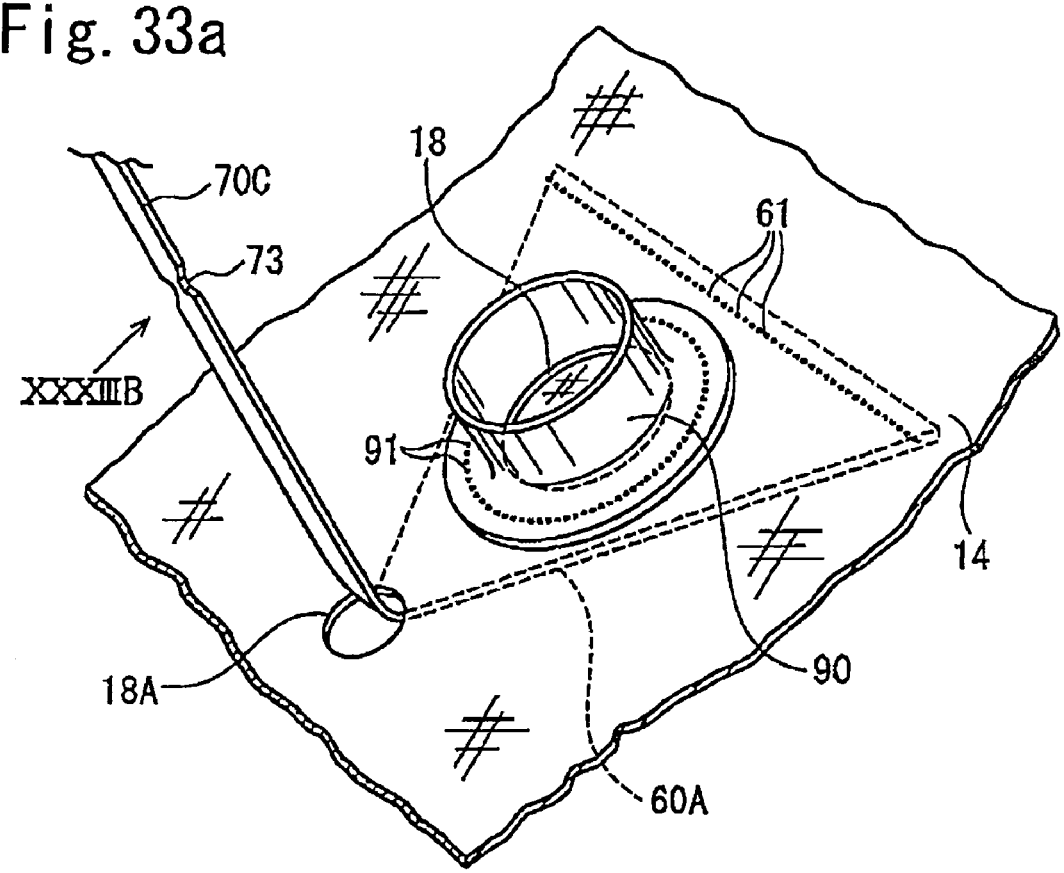
FIG. 33a is a perspective view illustrating the vicinity of the venthole of the airbag according to the embodiment.

In the present invention, it may be applicable to construct that the connecting member is torn when the internal pressure of the airbag is brought to the predetermined pressure or more, and coupling of the lid member with the occupant-facing surface of the airbag, or the coupling of the lid member with the internal member is released. FIG. 33*a* is a perspective view illustrating the vicinity of the venthole of the thus constructed airbag, and FIG. 33*b* is an enlarged view (front elevation) illustrating a portion XXXIIB in FIG. 33*a*.

Figure 33B:
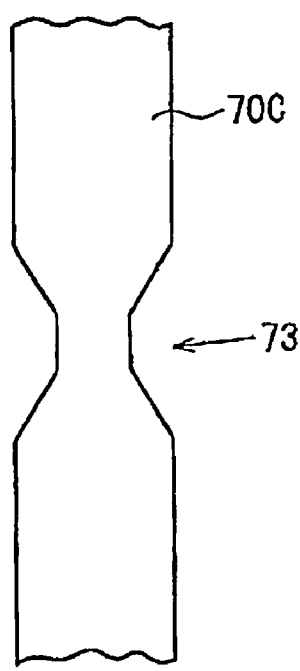

FIGS. 33*a* and 33*b* illustrate a construction where a predetermined tear portion 73 is provided at a halfway portion in a longitudinal direction of the tether 70C serving as a connecting member for coupling the lid member 60A and the inner panel 22A, in the above-described embodiment in FIG. 15. In this embodiment, the predetermined tear portion 73 is a fragile portion formed by partially narrowing a width of the tether 70C at the halfway portion in the longitudinal direction thereof. The tether 70C is torn at the predetermined tear portion 73 when the internal pressure of the airbag is brought to the predetermined pressure or more, and releases coupling of the lid member 60A with the inner panel 22A.

Other construction of the embodiment in FIGS. 33*a* and 33*b* is identical of that of the embodiment in FIG. 15.

In an airbag provided with the thus constructed tether 70C, even when the lid member 60A is not opened by that the occupant-facing surface of the expanded airbag is pressed by the occupant, since the tether 70C is torn at the predetermined tear portion 73 and the coupling of the lid member 60A with the inner panel 22A is released when the internal pressure of the airbag is brought to the predetermined pressure or more, the lid member 60A is opened and the venthole 18 is thereby opened, and the gas is brought to be discharged outside of the airbag.

Incidentally, the construction of the predetermined tear portion, i.e., the fragile portion is not limited to the above-described. For example, although illustration is omitted, it may be applicable that a tether is constructed by connecting each of other ends of a half body of a tether whose one end continues into the lid member 60A and a half body of a tether whose one end continues into the inner panel 22A, and a connecting operation of each of the half bodies of the tether is performed using a stitching thread that is cut when the internal pressure of the airbag is brought to the predetermined pressure or more, the adhesive agent having low adhesive force, or the like. Alternatively, the connecting operation of the tether to the lid member 60A, or the connecting operation of the tether to the inner panel 22A may be performed using the stitching thread that is cut when the internal pressure of the airbag is brought to the predetermined pressure or more, the adhesive agent having low adhesive force, or the like.

Although illustration is omitted, in each of the aforementioned embodiments other than that illustrated in FIG. 15, similarly to this embodiment, it may also be applicable to construct that the tether is torn when the internal pressure of the airbag is brought to the predetermined pressure or more.

Figure 34:
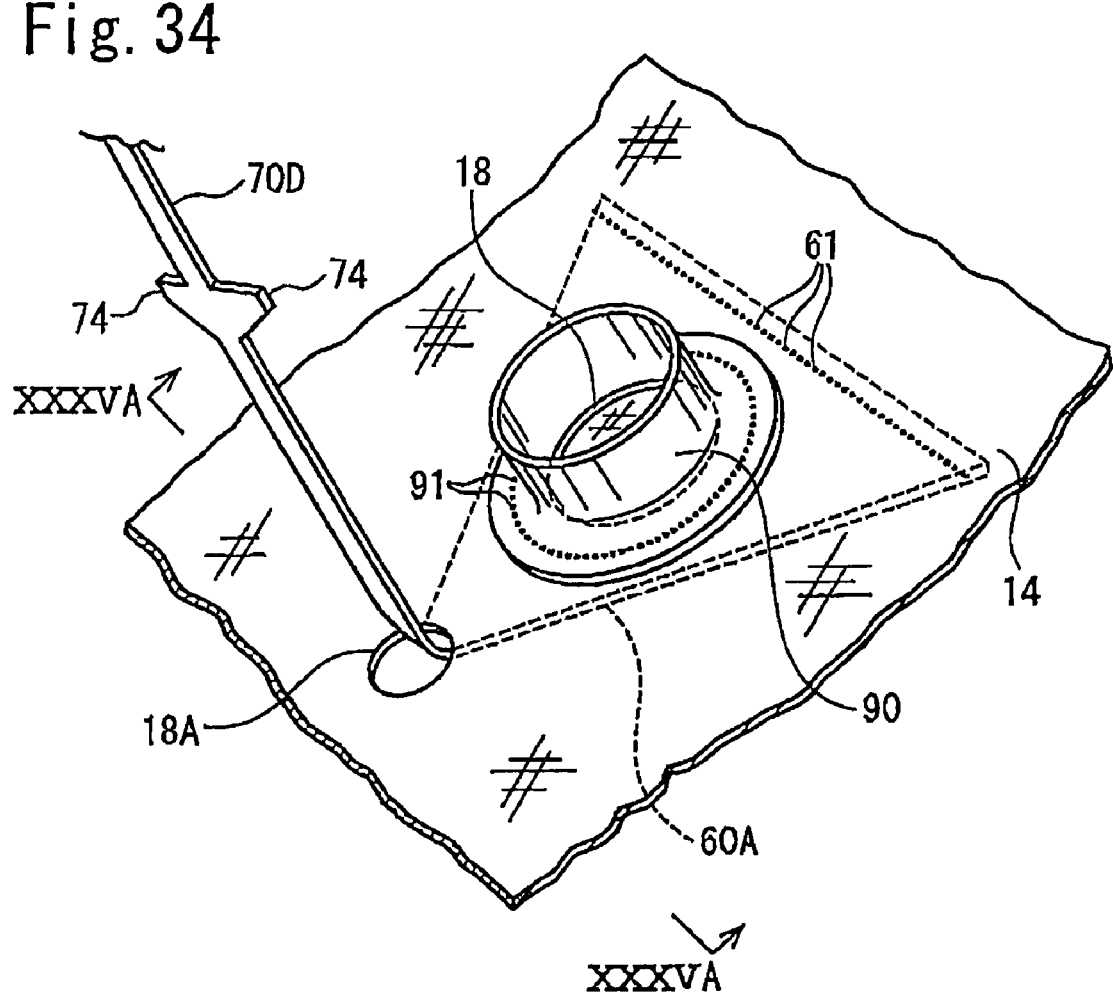
FIG. 34 is a perspective view illustrating the vicinity of the venthole of the airbag according to the embodiment.
Figure 35A:
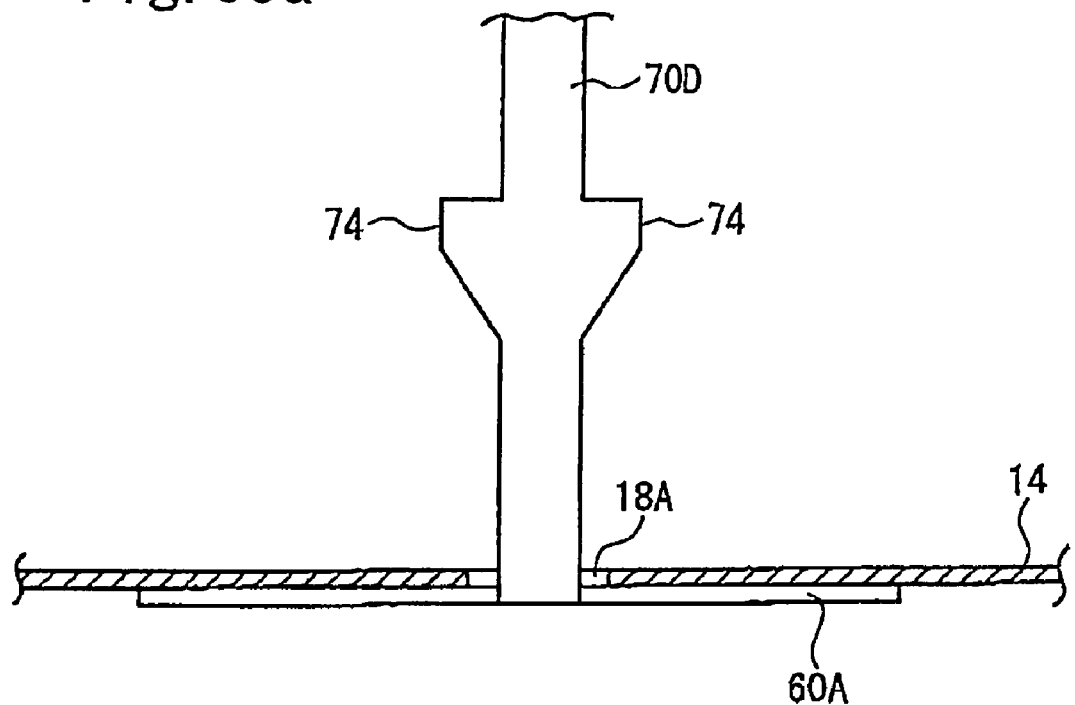
FIG. 35a and FIG. 35b are cross-sectional views, respectively, taken along a line XXXVA-XXXVA in FIG. 34.
Figure 35B:
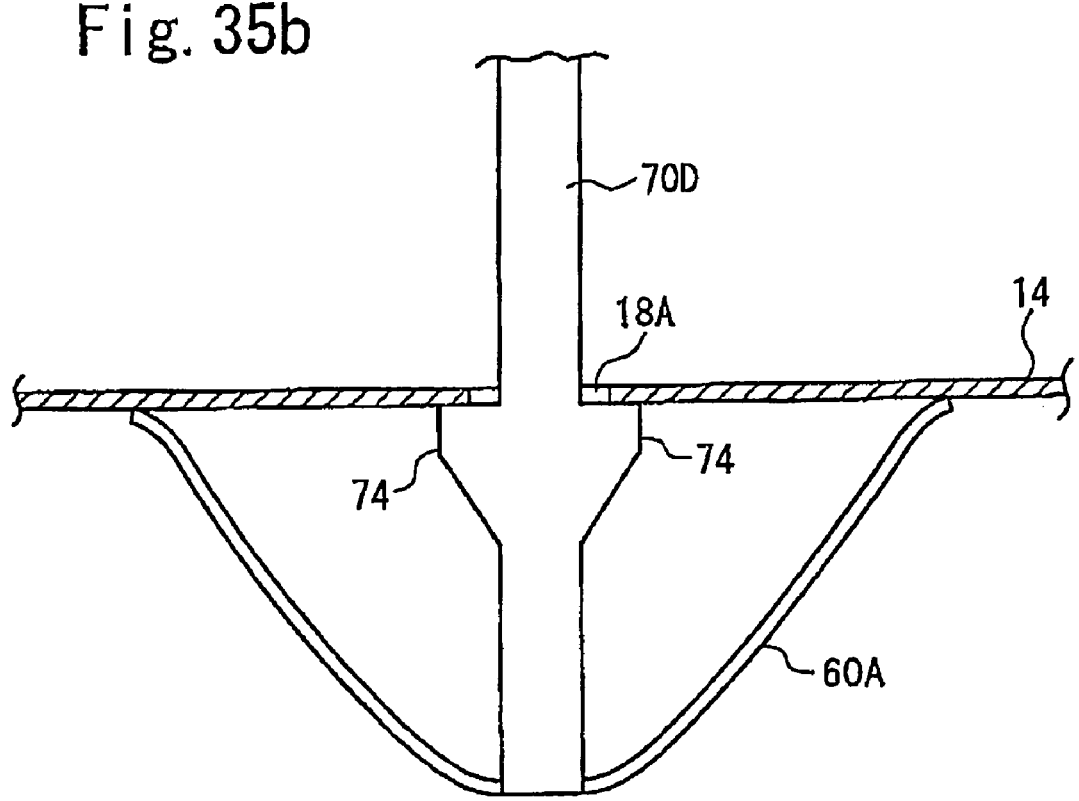

FIG. 34 is a perspective view illustrating the vicinity of the venthole of the airbag according to still another embodiment, FIGS. 35*a* and 35*b* are cross-sectional views taken along a line XXXVA-XXXVA in FIG. 34. Incidentally, FIG. 35*a* illustrates a state that the lid member is made to overlap with the venthole, and FIG. 35*b* illustrates a state that the lid member becomes separated from the venthole.

The embodiment in FIGS. 34, 35*a*, and 35*b* illustrate a construction in which a pair of overhanging portions 74 that respectively overhang sideward from both side edges of a halfway portion in a longitudinal direction of a tether 70D, which serves as a detent device for the tether 70D, is provided at the halfway portion in the longitudinal direction of the tether 70D that couples the lid member 60A and the inner panel 22A, in the above-described embodiment in FIG. 15. These overhanging portions 74 and 74 are disposed at a position, which is spaced apart by a predetermined distance from an end portion on the lid member 60A side of the tether 70D to an end portion on the inner panel 22A side thereof.

In this embodiment, each of the overhanging portions 74 is integrally provided with the tether 70D using a common base cloth with the tether 70D. As illustrated in FIGS. 35*a* and 35*b*, each of the overhanging portions 74 is formed to have a tapered shape in which the more the position on an overhanging portion 74 approaches the inner panel 22A side, the larger the overhanging width from the side edge of the tether 70D becomes.

Other construction of the embodiment in FIGS. 34, 35a, and 35b is identical of that of the embodiment in FIG. 15.

In the airbag provided with the thus constructed tether 70D, as illustrated in FIGS. 35a and 35b, when the tether 70D is pulled outside of the airbag by a predetermined length or more upon passing through the constantly-open type venthole 18A along with a separating movement of the lid member 60A from the venthole 18, the overhanging portions 74 and 74 overhanging sideward from both side edges of the halfway portion in the longitudinal direction of the tether 70D come in contact with a peripheral edge portion of the constantly-open type venthole 18A from the outside of the airbag, and blocks a return of the tether 70D into the airbag. Therefore, the lid member 60A is prevented from being closed due to that the tether 70D is drawn inside of the airbag after the lid member 60A starts to be opened.

Incidentally, a construction of the detent device for the tether is not limited thereto.

Although illustration is omitted, in each of the aforementioned embodiments other than that illustrated in FIG. 15, similarly to this embodiment, it may also be applicable to provide the detent device for the tether.

Figure 36A:
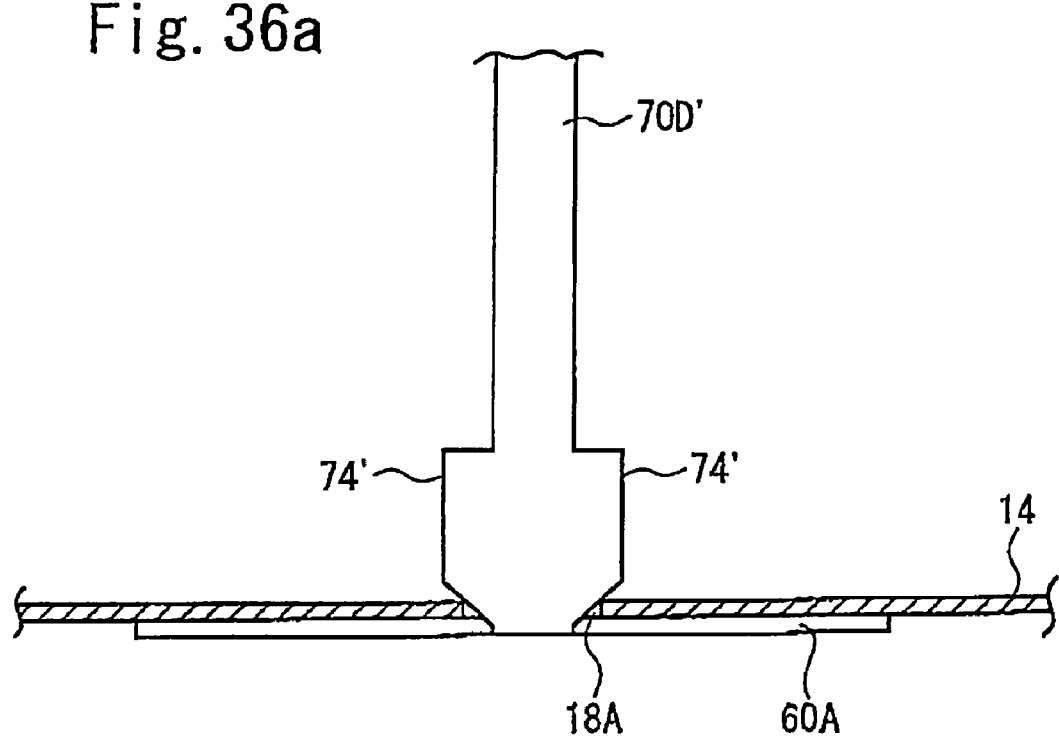
FIG. 36a and FIG. 36b are cross-sectional views, respectively, illustrating the vicinity of a constantly-open type venthole of the airbag according to the embodiment.
Figure 36B:
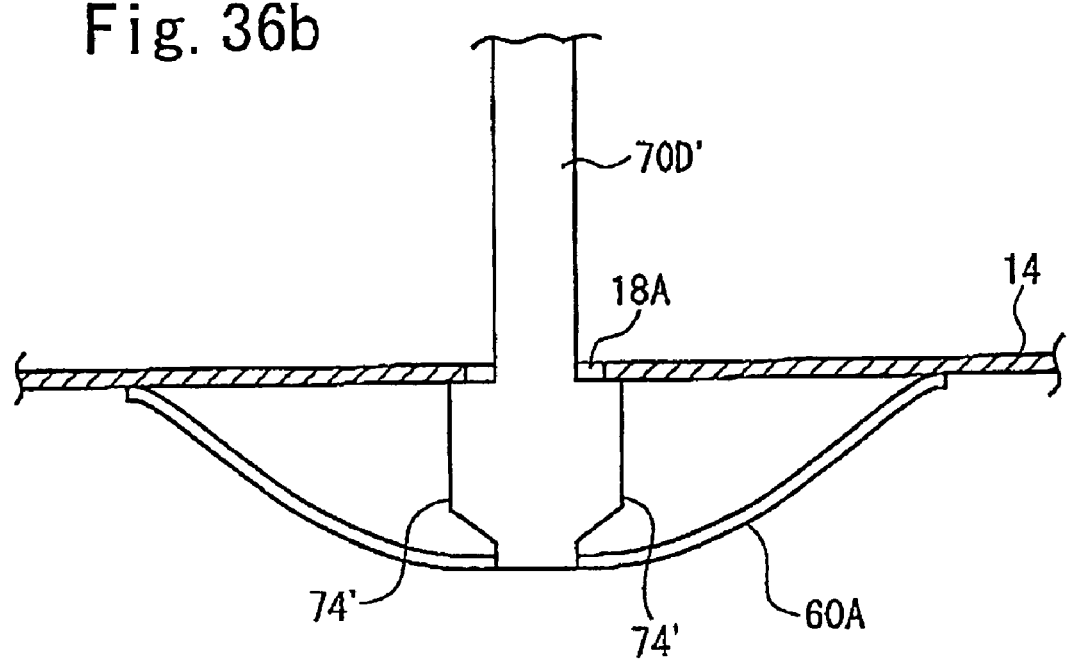

FIGS. 36a and 36b are cross-sectional views illustrating the vicinity (the same part as that of FIGS. 35a and 35b) of the constantly-open type venthole of the airbag according to still another embodiment. Incidentally, FIG. 36a illustrates a state that the lid member is made to overlap with the venthole, and FIG. 36b illustrates a state that the lid member becomes separated from the venthole.

The embodiment in FIG. 36a illustrates a construction in which in the above-described embodiment in FIGS. 34, 35a, 35b, a pair of overhanging portion 74' respectively overhanging sideward from both side edges of a tether 70D' is provided in the vicinity of the lid member 60A in the tether 70D' coupling the lid member 60A and the inner panel 22A.

For details, in the tether 70D', each of the overhanging portions 74' is disposed at a position, in which an end edge on the lid member 60A side of each of the overhanging portions 74' is able to be in contact with the peripheral edge portion of the constantly-open type venthole 18A from an inside of the airbag as illustrated in FIG. 36a in a state that the lid member 60A is made to overlap with the venthole 18, and the tether 70D' is drawn inside of the airbag to an extent of extending along the outer surface of the rear panel 14 between the lid member 60A and the constantly-open type venthole 18A without substantially loosening.

Each of the overhanging portions 74' is extended from the vicinity of the lid member 60A up to a predetermined position at a halfway portion in a longitudinal direction of the tether 70D'.

Incidentally, in this embodiment, each of the overhanging portions 74' is also integrally provided with the tether 70D' using a common base cloth with the tether 70D'. As illustrated in FIGS. 36a and 36b, the end edge on the lid member 60A side of each of the overhanging portions 74' is formed to have a tapered shape in which the more the position on the end edge is spaced apart from the lid member 60A, the larger the overhanging width from the side edge of the tether 70D' becomes.

Other construction of this embodiment is identical of that of the above-described embodiment in FIGS. 34, 35a, and 35b.

In the airbag provided with the thus constructed tether 70D', when the lid member 60A is made to overlap with the venthole 18, and the tether 70D' is drawn inside of the airbag until an entire overhanging portion 74' enters inside of the airbag upon passing through the constantly-open type venthole 18A, as illustrated in FIG. 36a, the end edge on the lid member 60A side of each of the overhanging portions 74' come in contact with the peripheral edge portion of the constantly-open type venthole 18A from the inside of the airbag. Thereby, a drawing-in operation for the tether 70D' toward an outside of the airbag is limited, and the tether 70D' is held in a state of extending along the outer surface of the rear panel 14 between the lid member 60A and the constantly-open type venthole 18A without substantially loosening, and a separating operation of the lid member 60A from the venthole 18 is limited.

Accordingly, when the airbag is folded back, since the lid member 60A is held in a state of being overlapped with the venthole 18 by means of the overhanging portion 74' and the tether 70D' from the starting time of the expanding operation of the airbag by overlapping the lid member 60A with the venthole 18 as described above, and drawing the tether 70D' inside of the airbag until each of the overhanging portions 74' enters inside of the airbag upon passing through the constantly-open type venthole 18A, even at a stage before the tether 70D' is strained by being pulled inside of the airbag by means of the inner panel 22A, the gas in the airbag is prevented from being discharged from the venthole 18, or is suppressed to be discharged from the venthole 18.

After the expanding operation of the airbag is started, in a case that the internal pressure of the airbag is sufficiently raised, and an occupant comes in contact with the front panel 12 of the airbag and the front panel 12 is retreated, the lid member 60A is pressed in a direction to be separated from the venthole 18 by the gas pressure in the airbag, and the tether 70D' is strongly pulled outside of the airbag along that, and thereby each of the overhanging portions 74' is dropped off from the peripheral edge portion of the constantly-open type venthole 18A and is pulled outside of the airbag. Thereby, a separating operation of the lid member 60A from the venthole 18 is allowed, and the venthole 18 is opened.

Thereafter, when the tether 70D' is pulled outside of the airbag by a predetermined length or more upon passing through the constantly-open type venthole 70D' along with the separating operation of the lid member 60A from the venthole 18, as illustrated in FIG. 36b, the end edge of each of the overhanging portions 74' on an opposite side that is opposite to the lid member 60A comes in contact with the peripheral edge portion of the constantly-open type venthole 18A from the outside of the airbag, and blocks the return of the tether 70D' inside of the airbag. Therefore, after the lid member 60A starts to be opened, the tether 70D' is drawn inside of the airbag and the lid member 60A is prevented from being closed.

That is, in this embodiment, each of the overhanging portions 74' serves as both of a holding device for holding the lid member 60A in a state of overlapping with the venthole 18 at a stage when the airbag starts to be expanded, and the detent device for blocking the tether 70D' from returning inside of the airbag after the tether 70D' is pulled outside of the airbag upon passing through the constantly-open type venthole 18A along with the separating operation of the lid member 60A from the venthole 18.

Therefore, in this embodiment, there is no need to separately provide the holding device and the detent device, and the construction of the airbag can be simplified.

Figure 37:
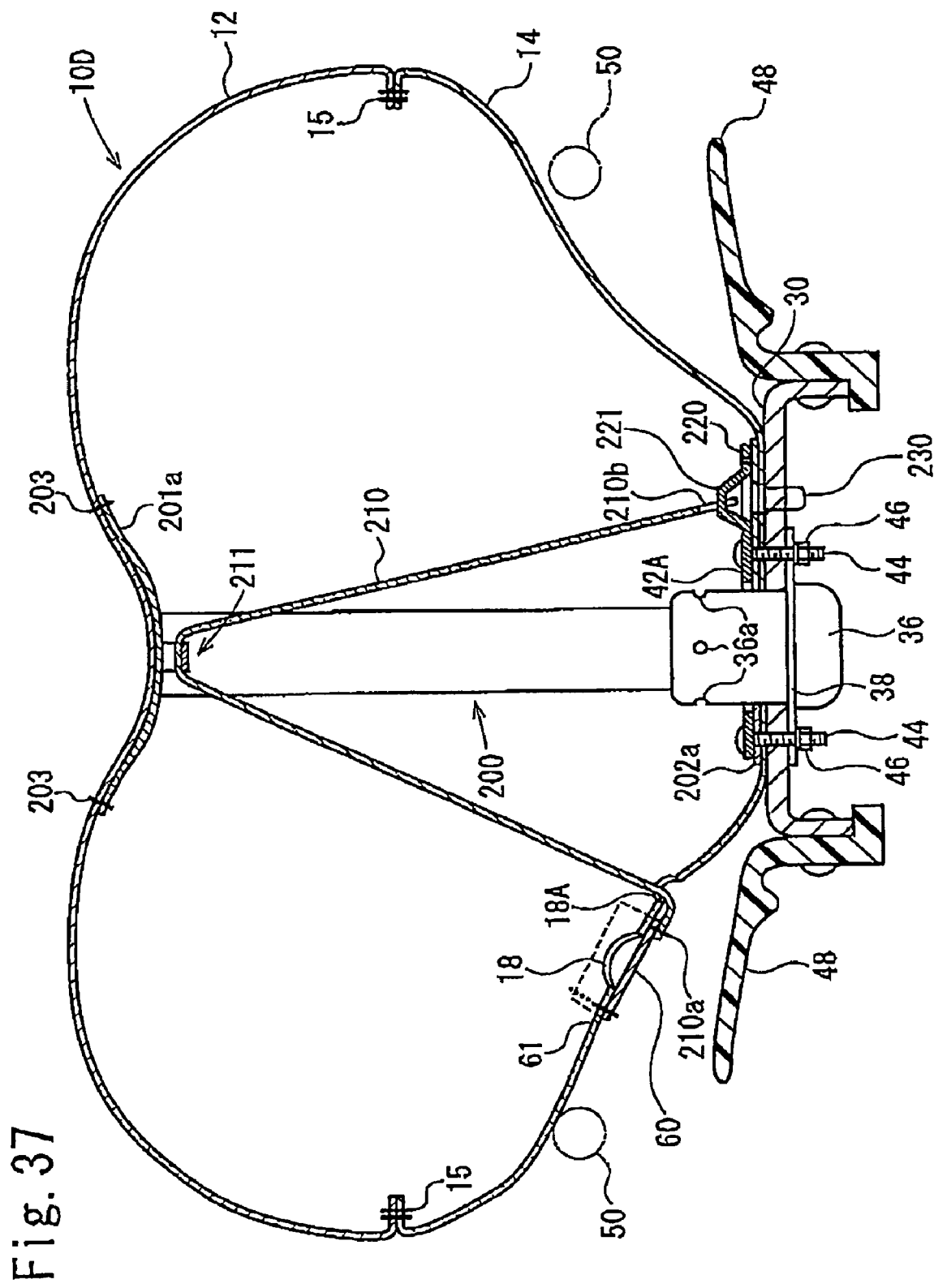
FIG. 37 is a cross-sectional view illustrating the airbag and the airbag apparatus according to the embodiment.
Figure 38:
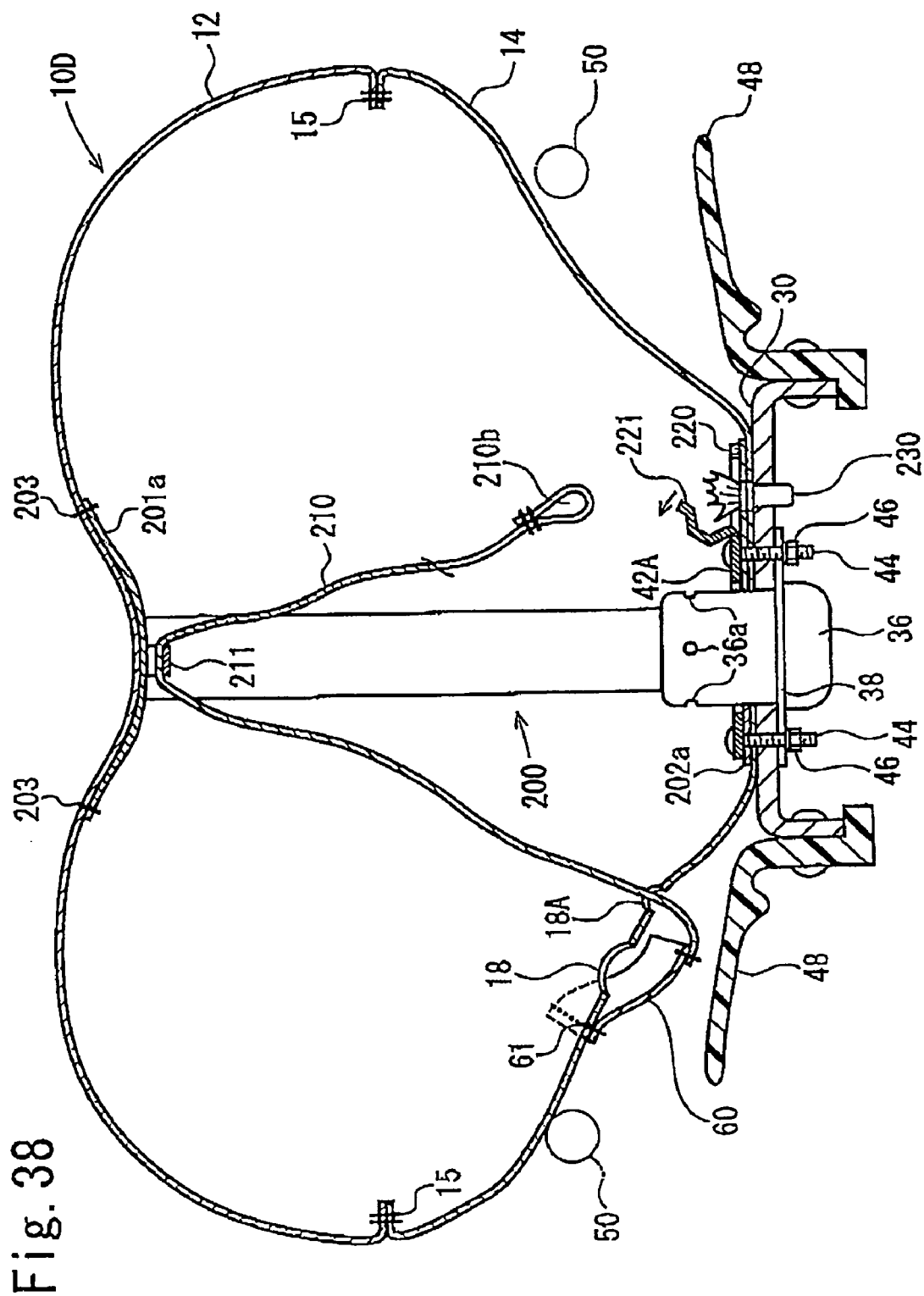
FIG. 38 is a cross-sectional view illustrating the airbag and the airbag apparatus in FIG. 37, when the venthole of is opened.
Figure 39:
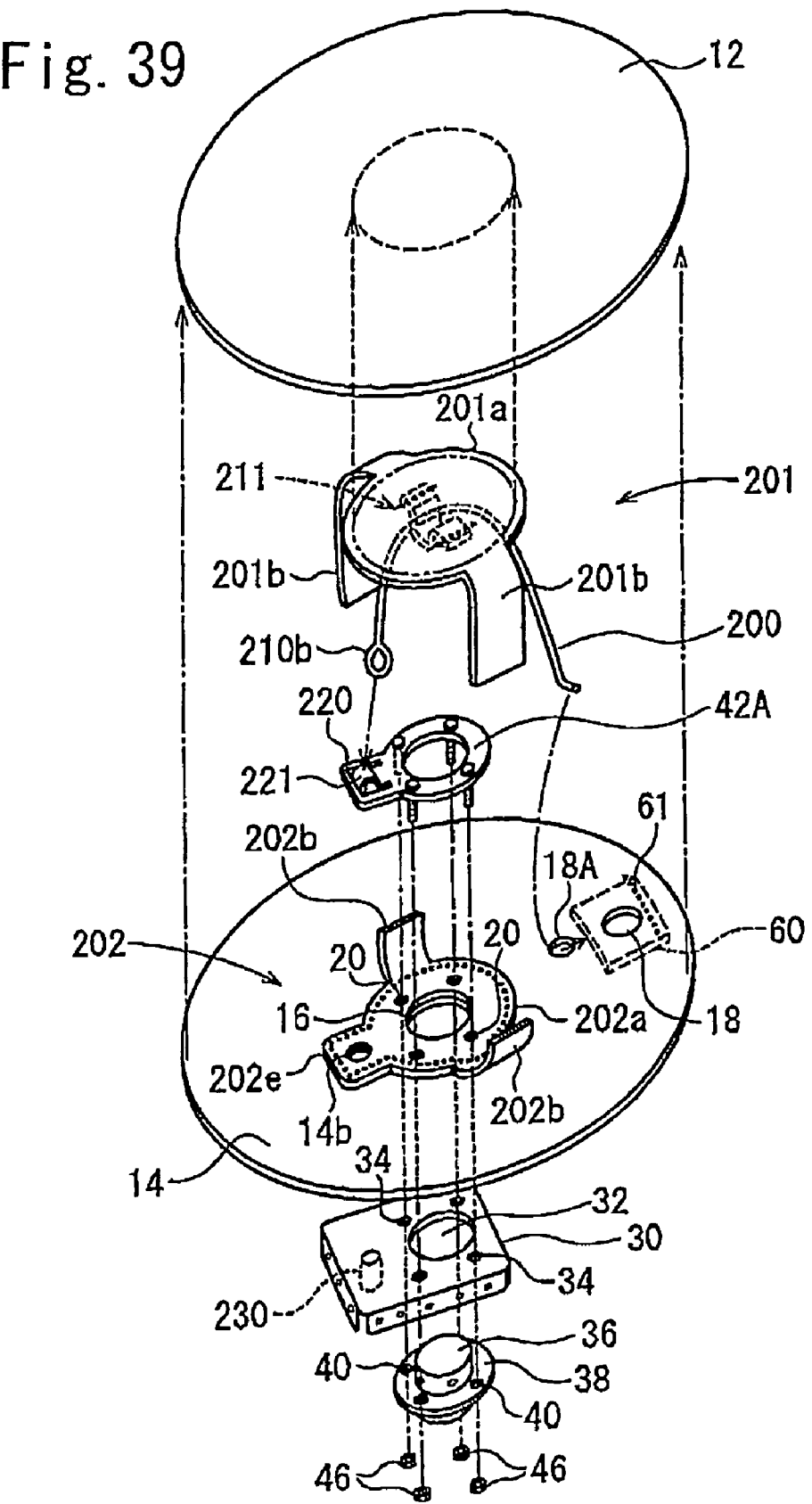
FIG. 39 is an exploded perspective view illustrating the airbag and the airbag apparatus in FIG. 37.

FIG. 37 and FIG. 38 are cross-sectional views illustrating an airbag and an airbag apparatus according to still another embodiment, FIG. 39 is an exploded perspective view illustrating the airbag and the airbag apparatus. Incidentally, FIG. 37 illustrates a state when the venthole is closed, and FIG. 38 illustrates a state when the venthole is opened.

In an airbag 10D in this embodiment, as an internal member, a hanging strap 200 for coupling the front panel 12 and the rear panel 14 in an inside of the airbag 10D is provided.

In this embodiment, the hanging strap 200 is composed of a first hanging-strap construction member 201 on the front panel 12 side, and a second hanging-strap construction member 202 on the rear panel 14 side.

The first hanging-strap construction member 201 is provided with a base piece portion 201a that is disposed at a center portion of the front panel 12 and two strap-shaped bodies 201b and 201b that is extended in a radial direction from an outer periphery of the base piece portion 201a in this embodiment. The base piece portion 201a is formed of a round woven cloth having a smaller diameter than that of the front panel 12, and the strap-shaped bodies 201b and 201b are disposed in a positional relationship to be on mutually opposite sides while sandwiching a center of the base piece portion 201a. The base piece portion 201a is disposed in an approximately concentric manner with the front panel 12, and is stitched to the center portion of the front panel 12 by means of a seam 203.

Further, the second hanging-strap construction member 202 is, in this embodiment, provided with a base piece portion 202a disposed at a center portion of the rear panel 14, and two strap-shaped bodies 202b and 202b that is extended in a radial direction from an outer periphery of the base piece portion 202a. The base piece portion 202a is formed of a round woven cloth having a smaller diameter than that of the rear panel 14, and the strap-shaped bodies 202b and 202b are disposed in a positional relationship to be on mutually opposite sides while sandwiching a center of the base piece portion 202a. At a center of the base piece portion 202a, an opening for use in an inflator, which is made to overlap with the opening 16 for use in an inflator of the rear panel 14, is provided. Furthermore, around the opening 202c, bolt insertion holes 202d that are overlapped with the bolt insertion holes 20 of the rear panel 14 are provided.

Each of tip end portions of each of the strap-shaped bodies 201b and 202b of these hanging strap-construction members 201 and 202 is stitched to each other by means of a seam 204. Hereinbelow, this continuum is sometimes called as a hanging strap 200.

In this embodiment, the construction is made in such a way such that an insertion portion 211 for a tether 210 serving as a connecting member is provided in a base piece portion 201a of the first hanging strap-construction member 201, which is stitched to the airbag-inside surface of the front panel 12, and a halfway portion of the tether 210 is inserted into the insertion portion 211, and one end side of the tether 210 is pulled out of the airbag 10D from the constantly-open type venthole 18A and is coupled with the lid member 60, and the other end is releasably coupled with the rear panel 14 side. A numeral 210a denotes a seam by which the one end of the tether 210 is stitched to the lid member 60.

In this embodiment, a plate-shaped extending piece 220 that is extended sideward in a manner so as to follow a plate surface of the retainer 30, from a pressing ring 42A for fixing the peripheral edge portion of the opening 16 for use in an inflator of the rear panel 14 to the retainer 30, is provided. A C-shaped slit (reference numeral is omitted) is provided in the extending piece 220, and a hook portion 221 is formed in a manner so as to bend a portion surrounded by the slits into an approximately Ω-shape. However, a forming method of the hook portion 221 is not limited thereto.

On a base end side of the hook portion 221, a hinge groove (reference numeral is omitted) for leading the hook portion 221 to rotate upward (upward in FIG. 37 and FIG. 38, the same as above) when the gas-pressure of a predetermined value or more is applied to the hook portion 221 from below (below in FIGS. 37 and 38, the same as above) is provided.

In this embodiment, coupling device for releasably coupling the tether 210 serving as a connecting member with the rear panel 14 side is constructed by the hook portion 221.

An igniter 230 capable of blowing out high-pressure gas upward is installed at a portion in the retainer 30, which is made to overlap with the hook portion 221. In this embodiment, coupling-releasing device for releasing coupling of the tether 210 with the rear panel 14 side by means of the hook portion 221 is constructed by the igniter 230.

A gas-introducing inlet 14b for introducing blowing-out gas from the igniter 230 inside of the airbag 10D is provided at a portion in the rear panel 14, which is made to overlap with the igniter 230 and the hook portion 221. The blowing-out gas from the igniter 230 collides with the hook portion 221 upon passing through the gas-introducing inlet 14b, and rotates the hook portion 221 upward.

Incidentally, in this embodiment, an extending portion 202e for reinforcing, which is made to overlap with a peripheral edge portion of the gas-introducing inlet 14b is projected from a peripheral edge portion of the base piece portion 202a of the second hanging strap-construction member 202 that is stitched to a peripheral edge portion of the opening 16 for use in an inflator of the rear panel 14. The gas-introducing inlet 14b is opened inside of the airbag 10D upon penetrating the extending portion 202e.

Although not illustrated, in this embodiment, a sensor for detecting a body weight of the occupant is provided in a seat of a vehicle, and a control circuit of the airbag apparatus is set to activate the igniter 230 to blow out the gas in a case that the body weight of the occupant detected by the sensor is a predetermined value or less.

The aforementioned tether insertion portion 211 is formed of a small cloth having an approximately rectangular shape in this embodiment. A pair of two side portions of the rectangular small cloth is stitched to the airbag-inside surface of the aforementioned base piece portion 201a by means of a seam (reference numeral is omitted). The tether 210 is pulled through between the small cloth and the base piece portion 201a from a rest pair of two sides of the small cloth. However, the small cloth may be directly attached to the airbag-inside surface of the front panel 12.

A ring portion 210b is formed on the other end side of the tether 210, and the ring portion 210b is hooked on the aforementioned hook portion 221.

Other construction of the airbag 10D is identical of that of the above-described airbag 10 illustrated in FIGS. 1 through 4a, 4b, and 4c, and the same numerals in FIGS. 37 through 39 as that in FIGS. 1 through 4a, 4b, and 4c denote the same elements.

In a case that the body weight of the occupant is small, even when the occupant hits the expanded airbag 10D, a crushing amount of the airbag 10D is brought to be insufficient, and there is a possibility that the venthole 18 is not sufficiently opened. Therefore, in this embodiment, in a case that the detected value of the body weight of the occupant by the aforementioned sensor is a predetermined value or less, the igniter 230 is activated as illustrated in FIG. 38, and the hook portion 221 is rotated upward by means of the blowing out gas from the igniter 230, and thus, engagement of the tether 210 (ring portion 210b) and the hook portion 221 is released. Thereby, restraint of the lid member 60 by means of the tether 210 is forcibly released, and even when the crushing amount of the airbag 10D is small, the lid member 60 becomes separated from the venthole 18 by the gas pressure inside of the airbag 10D, and the venthole 18 is brought to be opened.

Incidentally, in the airbag apparatus in this embodiment, in a case that the body weight of the occupant is a predetermined value or more, the igniter 230 is not activated. In this case, when the airbag 10D is expanded, as illustrated in FIG. 37, the tether 210 is pulled inside of the airbag along with the expanding operation of the front panel 12 toward the occupant side, and thereby the lid member 60 is made to overlap with the venthole 18 while being under strain along the outer surface of the rear panel 14, and thus, the venthole 18 is closed.

Thereafter, when the occupant hits the expanded airbag 10D and the front panel 12 is retreated, the force for pulling the tether 210 inside of the airbag 10D is released, and the lid member 60 becomes separated from the outer surface of the rear panel 14 by the gas pressure in an inside of the airbag 10D. Thereby, the venthole 18 is brought to an open state and the gas is discharged outside of the airbag 10D from the venthole 18.

In this embodiment, as an internal member, although a hanging strap 200 for coupling the front panel 12 and the rear panel 14 is provided, the internal member may have a construction other than the above-described.

In this embodiment, although the igniter 230 is controlled to be activated to blow out the gas in a case that the body weight of the occupant is a predetermined value or less, a control method of the igniter 230 is not limited thereto.

Other than the above-described, for example, the control may be made such that in a case that the body weight of the occupant is the predetermined value or less, an ignition timing of the igniter 230 is hastened, and that in a case that the body weight of the occupant is the predetermined value or more, the ignition timing of the igniter 230 is delayed. By thus controlling, since the igniter 230 can be activated earlier than or later than the timing of opening the lid member by means of the connecting member in proportion as a body type of the occupant, the occupant can be further effectively restrained.

In addition, upon detecting a position of a seat in a front-and-back direction by means of a front-and-back position detecting sensor for the seat, in a case that the seat is located nearer a front side of a vehicle relative to the predetermined position, the ignition timing of the igniter 230 may be hastened, and in a case that the seat is located nearer a back side of the vehicle relative to the predetermined position, the ignition timing of the igniter 230 may be delayed.

Upon detecting a seating position of the occupant by means of a camera, an infra-red ray sensor, a distance-measuring device, or the like, the ignition timing of the igniter 230 may be hastened when the occupant is shallowly seated on a front side of the seat, and the ignition timing of the igniter 230 may be delayed when the occupant is deeply seated on the seat.

Furthermore, an activating timing of the igniter 230 may be controlled by recognition of presence or absence of wearing a seat belt by means of providing a buckle switch for detecting that a tongue is latched on a buckle, a belt-tension sensor for detecting tension applied to the belt, or the like in a seat belt apparatus.

However, the activating operation of the igniter 230 may be controlled on the basis of activating conditions other than the above-described.

Any of each of the aforementioned embodiments is illustrative of the present invention, and the present invention is not limited to each of the aforementioned embodiments.

In the aforementioned embodiment illustrated in FIGS. 1 through 4a, 4b, and 4c, as the internal member, the inner panels 22A and 22B for partitioning the inside of the airbag 10 into the first chamber 1 in the center, and the second chamber 2 surrounding the same are provided, and in the embodiment illustrated in FIGS. 37 through 39, as the internal member, a hanging strap 200 whose one end is coupled with the occupant-facing surface (front panel 12) of the airbag, and the other end is coupled with the surface (rear panel 14) on the opposite side that is opposite to the occupant-facing surface is provided. However, the construction of the internal member is not limited thereto.

In each of the aforementioned embodiments, as the lid member, although the one having the approximately triangular shape and the one having the approximately trapezoidal shape are illustrated, the shape of the lid member is not limited thereto, and any shape, such as a round shape (including an elliptical shape), a polygon of a pentagon or more, or the like may be applicable.

It may be applicable that the constantly-open type venthole may be provided plural in number, the connecting member is inserted into two or more of the constantly-open type vent-holes in that, and the lid member and the occupant-facing surface of the airbag or the internal member are coupled with each other via the plurality of connecting members. In this case, the connecting member may be inserted into all of the constantly-open type ventholes, or the constantly-open type venthole in which the connecting member is not inserted, while the connecting member is inserted into only a part of the constantly-open type ventholes, may exist.

Further, a plurality of ventholes may be covered by the lid members, respectively. In this case, the plurality of ventholes may be covered by a common lid member, or may be individually covered by the lid members.

In the present invention, the tether serving as the connecting member may be a strap-shaped one, and may be a belt-shaped one formed of a cloth or the like. It is natural that a material other than the tether may be used as the connecting member.

In each of the embodiments other than that illustrated in FIG. 16, a construction may be formed in such a way that the tether is configured to have a width larger than a width of the constantly-open type venthole, and a friction resistance is generated when the tether passes through the constantly-open type venthole.

Although illustration is omitted, in each of the embodiments illustrated in FIG. 16, FIGS. 19 through 21, FIGS. 22a, 22b through 25a, and 25b, FIGS. 26a and 26b, 26c through 30a, and 30b, FIGS. 31a through 31c, FIG. 32, FIGS. 37 through 39, the lid member and the tether may be also integrally provided.

Although each of the aforementioned embodiments is an application example of the present invention to the airbag for use in a driver's seat and a passenger seat of a vehicle, and an airbag apparatus, the present invention is applicable to various airbags and airbag apparatuses other than the above-described.

Incidentally, the present application is based on Japanese Patent Application (Japanese Patent Application No. 2007-174250) filed Jul. 2, 2007, the entire contents of which are incorporated by reference.

The invention claimed is:

1. An airbag comprising:
   an occupant-facing surface, a rear surface opposite to the occupant-facing surface, and a side surface in an expanded state,
   a first venthole provided on the rear surface or the side surface, a lid member having at least one end side coupled with the airbag and the other end side not coupled therewith, a constantly-open second venthole provided in an area in the airbag on the other end side of the lid member, which is not covered by the lid member, and a connecting member for connecting the other end side of the lid member and the occupant-facing surface, said connecting member passing through the constantly-open second venthole and an inside of the airbag, wherein when the airbag is expanded, the lid member is under strain along an outer surface of the airbag and is made to overlap the first venthole by being pulled in a direction where the other end side of the lid member becomes separated from the one end side via the connecting member, and thereby the first venthole is closed or opened by a small amount, and wherein the lid member becomes separated from the first venthole by an occupant coming to contact with the expanded airbag and causes the occupant-facing surface to retreat, and thereby the first venthole is opened or opened by a large amount.

2. The airbag according to claim 1, wherein the lid member is integrally constructed with a panel constituting the outer surface of the airbag.

3. The airbag according to claim 2, wherein the airbag includes a front panel constituting the occupant-facing surface, and a rear panel constituting the rear surface on the opposite side, and wherein the lid member is constructed with an extending piece that integrally extends from at least one of the front panel or the rear panel.

4. The airbag according to claim 1, further comprising an inner panel for partitioning an inside of the airbag into a first chamber in a center of the airbag and a second chamber surrounding the first chamber, wherein in the inner panel, a communicating portion for allowing the first chamber and the second chamber to communicate with each other is provided, and the airbag is constructed in such a way that the first chamber is expanded first by a gas being introduced into the first chamber, and then the second chamber is expanded by the gas flowing into the second chamber from the first chamber via the communicating portion, and wherein the first venthole is a venthole that allows the second chamber and an outside of the airbag to communicate with each other.

5. The airbag according to claim 1, wherein an auxiliary lid member for covering the first venthole from an inside of the airbag is provided, and wherein when the lid member is in a state of closing the first venthole, the auxiliary lid member covers the first venthole from the inside of the airbag, and when a closing operation for the first venthole by the lid member is stopped, the auxiliary lid member is pushed outside the airbag from the first venthole by gas-pressure in the airbag and opens the first venthole.

6. The airbag according to claim 5, wherein at least one end side of the auxiliary lid member is connected to a peripheral edge portion of the first venthole, and the other end side is not connected to the peripheral edge portion of the first venthole.

7. The airbag according to claim 6, wherein a plurality of the auxiliary lid members is provided in such a way that positions thereof vary in a peripheral direction of the first venthole.

8. The airbag according to claim 1, wherein an end of a tubular nozzle is coupled with the first venthole, and when the lid member is in a state of closing the first venthole, the nozzle is disposed inside of the airbag, and when the closing operation for the first venthole by the lid member is stopped, the nozzle is projected to outside of the airbag from the first venthole by being pressed by means of gas-pressure in the airbag.

9. The airbag according to claim 1, wherein the lid member is made to overlap the first venthole from a starting time of an expanding operation of the airbag.

10. The airbag according to claim 9, wherein the airbag is in a folded back state before the airbag is expanded, and when the airbag is folded back, the lid member and the airbag are integrally folded back along a folding line extending so as to traverse the first venthole, in a state where the lid member is made to overlap the first venthole.

11. The airbag according to claim 9, wherein before the airbag is expanded, the lid member is held in a state of being overlapped with the first venthole.

12. The airbag according to claim 11, wherein an overhanging portion that is overhanging sideward from a side edge of the connecting member is provided, and wherein the overhanging portion is in contact with a peripheral edge portion of the constantly-open second venthole from the inside of the airbag, in a state that the lid member is made to overlap the first venthole, and the connecting member is drawn inside the airbag to an extent that the connecting member is made to extend along the outer surface of the airbag between the lid member and the constantly-open second venthole without substantially loosening.

13. The airbag according to claim 9, wherein in a state that the lid member is made to overlap the first venthole, the other end side of the lid member is disconnectably connected to a venthole-peripheral edge portion of the airbag, and wherein a connection of the lid member and the venthole-peripheral edge portion is released when an internal pressure of the airbag is brought to a predetermined pressure or more.

14. The airbag according to claim 13, wherein the other end side of the lid member is coupled with the venthole-peripheral edge portion by means of a tear seam that is torn when a predetermined tensile force or more is applied.

15. The airbag according to claim 1, wherein a width of the connecting member in a direction perpendicular to an insertion direction of the constantly-open second venthole is greater than a width of the constantly-open second venthole.

16. The airbag according to claim 1, wherein an opening area of the first venthole is greater than an opening area of the constantly-open second venthole.

17. The airbag according to claim 16, wherein the opening area of the first venthole is four times or more greater than the opening area of the constantly-open second venthole.

18. The airbag according to claim 1, wherein coupling of the lid member and the occupant-facing surface of the airbag by means of the connecting member is released when an internal pressure of the airbag is brought to a predetermined pressure or more.

19. The airbag according to claim 18, wherein the connecting member is provided with a fragile portion and the coupling of the lid member and the occupant-facing surface of the airbag is released by the connecting member being torn at the fragile portion when the internal pressure of the airbag is brought to the predetermined pressure or more.

20. The airbag according to claim 1, wherein the connecting member is blocked from returning to an inside of the airbag after the connecting member is pulled to outside of the airbag upon passing through the constantly-open second venthole along with the lid member becoming separated from the first venthole.

21. The airbag according to claim 20, wherein an overhanging portion overhanging sideward from a side edge of the connecting member is provided at a halfway portion in a longitudinal direction of the connecting member, and wherein the connecting member is blocked from returning to the inside of the airbag by the overhanging portion coming into contact with a peripheral edge portion of the constantly-open second venthole from outside of the airbag, after the connecting member is pulled to outside of the airbag upon passing through the constantly-open second venthole along with the lid member becoming separated from the first venthole.

22. The airbag according to claim 21, wherein the overhanging portion is in contact with the peripheral edge portion of the constantly-open second venthole from inside of the airbag, in a state that the lid member is made to overlap with the first venthole, and the connecting member is drawn inside of the airbag to an extent that the connecting member is made to extend along the outer surface of the airbag between the lid member and the constantly-open second venthole without substantially loosening.

23. The airbag according to claim 1, wherein an insertion portion of the connecting member is provided in an airbag-inside surface of the occupant-facing surface, and one end of the connecting member is coupled with the lid member and a halfway portion in a longitudinal direction of the connecting member is inserted into the insertion portion.

24. The airbag according to claim 23, wherein a coupling body for releasably coupling the other end side of the connecting member with an opposite side that is opposite to the occupant-facing surface, and a coupling-releasing device for releasing the coupling of the coupling body are provided.

25. An airbag apparatus provided with the airbag according to claim 1 and a gas-generator for supplying a gas into the airbag.

26. The airbag according to claim 1, further comprising an auxiliary lid member covering the first venthole, said auxiliary lid member covering the first venthole when the lid member covers the first venthole, and when closing of the first venthole by the lid member is released, the auxiliary lid member opens the first venthole.

* * * * *